(12) United States Patent
Devaux et al.

(10) Patent No.: US 12,529,073 B2
(45) Date of Patent: Jan. 20, 2026

(54) VIRAL VECTORS FOR NUCLEAR REPROGRAMMING

(71) Applicant: Mayo Foundation for Medical Education and Research, Rochester, MN (US)

(72) Inventors: Patricia Devaux, Rochester, MN (US); Yasuhiro Ikeda, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 807 days.

(21) Appl. No.: 16/338,295

(22) PCT Filed: Sep. 29, 2017

(86) PCT No.: PCT/US2017/054268
§ 371 (c)(1),
(2) Date: Mar. 29, 2019

(87) PCT Pub. No.: WO2018/064460
PCT Pub. Date: Apr. 5, 2018

(65) Prior Publication Data
US 2020/0040359 A1  Feb. 6, 2020

Related U.S. Application Data

(60) Provisional application No. 62/402,310, filed on Sep. 30, 2016.

(51) Int. Cl.
*C12N 15/86* (2006.01)
*C12N 5/074* (2010.01)

(52) U.S. Cl.
CPC .......... *C12N 15/86* (2013.01); *C12N 5/0696* (2013.01); *C12N 2760/18443* (2013.01); *C12N 2830/20* (2013.01)

(58) Field of Classification Search
CPC .................. C12N 15/86; C12N 5/0696; C12N 2760/18443; C12N 2830/20
See application file for complete search history.

(56) References Cited

U.S. PATENT DOCUMENTS

| | | | |
|---|---|---|---|
| 8,048,999 | B2 | 11/2011 | Yamanaka et al. |
| 8,058,065 | B2 | 11/2011 | Yamanaka et al. |
| 8,129,187 | B2 | 3/2012 | Yamanaka et al. |
| 8,173,118 | B2 | 5/2012 | Terzic |
| 8,278,104 | B2 | 10/2012 | Yamanaka et al. |
| 9,127,256 | B2 | 9/2015 | Fusaki et al. |
| 9,932,561 | B2 | 4/2018 | Thatava |
| 10,047,346 | B2 | 8/2018 | Ikeda et al. |
| 2003/0170266 | A1 | 9/2003 | Kitazato et al. |
| 2004/0241838 | A1 | 12/2004 | Johnson et al. |
| 2006/0084168 | A1 | 4/2006 | Thomson et al. |
| 2011/0200568 | A1 | 8/2011 | Ikeda et al. |
| 2012/0164731 | A1 | 6/2012 | Sakurai et al. |
| 2012/0214240 | A1 | 8/2012 | Nakanish et al. |
| 2013/0029416 | A1 | 1/2013 | Thatava et al. |
| 2013/0273013 | A1 | 10/2013 | Revel et al. |
| 2014/0356951 | A1 | 12/2014 | Thatava |
| 2017/0009210 | A1 | 1/2017 | Ikeda et al. |
| 2018/0187161 | A1 | 7/2018 | Thatava et al. |
| 2018/0320143 | A1 | 11/2018 | Ikeda et al. |

FOREIGN PATENT DOCUMENTS

| | | | |
|---|---|---|---|
| EP | 1 970 446 | 9/2008 | |
| EP | 2 669 381 | 12/2013 | |
| EP | 3 216 868 | 9/2017 | |
| WO | WO 2007/054720 | 5/2007 | |
| WO | WO 2007/069666 | 6/2007 | |
| WO | WO 2008/066630 | 6/2008 | |
| WO | WO 2008/088882 | 7/2008 | |
| WO | WO 2009/032194 | 3/2009 | |
| WO | 2010/003420 | * 1/2010 | ............. C12N 15/11 |
| WO | WO 2010/017652 | 2/2010 | |
| WO | WO 2013/104728 | 7/2013 | |
| WO | WO 2014/037574 | 3/2014 | |
| WO | WO 2015/119995 | 8/2015 | |
| WO | WO 2016/034095 | 3/2016 | |
| WO | WO 2016/120493 | 8/2016 | |

OTHER PUBLICATIONS

Anokye-Danso et al. "How microRNAs facilitate reprogramming to pluripotency." Journal of cell science 125.18 (2012): 4179-4787 (Year: 2012).*
Driscoll et al. "Nuclear reprogramming with a non-integrating human RNA virus." Stem Cell Research & Therapy 6 (2015): 1-13 (Year: 2015).*
Abe et al., "Ex vivo expansion of human HSCs with Sendai virus vector expressing HoxB4 assessed by sheep in utero transplantation," Experimental hematology, 39(1):47-54, Jan. 2011.
Apolonia et al., "Stable gene transfer to muscle using non-integrating lentiviral vectors," Mol. Ther., 15(11): 1947-1954, Nov. 2007.
Audsley and Moseley, "Paramyxovirus evasion of innate immunity: Diverse strategies for common targets," World J. Virol., 2(2):57-70, May 2013.
Ban et al., "Efficient generation of transgene-free human induced pluripotent stem cells (iPSCs) by temperature-sensitive Sendai virus vectors," Proc. Natl. Acad. Sci. USA., 108(34):14234-9, Aug. 2011.
Banasik et al., "Integrase-defective lentiviral vectors: progress and applications," Gene Ther., 17(2):150-157, Epub Oct. 22, 2009.
Behfar et al., "Cardiopoietic programming of embryonic stem cells for tumor-free heart repair," J. Exp. Med., 204(2):405-420, Feb. 2007.

(Continued)

*Primary Examiner* — Fereydoun G Sajjadi
*Assistant Examiner* — Alexander W Nicol
(74) *Attorney, Agent, or Firm* — Fish & Richardson P.C.

(57) ABSTRACT

This document provides materials and methods involved in making and using induced pluripotent stem cells (iPSCs). For example, measles virus vectors for reprogramming somatic cells into iPSCs, methods for obtaining iPSCs, and methods for using iPSCs are provided.

13 Claims, 26 Drawing Sheets
Specification includes a Sequence Listing.

(56) References Cited

OTHER PUBLICATIONS

Behfar et al., "Stem cell differentiation requires a paracrine pathway in the heart," FASEB J., 16(12):1558-1566, Oct. 2002.
Bilic and Belmonte, "Concise Review: Induced Pluripotent Stem Cells Versus Embryonic Stem Cells: Close Enough or Yet Too Far Apart?" Stem Cell Res., 33:33-41, 2012.
Bitzer et al., "Sendai virus vectors as an emerging negative-strand RNA viral vector system," J. Gene. Med., 5(7):543-53, Jul. 2003.
Borowiak et al., "Small molecules efficiently direct endodermal differentiation of mouse and human embryonic stem cells," Cell Stem Cell, 4(4):348-358, Apr. 2009.
Brunel et al., "Sequence of events in measles virus replication: role of phosphoprotein-nucleocapsid interactions," Journal of Virology, 88(18):10851-63, Sep. 2014.
Buteau et al., "Glucagon-like peptide 1 induces pancreatic beta-cell proliferation via transactivation of the epidermal growth factor receptor," Diabetes, 52:124-132, Jan. 2003.
Carey et al., "Reprogramming factor stoichiometry influences the epigenetic state and biological properties of induced pluripotent stem cells," Cell Stem Cell, 9(6):588-598, Dec. 2011.
Chen et al., "A small molecule that directs differentiation of human ESCs into the pancreatic lineage," Nat Chem Biol., 5(4):258-265, Epub Mar. 15, 2009 with 20 pages Supplementary Material.
Chung et al., "Mitochondrial oxidative metabolism is required for the cardiac differentiation of stem cells," Nat. Clin. Pract. Cardiovasc. Med., 4 Suppl 1, S60-67 Feb. 2007.
Daheron et al., "LIF/STAT3 signaling fails to maintain self-renewal of human embryonic stem cells," Stem Cells, 22(5):770-778, 2004.
D'Amour et al., "Efficient differentiation of human embryonic stem cells to definitive endoderm," Nat. Biotechnol., 23(12):1534-1541, Dec. 2005.
del Valle et al., "A vectored measles virus induces hepatitis B surface antigen antibodies while protecting macaques against measles virus challenge," J. Virol., 81(19):10597-605, Oct. 2007.
Demaison et al., "High-level transduction and gene expression in hematopoietic repopulating cells using a human immunodeficiency [correction of imunodeficiency] virus type 1-based lentiviral vector containing an internal spleen focus forming virus promoter," Hum. Gene Ther., 13(7):803-813, May 2002.
Devaux and Cattaneo, "Measles virus phosphoprotein gene products: conformational flexibility of the P/V protein amino-terminal domain and C protein infectivity factor function," J. Virol., 78(21):11632-40, Nov. 2004.
Devaux et al., "A recombinant measles virus unable to antagonize STAT1 function cannot control inflammation and is attenuated in rhesus monkeys," J. Virol., 85(1):348-56, Jan. 2011.
Devaux et al., "Attenuation of V- or C-defective measles viruses: infection control by the inflammatory and interferon responses of rhesus monkeys," Journal of Virology, 82(11):5359-67, Jun. 2008.
Devaux et al., "The measles virus phosphoprotein interacts with the linker domain of STAT1," Virology, 444(1-2):250-6, Sep. 2013.
Devaux et al., "Tyrosine 110 in the measles virus phosphoprotein is required to block STAT1 phosphorylation," Virology, 360(1):72-83, Mar. 2007.
Dietz et al., "A novel source of viable peripheral blood mononuclear cells from leukoreduction system chambers," Transfusion, 46(12):2083-9, Dec. 2006.
Driscoll et al., "Nuclear reprogramming with a non-integrating human RNA virus," Stem Cell Research and Therapy, 6(1):48, Dec. 2015.
Evans and Kaufman, "Establishment in culture of pluripotential cells from mouse embryos," Nature, 292(5819):154-156, Jul. 1981.
Extended European Search Report in European Application No. 17857486.9, dated Jul. 5, 2019, 4 pages.
Faustino et al., "Genomic chart guiding embryonic stem cell cardiopoiesis ," Genome Biol., 9(1):R6, Jan. 2008.
Felgner et al., "Enhanced gene delivery and mechanism studies with a novel series of cationic lipid formulations," J. Biol. Chem., 269(4):2550-2561, Jan. 1994.

Feng et al., "Molecules that promote or enhance reprogramming of somatic cells to induced pluripotent stem cells," Cell Stem Cell, 4(4):301-312, Apr. 2009.
Finkel and Holbrook, "Oxidants, oxidative stress and the biology of ageing," Nature, 408(6809):239-247, Nov. 2000.
Flotte et al., "Stable in vivo expression of the cystic fibrosis transmembrane conductance regulator with an adeno-associated virus vector," Proc. Natl. Acad. Sci. USA, 90(22):10613-10617, Nov. 1993.
Fujii and Martin, "Incorporation of teratocarcinoma stem cells into blastocysts by aggregation with cleavage-stage embryos," Dev. Biol., 74(1): 239-244, Jan. 1980.
Fusaki et al., "Efficient induction of transgene-free human pluripotent stem cells using a vector based on Sendai virus, an RNA virus that does not integrate into the host genome," Proc. Jpn. Acad. Ser. B. Phys. Biol. Sci., 85(8):348-62, 2009.
Galanis et al., "Phase I trial of intraperitoneal administration of an oncolytic measles virus strain engineered to express carcinoembryonic antigen for recurrent ovarian cancer," Cancer Res., 70(3):875-82, Feb. 2010.
GenBank Accession No. EU332921.1, "Measles virus strain Rouvax-schwarz phosphoprotein (P), V protein (P), and C protein (P) genes, complete cds" dated Dec. 31, 2008, 2 pages.
GenBank® GI No. 109659099, Accession No. BC117435, "Homo sapiens POU class 5 homeobox 1, mRNA (cDNA clone MGC: 151044 Image:40125986), complete cds," Jul. 17, 2007, 2 pages.
GenBank® GI No. 12652778, Accession No. BC000141, "Homo sapiens v-myc myelocytomatosis viral oncogene homolog (avian), mRNA (cDNA clone MGC:5183 Image:2985844), complete cds," Sep. 13, 2007, 3 pages.
GenBank® GI No. 163659904, Accession No. NM_000618, "Homo sapiens insulin-like growth factor 1 (somatomedin C) (IGF1), transcript variant 4, mRNA," Jul. 21, 2010, 5 pages.
GenBank® GI No. 188595715, Accession No. NM_001127500, "Homo sapiens met proto-oncogene (hepatocyte growth factor receptor) (MET), transcript variant 1, mRNA," Jul. 18, 2010, 7 pages.
GenBank® GI No. 20987475, Accession No. BC029923, "Homo sapiens Kruppel-like factor 4 (gut), mRNA (cDNA clone MGC:34918 Image:5111134), complete cds," Jul. 15, 2006, 3 pages.
GenBank® GI No. 255090638, Accession No. GQ351295, "Homo sapiens fibroblast growth factor 10 (FGF10) mRNA, complete cds," Aug. 9, 2009, 1 page.
GenBank® GI No. 291190799, Accession No. NM_002054.3, "Homo sapiens glucagon (GCG), mRNA," Sep. 26, 2010, 4 pages.
GenBank® GI No. 33869633, Accession No. BC013923, "Homo sapiens SRY (sex determining region Y)-box 2, mRNA (cDNA clone MGC:2413 Image:2823424), complete cds," Jul. 15, 2006, 2 pages.
GenBank® GI No. 33872076, Accession No. BC028566, "Homo sapiens lin-28 homolog (C. elegans), mRNA (cDNA clone MGC:15037 Image:3841184), complete cds," Jun. 19, 2006, 4 pages.
GenBank® GI No. 71043476, Accession No. BC099704.1, "Homo sapiens Nanog homeobox pseudogene 8, mRNA (cDNA clone MGC: 119250 Image:40004920), complete cds," Nov. 7, 2006, 3 pages.
Gerlier and Valentin, "Measles virus interaction with host cells and impact on innate immunity," Curr. Top Microbiol. Immunol., 329:163-91, 2009.
Gerlier et al., "Subversion of the immune system by measles virus: a model for the intricate interplay between a virus and the human immune system," Microbial Subversion of Immunity: Current Topics, 2006:225-92, 2006.
Golipour et al., "A late transition in somatic cell reprogramming requires regulators distinct from the pluripotency network," Cell Stem Cell., 11(6):769-82, Dec. 2012.
Hanna et al., "Treatment of sickle cell anemia mouse model with iPS cells generated from autologous skin," Science., 318:1920-1923, Dec. 21, 2007.
Hasegawa et al., "Affinity thresholds for membrane fusion triggering by viral glycoproteins," J. Virol., 81(23):13149-57, Dec. 2007.

(56) References Cited

OTHER PUBLICATIONS

Hasegawa et al., "The use of a tropism-modified measles virus in folate receptor-targeted virotherapy of ovarian cancer," Clin. Cancer Res., 12(20 Pt1):6170-6178, Oct. 2006.
Hinton et al., "A distinct microRNA signature for definitive endoderm derived from human embryonic stem cells," Stem Cells Dev., 19(6):797-807, Jun. 2010.
Hiramoto et al., "Newly developed measles viral vector can efficiently transduce multiple genes into naïve T cells," Blood, 124(21):4798, Dec. 2014.
Hodgson et al., "Stable benefit of embryonic stem cell therapy in myocardial infarction," Am. J. Physiol. Heart Circ. Physiol., 287(2):H471-479, Aug. 2004.
Huangfu et al., "Induction of pluripotent stem cells from primary human fibroblasts with only Oct4 and Sox2," Nat Biotechnol., 26(11): 1269-1275, Nov. 2008.
Ikeda et al., "Continuous high-titer HIV-1 vector production," Nat. Biotechnol., 21(5):569-572, May 2003.
Ikeda et al., "Gene transduction efficiency in cells of different species by HIV and EIAV vectors," Gene Ther., 9(14):932-938, Jul. 2002.
Ikeda et al., "Influence of gag on human immunodeficiency virus type 1 species-specific tropism," J. Virol., 78(21):11816-11822, Nov. 2004.
International Search Report & Written Opinion in International Application No. PCT/US2017/054268 dated Feb. 23, 2018, 15 pages.
Jaenisch and Young, "Stem cells, the molecular circuitry of pluripotency and nuclear reprogramming," Cell, 132(4): 567-582, Feb. 2008.
Jia et al., "A nonviral minicircle vector for deriving human iPS cells," Nature Methods, 7(3):197-9, Mar. 2010.
Jiang et al., "Parkin controls dopamine utilization in human midbrain dopaminergic neurons derived from induced pluripotent stem cells," Nat Commun., 3:668, 9 pages, Feb. 2012.
Kaji et al., "Virus-free induction of pluripotency and subsequent excision of reprogramming factors," Nature, 458(7239):771-775, Apr. 2009.
Kaplitt et al., "Long-term gene expression and phenotypic correction using adeno- associated virus vectors in the mammalian brain," Nat. Genet., 8(2):148-154, Oct. 1994.
Karakikes et al., "Small molecule-mediated directed differentiation of human embryonic stem cells toward ventricular cardiomyocytes," Stem Cells Transl Med., 3(1):18-31, Jan. 2014.
Kay et al., "Gene therapy," Proc. Natl. Acad. Sci. USA, 94(24):12744-12746, Nov. 1997.
Kim et al., "Epigenetic memory in induced pluripotent stem cells," Nature., 467(7313):285-290, Sep. 2010.
Kootstra et al., "Abrogation of postentry restriction of HIV-1-based lentiviral vector transduction in simian cells," Proc. Natl. Acad. Sci. USA, 100(3):1298-1303, Feb. 2003.
Kroon et al., "Pancreatic endoderm derived from human embryonic stem cells generates glucose-responsive insulin-secreting cells in vivo," Nat Biotechnol., 26(4):443-452, Epub Feb. 20, 2008.
Kudva et al., "Transgene-free disease-specific induced pluripotent stem cells from patients with type 1 and type 2 diabetes," Stem Cell Transl. Med., 1(6):451-61, Jun. 2012.
Lamb and Kolakofsky, "Paramyxoviridae: The viruses and their replication," B. N. Fields DMK, and P. M. Howley, editor. Fields Virology., 5th ed. Philadelphia: Lippincott-Raven; Ch. 41, 2001. pp. 1305-1340.
Lamb and Parks, "Paramyxoviridae: The viruses and their replication," B. N. Fields DMK, and P. M. Howley, editor. Fields Virology., 5th ed. Philadelphia: Lippincott-Raven; Ch. 41, 2007. pp. 1449-1496.
Leber et al., "MicroRNA-sensitive oncolytic measles viruses for cancer-specific vector tropism," Mol. Ther., 19(6): 1097-106, Jun. 2011.
Lee et al., "Activation of innate immunity is required for efficient nuclear reprogramming," Cell, 151(3):547-58, Oct. 2012.
Lee et al., "Preclinical derivation and imaging of autologously transplanted canine induced pluripotent stem cells," J. Biol. Chem., 286(37):32697-704, Sep. 2011.
Li et al., "A cytoplasmic RNA vector derived from nontransmissible Sendai virus with efficient gene transfer and expression," Journal of Virology, 74(14):6564-9, Jul. 2000.
Lister et al., "Hotspots of aberrant epigenomic reprogramming in human induced pluripotent stem cells," Nature., 471(7336): 68-73, Mar. 2011.
Maehr et al., "Generation of pluripotent stem cells from patients with type 1 diabetes," Proc. Natl. Acad. Sci. USA, 106(37): 15768-15773, Sep. 2009.
Maisner et al., "Recombinant measles virus requiring an exogenous protease for activation of infectivity," The Journal of general virology, 81(2):441-449, Feb. 2000.
Mali et al., "Improved Efficiency and Pace of Generating Induced Pluripotent Stem Cells from Human Adult and Fetal Fibroblasts," Stem Cells, 26:1998-2005, Aug. 2008.
Martin, "Isolation of a pluripotent cell line from early mouse embryos cultured in medium conditioned by teratocarcinoma stem cells," Proc. Natl. Acad. Sci. USA, 78(12):7634-7638, Dec. 1981.
Martinez-Fernandez et al., "c-MYC independent nuclear reprogramming favors cardiogenic potential of induced pluripotent stem cells," J Cardiovasc Transl Res., 3(1):13-23, Feb. 2010.
Martinez-Fernandez et al., "iPS programmed without c-MYC yield proficient cardiogenesis for functional heart chimerism," Circ Res., 105(7):648-656, Sep. 2009.
McAllister et al., "Mechanisms of protein kinase PKR-mediated amplification of beta interferon induction by C protein-deficient measles virus," J. Virol., 84(1):380-6, Jan. 2010.
Nagano and Fraser, "No-nonsense functions for long noncoding RNAs," Cell, 145(2):178-181, Apr. 2011.
Nagy et al., "Embryonic stem cells alone are able to support fetal development in the mouse," Development, 110(3):815-821, Nov. 1990.
Nakagawa et al., "Generation of induced pluripotent stem cells without Myc from mouse and human fibroblasts," Nat Biotechnol., 26(1):101-106, Jan. 2008.
Nakamura et al., "Rescue and propagation of fully retargeted oncolytic measles viruses," Nat. Biotechnol., 23(2):209-14, Feb. 2005.
Narazaki et al., "Directed and Systematic Differentiation of Cardiovascular Cells From Mouse Induced Pluripotent Stem Cells," Circulation, 118:498-506, 2008.
Negri et al., "Successful immunization with a single injection of non-integrating lentiviral vector," Mol. Ther., 15(9):1716-1723, Sep. 2007.
Nelson et al., "Induced pluripotent reprogramming from promiscuous human stemness-related factors," Clin. Transl. Sci., 2(2):118-126, Apr. 2009.
Nelson et al., "CXCR4+/FLK-1+ biomarkers select a cardiopoietic lineage from embryonic stem cells," Stem Cells, 26(6):1464-1474, Jun. 2008.
Nelson et al., "KCNJ11 knockout morula re-engineered by stem cell diploid aggregation," Phil. Trans. R. Soc. B., 364(1514):269-276, Jan. 2009.
Nelson et al., "Lineage specification of Flk-1+ progenitors is associated with divergent Sox7 expression in cardiopoiesis," Differentiation, 77(3):248-255, Mar. 2009.
Nelson et al., "Repair of acute myocardial infarction by human stemness factors induced pluripotent stem cells," Circulation, 120(5):408-416, Aug. 2009.
Nishimura et al., "Development of defective and persistent Sendai virus vector a unique gene delivery/expression system ideal for cell reprogramming," Bio. Chem. J., 286(6):4760-71, Feb. 2011.
Noser et al., "Cyclosporine increases human immunodeficiency virus type 1 vector transduction of primary mouse cells," J. Virol., 80(15):7769-7774, Aug. 2006.
Noser et al., "The RAS/Raf1/MEK/ERK signaling pathway facilitates VSV-mediated oncolysis: implication for the defective interferon response in cancer cells," Mol. Ther., 15(8):1531-1536, Aug. 2007.

(56) References Cited

OTHER PUBLICATIONS

Ohmine et al., "Reprogrammed keratinocytes from elderly type 2 diabetes patients suppress senescence genes to acquire induced pluripotency," Aging (Albany NY), 4(1):60-73, Jan. 2012.
Ohmine et al., "Induced pluripotent stem cells from GMP-grade hematopoietic progenitor cells and mononuclear myeloid cells," Stem Cell Res Ther., 2(6):46, doi: 10.1186/scrt87, 12 pages, Nov. 2011.
Ohmine et al., "Reprogrammed keratinocytes from elderly type 2 diabetes patients suppress senescence genes to acquire induced pluripotency," Aging, 4(1):60-73, Jan. 2012.
Ohmine et al.,"Induced pluripotent stem cells from GMP-grade hematopoietic progenitor cells and mononuclear myeloid cells," Stem Cell Res. Ther., 2(6):46, Dec. 2011.
Okita "Generation of mouse induced pluripotent stem cells without viral vectors," Science, 322(5903):949-953, Epub Oct. 2008.
Okita et al., "Generation of germline-competent induced pluripotent stem cells," Nature, 448(7151):313-7, Jul. 2007.
Okita et al., "Generation of mouse induced pluripotent stem cells without viral vectors," Science, 322(5903):949-53, Nov. 2008.
Okita et al., "Generation of germline-competent induced pluripotent stem cells," Nature, 448: 313-317, Jul. 19, 2007.
Palmowski et al., "Intravenous injection of a lentiviral vector encoding NY-ESO-1 induces an effective CTL response," J. Immunol., 172(3):1582-1587, Feb. 2004.
Papapetrou et al., "Stoichiometric and temporal requirements of Oct4, Sox2, Klf4, and c-Myc expression for efficient human iPSC induction and differentiation," Proceedings of the National Academy of Sciences of the United States of America, 106(31):12759-12764, Aug. 2009.
Paraskevakou et al., "Epidermal growth factor receptor (EGFR)-retargeted measles virus strains effectively target EGFR-or EGFRvIII expressing gliomas," Mol. Ther., 15(4):677-86, Apr. 2007.
Parks and Alexander-Miller, "Paramyxovirus activation and inhibition of innate immune responses," Journal of molecular biology, 425(24):4872-92, Dec. 2013.
Paterson, "Arrhythmia: 100 years on from George Ralph Mines," J Physiol 591(17):4065-4066, Sep. 1, 2013, 2 pages.
Perez-Terzic et al., "Stem cells transform into a cardiac phenotype with remodeling of the nuclear transport machinery," Nat. Clin. Pract. Cardiovasc. Med., 4 Suppl 1, S68-76, Feb. 2007.
Perez-Terzic et al., "Structural adaptation of the nuclear pore complex in stem cell-derived cardiomyocytes," Circ. Res., 92(4):444-452, Mar. 2003.
Philippe et al., "Lentiviral vectors with a defective integrase allow efficient and sustained transgene expression in vitro and in vivo," Proc Natl Acad Sci U S A., 103(47):17684-17689, Epub Nov. 9, 2006.
Philpott et al., "A p5 integration efficiency element mediates Rep-dependent integration into AAVS1 at chromosome 19," Proc. Natl. Acad. Sci. USA, 99(19):12381-12385, Sep. 2002.
Philpott et al., "Efficient integration of recombinant adeno-associated virus DNA vectors requires a p5-rep sequence in cis," J. Virol., 76(11):5411-5421, Jun. 2002.
Pless et al., "Monitoring vaccine safety during measles mass immunization campaigns: clinical and programmatic issues," The Journal of infectious diseases, 187(Suppl 1):S291-8, May 2003.
Qi and Pei, "The magic of four: induction of pluripotent stem cells from somatic cells by Oct4, Sox2, Myc and Klf4," Cell Research, 17(7):578-580, Jul. 2007.
Radecke and Billeter, "The nonstructural C protein is not essential for multiplication of Edmonston B strain measles virus in cultured cells," Virology, 217(1):418-21, Mar. 1996.
Radecke et al., "Rescue of measles viruses from cloned DNA," EMBO J., 14(23):5773-84, Dec. 1995.
Rajasingh et al., "Cell-free embryonic stem cell extract-mediated derivation of multipotent stem cells from NIH3T3 fibroblasts for functional and anatomical ischemic tissue repair," Circ Res., 102(11):e107-117, Jun. 2008.
Ramiya et al., "Reversal of insulin-dependent diabetes using islets generated in vitro from pancreatic stem cells," Nat. Med., 6(3):278-282, Mar. 2000.
Razak et al., "Profiling of microRNA in human and mouse ES and iPS cells reveals overlapping but distinct microRNA expression patterns," PLoS One, 8(9):e73532, Sep. 2013.
Relander et al., "Gene transfer to repopulating human CD34+ cells using amphotropic-, GALV-, or RD114-pseudotyped HIV-1-based vectors from stable producer cells," Mol. Ther., 11(3):452-459, Mar. 2005.
Russell et al., "Remission of disseminated cancer after systemic oncolytic virotherapy," Mayo Clin. Proc., 89(7): 926-33, Jul. 2014.
Saenz et al., "Unintegrated lentivirus DNA persistence and accessibility to expression in nondividing cells: analysis with class I integrase mutants," J. Virol., 78(6):2906-2920, Mar. 2004.
Sakuma et al., "Characterization of retroviral and lentiviral vectors pseudotyped with xenotropic murine leukemia virus-related virus envelope glycoprotein, " Hum. Gene. Ther., 21(12):1665-1673, Sep. 2010.
Sakuma et al., "Inhibition of HIV-1 replication by simian restriction factors, TRIM5alpha and APOBEC3G," Gene Ther., 14(2):185-189, Jan. 2007.
Schenke-Layland et al., "Reprogrammed mouse fibroblasts differentiate into cells of the cardiovascular and hematopoietic lineages," Stem Cells, 26(6):1537-1546, Jun. 2008.
Shimada et al., "Generation of canine induced pluripotent stem cells by retroviral transduction and chemical inhibitors," Mol. Reprod. Dev., 77(1):2, Jan. 2010.
Solter and Knowles, "Monoclonal antibody defining a stage-specific mouse embryonic antigen (SSEA-1)," Proc. Natl. Acad. Sci. USA, 75(11):5565-5569, Nov. 1978.
Sommer et al., "Induced pluripotent stem cell generation using a single lentiviral stem cell cassette," Stem Cells, 27(3):543-9, Mar. 2009.
Sparrer et al., "Measles virus C protein interferes with beta interferon transcription in the nucleus," Journal of Virology, 86(2):796-805, Jan. 2012.
Spielhofer et al., "Chimeric measles viruses with a foreign envelope," Journal of Virology, 72(3):2150-9, Mar. 1998.
Stadler et al., "Characterization of microRNAs involved in embryonic stem cell states," Stem Cells Dev., 19(7):935-50, Jul. 2010.
Stadtfeld et al., "Induced pluripotent stem cells generated without viral integration," Science, 322(5903):945-9, Nov. 2008.
Stadtfeld, "Defining molecular cornerstones during fibroblast to iPS cell reprogramming in mouse," Cell Stem Cell., 2(3):230-240, Epub Feb. 14, 2008.
Stewart, "Aggregation between teratocarcinoma cells and preimplantation mouse embryos," J. Embryol. Exp. Morphol., 58:289-302, Aug. 1980.
Strang et al., "Characterization of HIV-1 vectors with gammaretrovirus envelope glycoproteins produced from stable packaging cells," Gene Ther., 11(7):591-598, Apr. 2004.
Strang et al., "Human immunodeficiency virus type 1 vectors with alphavirus envelope glycoproteins produced from stable packaging cells," J. Virol., 79(3): 1765-1771, Feb. 2005.
Strebel et al., "A world without measles," The Journal of infectious diseases, 204(Suppl 1):S1-3, Jul. 2011.
Strebel et al., "Global measles elimination efforts: the significance of measles elimination in the United States," The Journal of infectious diseases, 189(Suppl 1):S251-7, May 2004.
Tahara et al., "Altered interaction of the matrix protein with the cytoplasmic tail of hemagglutinin modulates measles virus growth by affecting virus assembly and cell-cell fusion," J. Virol., 81(13):6827-36, Jul. 2007.
Takahashi and Yamanaka, "Induction of pluripotent stem cells from mouse embryonic and adult fibroblast cultures by defined factors," Cell, 126(4):663-676, Epub Aug. 2006.
Takahashi et al., "Induction of pluripotent stem cells from adult human fibroblasts by defined factors," Cell, 131(5):861-72, Nov. 2007.
Takaki et al., "Strain-to-strain difference of V protein of measles virus affects MDA5-mediated IFN-β-inducing potential," Mol. Immunol., 48(4):497-504, Jan. 2011.

(56) References Cited

OTHER PUBLICATIONS

Takeda et al., "Generation of measles virus with a segmented RNA genome," J. Virol., 80(9):4242-8, May 2006.
Takeda et al., "Recovery of pathogenic measles virus from cloned cDNA," Journal of Virology, 74(14):6643-7, Jul. 2000.
Tateishi et al., "Generation of insulin-secreting islet-like clusters from human skin fibroblasts," Journal of Biological Chemistry, 283(4):31600-31607, Nov. 2008.
Tateishi et al., "Stemming heart failure with cardiac- or reprogrammed-stem cells," J Cell Mol Med., 12(6A):2217-2232, Dec. 2008.
Thatava et al., "Indolactam V/GLP-1-mediated differentiation of human iPS cells into glucose-responsive insulin-secreting progeny," Gene therapy, 18(3):283-293, Mar. 2011.
Thatava et al., "Successful disease-specific induced pluripotent stem cell generation from patients with kidney transplantation," Stem Cell Res. Ther., 2(6):48, Dec. 2011.
Thatava et al., "Differentiation of Diabetic Patient-Specific iPS Cells into Insulin-Secreting Cells," Molecular Therapy, vol. 19, p. S121, abstract 311, May 2011.
Thatava et al., "Generation of glucose-responsive insulin-secreting cells from Type 1 Diabetes-specific induced pluripotent stem cells," 2011 Meeting on Stem Cell Engineering & Cell-based Therapies: Apr. 7-10, 2011, Cold Spring Harbor Laboratory, 25 slides.
Thatava et al., "Generation of insulin-secreting cells from human induced pluripotent stem cells," American Society of Gene and Cell Therapy 13th Annual Meeting, Washington, DC USA, May 19-22, 2010, 18 slides.
Thatava et al., "Generation of insulin-secreting cells from human induced pluripotent stem cells," Molecular Therapy, vol. 18, p. S246, abstract 633, May 2010.
Thatava et al., "Indolactam V/GLP-1-mediated differentiation of human iPS cells into glucose-responsive insulin-secreting progeny," Gene Therapy, 18:283-293, Mar. 2011.
Thatava et al., "Pancreatic differentiation of diabetic patient-specific iPS cells," American Society of Gene and Cell Therapy, 14th Annual Meeting, Seattle, WA, USA, May 18-21, 2011, 20 pages.
Thomson et al., "Embryonic stem cell lines derived from human blastocysts," Science, 282(5391):1145-1147, Nov. 1998.
Tiemann et al., "Optimal reprogramming factor stoichiometry increases colony numbers and affects molecular characteristics of murine induced pluripotent stem cells," Cytometry Part A, 79(6):426-435, Jun. 2011.
Ungerechts et al., "Lymphoma chemovirotherapy: CD20-targeted and convertase- armed measles virus can synergize with fludarabine," Cancer Res., 67(22):10939-47, Nov. 2007.
von Messling et al., "The hemagglutinin of canine distemper virus determines tropism and cytopathogenicity," J. Virol., 75(14):6418-27, Jul. 2001.
Vulliemoz and Roux, ""Rule of six": how does the Sendai virus RNA polymerase keep count?" Journal of Virology, 75(10):4506-4518, May 2001.
Wernig et al., "Neurons derived from reprogrammed fibroblasts functionall integrate into the fetal brain and improve symptoms of rats with Parkinson's disease," PNAS., 105(15):5856-5861, Apr. 15, 2008.
Wernig et al., "c-Myc is dispensable for direct reprogramming of mouse fibroblasts," Cell Stem Cell, 2(1):10-12, Jan. 2008.
Wolf and Goff, "TRIM28 mediates primer binding site-targeted silencing of murine leukemia virus in embryonic cells," Cell, 131(1):46-57, Oct. 2007.
Woltjen et al., "piggyBac transposition reprograms fibroblasts to induced pluripotent stem cells," Nature, 458(7239):766, Apr. 2009.
Wood et al., "Non-injection methods for the production of embryonic stem cell-embryo chimaeras," Nature, 365(6441):87-89, Sep. 1993.
Xu et al., "Phenotypic correction of murine hemophilia A using an iPS cell-based therapy," PNAS., 106(3):808-813, Jan. 2009.
Yaiw et al., "CD20-targeted measles virus shows high oncolytic specificity in clinical samples from lymphoma patients independent of prior rituximab therapy," Gene. Ther., 18(3):313-7, Mar. 2011.
Yamada et al., "Embryonic stem cell therapy of heart failure in genetic cardiomyopathy," Stem Cells, 26:2644-2653, Oct. 2008.
Yamada et al., "Induced pluripotent stem cell intervention rescues ventricular wall motion disparity, achieving biological cardiac resynchronization post-infarction," J Physiol., 591(17)4335-4349, Epub, Apr. 8, 2013.
Yamanaka, "Pluripotency and nuclear reprogramming," Philos Trans R Soc Lond B Biol Sci., 363(1500):2079-2087, Jun. 2008.
Yáñez-Muñoz et al., "Effective gene therapy with nonintegrating lentiviral vectors," Nat Med., 12(3):348-353, Mar. 2006.
Yonemitsu et al., "DVC1-0101 to treat peripheral arterial disease: a Phase I/IIa open-label dose-escalation clinical trial," Mol. Ther., 21(3):707-14, Mar. 2013.
Yu et al., "Hepatocyte-like cells differentiated from human induced pluripotent stem cells: relevance to cellular therapies," Stem Cell Res., 9(3):196-207, Epub Jun. 28, 2012.
Yu et al., "Induced pluripotent stem cell lines derived from human somatic cells," Science, 318(5858):1917-1920, print Dec. 2007, Epub Nov. 2007.
Yu et al., "Transient gene expression mediated by integrase-defective retroviral vectors," Biochem Biophys Res Commun., 368(4):942-947, Epub Feb. 13, 2008.
Yuasa and Fukuda, "Recent advances in cardiovascular regenerative medicine: the induced pluripotent stem cell era," Expert Rev Cardiovasc Ther., 6(6):803-810, Jul. 2008.
Zawalich and Zawalich, "Effects of glucose, exogenous insulin, and carbachol on C-peptide and insulin secretion from isolated perifused rat islets," J Biol Chem., 277(29):26233-26237, Epub May 13, 2002.
Zhou et al., "Generation of induced pluripotent stem cells using recombinant proteins," Cell Stem Cell, 4(5):381-4, May 2009.
Zufferey et al., "Multiply attenuated lentiviral vector achieves efficient gene delivery in vivo," Nat. Biotechnol., 15(9):871-875, Sep. 1997.
Cataliotti et al., "Long-term cardiac pro-B-type natriuretic peptide gene delivery prevents the development of hypertensive heart disease in spontaneously hypertensive rats," Circulation, Mar. 14, 2011, 123(12):1297-1305.
Cattaneo et al., "Altered transcription of a defective measles virus genome derived from a diseased human brain," EMBO Journal, Mar. 1987, 6(3):681-688.
Chan et al., "Induction of a human pluripotent state with distinct regulatory circuitry that resembles preimplantation epiblast," Cell Stem Cell, Dec. 5, 2013, 13(6):663-675.
Devaux et al., "Measles Vectors as a New Platform for the Production of Induced- pluripotent stem cells (iPSCs)," Abstract, Presented at Proceedings of IMV 2013, Minneapolis, MN, USA, May 13, 2013, 1 page.
Devaux et al., "Measles Vectors as a New Platform for the Production of Induced- pluripotent stem cells (iPSCs)," Abstract, Presented at Proceedings of Measles Virus Minisymposia, Annecy, France, Sep. 9-10, 2013, 1 page.
Driscoll et al., "Measles virus, a new tool for nuclear reprogramming: a proof of principle," Abstract, Presented at Proceedings of IMV 2014, Minneapolis MN, USA, May 12, 2014, 1 page.
Driscoll et al., "Nuclear reprogramming with a non-integrating human RNA virus," Abstract, Presented at Proceedings of IMV 2015, Minneapolis, MN, USA, May 11, 2015, 1 page.
El-Khatib et al., "Tumor-free transplantation of patient-derived induced pluripotent stem cells progeny for customized islet regeneration," Stem Cells Transl. Medicine, May 2016, 5(5):694-702.
Folmes et al., "Somatic oxidative bioenergetics transitions into pluripotency-dependent glycolysis to facilitate nuclear reprogramming," Cell Metabolism, Aug. 3, 2011, 14(2):264-271.
Gafni et al., "Derivation of novel human ground state naive pluripotent stem cells," Nature, Dec. 12, 2013, 504(7479):282-286.
Garber, "Riken suspends first clinical trial involving induced pluripotent stem cells," Nat. Biotechnology, Sep. 2014, 33(9):890-891.
Hu et al., "Current reprogramming systems in regenerative medicine: from somatic cells to induced pluripotent stem cells," Regen. Medicine, Dec. 18, 2015, 11(1):105-132.
JapanTimes.co.jp [online], "First iPS cell transplant patient makes progress one year on," Oct. 2, 2015, retrieved on May 10, 2022,

(56) References Cited

OTHER PUBLICATIONS retrieved from URL<https://www.japantimes.co.jp/news/2015/10/02/national/science-health/first-ips-cell-transplant-patient-makes-progress-one-year/>, 2 pages.

Kärber, "Contribution to the collective treatment of pharmacological series experiments," Arch. Exp. Pathol. Pharmakologie, 1931, 162(4):480-483 (with Machine English Translation).

Kimbrel et al., "Current status of pluripotent stem cells: moving the first therapies to the clinic," Nat. Rev. Drug Discovery, Sep. 22, 2015, 14(10):681-692.

Lin et al., "A chemical platform for improved induction of human iPSCs," Nat. Methods, Nov. 2009, 6(11):805-808.

Mandai et al., "Autologous Induced Stem-Cell-Derived Retinal Cells for Macular Degeneration," N. Engl. J. Medicine, Mar. 16, 2017, 376(11):1038-1046.

Moszynski, "Measles campaign's "historic victory" for global public health," BMJ, Jan. 25, 2007, 334:177, 2 pages.

Normile, "iPS cell therapy reported safe," Science, Mar. 17, 2017, 355(6330):1109-1110.

Pagliuca et al., "Generation of functional human pancreatic β cells in vitro," Cell, Oct. 9, 2014, 159(2):428-439.

PCT International Preliminary Report on Patentability in International Application No. PCT/US2017/054268 dated Apr. 2, 2019, 9 pages.

Pera, "Stem cells: The dark side of induced pluripotency," Nature, Mar. 3, 2011, 471(7336):46-47.

Rezania et al., "Reversal of diabetes with insulin-producing cells derived in vitro from human pluripotent stem cells," Nat. Biotechnology, Sep. 11, 2014, 32:1121-1133.

Sakuma et al., "Rhesus monkey TRIM5alpha restricts HIV-1 production through rapid degradation of viral Gag polyproteins," Nat. Medicine, May 2007, 13(5):631-635.

Schlaeger et al., "A comparison of non-integrating reprogramming methods," Nat. Biotechnology, Dec. 1, 2014, 33(1):58-63.

Shi et al., "Induced pluripotent stem cell technology: a decade of progress," Nat. Rev. Drug Discovery, Dec. 16, 2016, 16:115-130.

Shimojima et al., "Use of CD134 as a primary receptor for the feline immunodeficiency virus," Science, Feb. 20, 2004, 303(5661):1192-1195.

Thatava et al., "Intrapatient variations in type 1 diabetes-specific iPS cell differentiation into insulin-producing cells," Mol. Therapy, Nov. 27, 2012, 21(1):228-239.

Theunissen et al., "Systematic identification of culture conditions for induction and maintenance of naive human pluripotency," Cell Stem Cell, Jul. 24, 2014, 15(4):471-487.

Toth et al., "Protein kinase PKR mediates the apoptosis induction and growth restriction phenotypes of C protein-deficient measles virus," J. Virology, Nov. 12, 2008, 83(2):961-968.

Trounson et al., "Pluripotent stem cells progressing to the clinic," Nat. Rev. Mol. Cell Biology, Feb. 23, 2016, 17(3):194-200.

Valamehr et al., "Platform for induction and maintenance of transgene-free hiPSCs resembling ground state pluripotent stem cells," Stem Cell Report, Mar. 6, 2014, 2(3):366-381.

Ware et al., "Derivation of naïve human embryonic stem cells," Proc. Natl. Acad. Sci. USA, Mar. 12, 2014, 111(12):4484-4489.

Rallabandi et al., "miRNA-mediated control of exogenous OCT4 during mesenchymal-epithelial transition increases measles vector reprogramming efficiency," Mol. Ther. Methods Clin. Development, 24:48-61, Nov. 29, 2021.

Rallabandi et al., "Supplemental Information: miRNA-mediated control of exogenous OCT4 during mesenchymal-epithelial transition increases measles vector reprogramming efficiency," Mol. Ther. Methods Clin. Development, Nov. 29, 2021, 9 pages.

Wang et al., "Measles vector as a multiple genes delivery platform facilitating iPSC reprogramming," Gene Therapy, 26(5):151-164, Feb. 4, 2019.

Wang et al., "Supplementary Information: Measles vector as a multiple genes delivery platform facilitating iPSC reprogramming," Gene Therapy, Feb. 4, 2019, 6 pages.

Bernal, "RNA-based tools for nuclear reprogramming and lineage-conversion: towards clinical applications," J. Cardiovasc. Transl. Res., Dec. 2013, 6(6):956-968.

Hu, "Vectorology and factor delivery in induced pluripotent stem cell reprogramming," Stem Cells Dev., Jun. 2014, 23(12):1301-1315.

Yue et al., "Reprogramming of somatic cells induced by fusion of embryonic stem cells using hemagglutinating virus of Japan envelope (HVJ-E)," Biochem. Biophys. Res. Commun., Apr. 2010, 394(4):1053-1057.

\* cited by examiner

| | | | | | | | | |
|---|---|---|---|---|---|---|---|---|
| S | N | P/V/C | OCT4 | M | F | cMYC | GFP | L |
| T | N | P/V/C | OCT4 | M | F | KLF4 | GFP | L |
| U | N | P/V/C | OCT4 | M | F | GFP | cMYC | L |
| V | N | P/V/C | OCT4 | M | F | GFP | KLF4 | L |

S     T     U     V

| | | | | | | | | |
|---|---|---|---|---|---|---|---|---|
| W | N | P/V/C | SOX2 | M | F | cMYC | GFP | L |
| X | N | P/V/C | SOX2 | M | F | KLF4 | GFP | L |
| Y | N | P/V/C | SOX2 | M | F | GFP | cMYC | L |
| Z | N | P/V/C | SOX2 | M | F | GFP | KLF4 | L |

W     X     Y     Z

RF1, RF2 and RF3 = OCT4, SOX2, or KLF4 in order to have all three genes expressed in one vector. RF2-RF3=bicistron of 2 factors. O=OCT4, S=SOX2, K=KLF4

VIRAL VECTORS FOR NUCLEAR REPROGRAMMING

CROSS-REFERENCE TO RELATED APPLICATION

This application is a National Stage application under 35 U.S.C. § 371 of International Application No. PCT/US2017/054268, having an International Filing Date of Sep. 29, 2017, which claims the benefit of the filing date of U.S. Provisional Application No. 62/402,310, filed on Sep. 30, 2016. The disclosures of the prior applications are considered part of (and are incorporated by reference in) the disclosure of this application.

STATEMENT REGARDING FEDERAL FUNDING

This invention was made with government support under AI105233 awarded by the National Institutes of Health. The government has certain rights in the invention.

SEQUENCE LISTING

This document contains a sequence listing that has been submitted electronically as an ASCII text file. The ASCII text file, created on Feb. 24, 2022, is 1 kilobytes in size. The material in the ASCII text file is hereby incorporated by reference in its entirety.

BACKGROUND

1. Technical Field

This document relates to materials and methods involved in making and using induced pluripotent stem cells.

2. Background Information

The induced pluripotent stem cell technology allows for derivation of patient-specific pluripotent stem cells from adult somatic cells. Human induced pluripotent stem cells (iPSCs) have great potential to replace non-functioning tissues due to their unique capability of giving rise to any cell types of the body. Generation of iPSCs from the patient's own tissues allows novel autologous stem cell therapies, while circumventing immunological mismatch and ethical issues associated with the use of an embryonic cell source. iPSCs can also be used as a research tool.

SUMMARY

This document provides materials and methods for making and using induced pluripotent stem cells (iPSCs). For example, this document provides vectors for reprogramming somatic cells into iPSCs, methods for obtaining iPSCs, and methods for using iPSCs.

As described herein, a measles virus (MV) vector having multiple reprogramming factors (RFs) can be used to reprogram safely and efficiently a somatic cell into an iPSC. Notably, the introduction of a target sequence of a microRNA (miRNA; e.g., miR375) into the MV vector can effectively increase the efficiency of reprogramming and decrease the time of reprogramming. The materials and methods provided herein increase efficiency, safety, and specificity of nuclear reprogramming, as well as minimize the risk of tumorigenicity due to sustained expression of a reprogramming factor (RF; e.g., cMYC) or vector-integration-mediated insertional mutagenesis into the host genome. Thus, the materials and methods described herein provide a new, safe way of producing pluripotent stem cells that can be differentiated into various types of cells useful for regenerative medicine approaches to treating diabetes, cardiac, respiratory, and other diseases.

In one aspect, this document features a Paramyxoviridae viral vector for reprogramming somatic cells into iPSCs, wherein the vector comprises nucleic acid encoding a plurality of reprogramming factors and a nucleic acid sequence targeted by a microRNA (miRNA) associated with pluripotency. The Paramyxoviridae viral vector can be a measles virus vector. The plurality of reprogramming factors can comprise OCT4, SOX2, and KLF4. The plurality of reprogramming factors can comprise OCT4, SOX2, KLF4, and cMYC. The OCT4, SOX2, KLF4, and cMYC can comprise human OCT4, human SOX2, human KLF4, and human cMYC. The miRNA associated with pluripotency can be a miRNA expressed in the iPSCs. The miRNA expressed can be miR375. The miR375 can be a human miR375. The nucleic acid sequence targeted by miR375 can comprise SEQ ID NO:1. The nucleic acid sequence targeted by miR375 can comprise three to five repeats of SEQ ID NO:1.

In another aspect, this document features a method for producing an induced pluripotent stem cell in vitro, the method comprising (a) introducing a Paramyxoviridae viral vector into a somatic cell, wherein the vector comprises nucleic acid encoding a plurality of reprogramming factors and a nucleic acid sequence targeted by a microRNA (miRNA) expressed in iPSCs, and (b) culturing the somatic cell under conditions to produce the induced pluripotent stem cell. The vector can be a measles virus vector. The OCT4, SOX2, KLF4, and cMYC can comprise human OCT4, human SOX2, human KLF4, and human cMYC. The somatic cell can be a human somatic cell. The miRNA can be miR375. The miR375 can be a human miR375. The nucleic acid sequence targeted by miR375 can comprise SEQ ID NO:1. The nucleic acid sequence targeted by miR375 can comprise three to five repeats of SEQ ID NO:1. The culturing the somatic cell under conditions to produce an iPSC can comprise culturing the somatic cell for about 12 to about 15 days.

In another aspect, this document features a Paramyxoviridae viral vector for reprogramming somatic cells into iPSCs. The vector comprises, or consists essentially of, nucleic acid encoding a Paramyxoviridae leader sequence, nucleic acid encoding a Paramyxoviridae virus N polypeptide, nucleic acid encoding a Paramyxoviridae virus P polypeptide, nucleic acid encoding a Paramyxoviridae virus M polypeptide, nucleic acid encoding a Paramyxoviridae virus F polypeptide, nucleic acid encoding a Paramyxoviridae virus L polypeptide, nucleic acid encoding a Paramyxoviridae trailer sequence, and nucleic acid encoding a plurality of reprogramming factors located between the nucleic acid encoding the Paramyxoviridae virus F polypeptide and the nucleic acid encoding the Paramyxoviridae virus L polypeptide. The Paramyxoviridae viral vector can be a measles virus vector, and the Paramyxoviridae virus N polypeptide, the Paramyxoviridae virus P polypeptide, the Paramyxoviridae virus M polypeptide, the Paramyxoviridae virus F polypeptide, and the Paramyxoviridae virus L polypeptides can be measles virus polypeptides, wherein the Paramyxoviridae leader sequence can be a measles virus leader sequence, and wherein the Paramyxoviridae trailer sequence can be a measles virus trailer sequence. The plurality of reprogramming factors can comprise OCT4, SOX2, and KLF4. The plurality of reprogramming factors can comprise OCT4, SOX2, KLF4, and cMYC. The OCT4 can be a human OCT4 polypeptide, the SOX2 can be a human SOX2 polypeptide, the KLF4 can be a human KLF4 polypeptide, and the cMYC can be a human cMYC polypeptide. The vector can comprise a nucleic acid sequence targeted by a microRNA (miRNA) associated with pluripotency. The miRNA associated with pluripotency can be a miRNA expressed in the iPSCs. The miRNA can be miR375. The miR375 can be a human miR375. The nucleic acid sequence targeted by miR375 can comprise SEQ ID NO:1. The nucleic acid sequence targeted by miR375 can comprise three to five repeats of SEQ ID NO:1. The nucleic acid sequence targeted by the miRNA can be located between the nucleic acid encoding the Paramyxoviridae virus F polypeptide and the nucleic acid encoding the Paramyxoviridae virus L polypeptide. The nucleic acid sequence targeted by the miRNA can be located between the nucleic acid encoding the Paramyxoviridae virus F polypeptide and the nucleic acid encoding the plurality of reprogramming factors. The vector can lack nucleic acid encoding a measles virus H polypeptide. The vector can comprise nucleic acid encoding a fluorescent polypeptide located between the nucleic acid encoding the Paramyxoviridae virus P polypeptide and the nucleic acid encoding the Paramyxoviridae virus M polypeptide. The vector can comprise a nucleic acid sequence targeted by a microRNA (miRNA) associated with pluripotency, and the nucleic acid sequence targeted by the miRNA can be located between the nucleic acid encoding the Paramyxoviridae virus P polypeptide and the nucleic acid encoding the fluorescent polypeptide. The fluorescent polypeptide can be a GFP polypeptide.

In another aspect, this document features a method for producing an induced pluripotent stem cell in vitro. The method comprises, or consists essentially of, (a) introducing a vector into a somatic cell, and (b) culturing the somatic cell under conditions to produce the induced pluripotent stem cell. The vector is a Paramyxoviridae viral vector for reprogramming somatic cells into iPSCs. The vector comprises, or consists essentially of, nucleic acid encoding a Paramyxoviridae leader sequence, nucleic acid encoding a Paramyxoviridae virus N polypeptide, nucleic acid encoding a Paramyxoviridae virus P polypeptide, nucleic acid encoding a Paramyxoviridae virus M polypeptide, nucleic acid encoding a Paramyxoviridae virus F polypeptide, nucleic acid encoding a Paramyxoviridae virus L polypeptide, nucleic acid encoding a Paramyxoviridae trailer sequence, and nucleic acid encoding a plurality of reprogramming factors located between the nucleic acid encoding the Paramyxoviridae virus F polypeptide and the nucleic acid encoding the Paramyxoviridae virus L polypeptide. The Paramyxoviridae viral vector can be a measles virus vector, and the Paramyxoviridae virus N polypeptide, the Paramyxoviridae virus P polypeptide, the Paramyxoviridae virus M polypeptide, the Paramyxoviridae virus F polypeptide, and the Paramyxoviridae virus L polypeptides can be measles virus polypeptides, wherein the Paramyxoviridae leader sequence can be a measles virus leader sequence, and wherein the Paramyxoviridae trailer sequence can be a measles virus trailer sequence. The plurality of reprogramming factors can comprise OCT4, SOX2, and KLF4. The plurality of reprogramming factors can comprise OCT4, SOX2, KLF4, and cMYC. The OCT4 can be a human OCT4 polypeptide, the SOX2 can be a human SOX2 polypeptide, the KLF4 can be a human KLF4 polypeptide, and the cMYC can be a human cMYC polypeptide. The vector can comprise a nucleic acid sequence targeted by a microRNA (miRNA) associated with pluripotency. The miRNA associated with pluripotency can be a miRNA expressed in the iPSCs. The miRNA can be miR375. The miR375 can be a human miR375. The nucleic acid sequence targeted by miR375 can comprise SEQ ID NO:1. The nucleic acid sequence targeted by miR375 can comprise three to five repeats of SEQ ID NO:1. The nucleic acid sequence targeted by the miRNA can be located between the nucleic acid encoding the Paramyxoviridae virus F polypeptide and the nucleic acid encoding the Paramyxoviridae virus L polypeptide. The nucleic acid sequence targeted by the miRNA can be located between the nucleic acid encoding the Paramyxoviridae virus F polypeptide and the nucleic acid encoding the plurality of reprogramming factors. The vector can lack nucleic acid encoding a measles virus H polypeptide. The vector can comprise nucleic acid encoding a fluorescent polypeptide located between the nucleic acid encoding the Paramyxoviridae virus P polypeptide and the nucleic acid encoding the Paramyxoviridae virus M polypeptide. The vector can comprise a nucleic acid sequence targeted by a microRNA (miRNA) associated with pluripotency, and the nucleic acid sequence targeted by the miRNA can be located between the nucleic acid encoding the Paramyxoviridae virus P polypeptide and the nucleic acid encoding the fluorescent polypeptide. The fluorescent polypeptide can be a GFP polypeptide.

Unless otherwise defined, all technical and scientific terms used herein have the same meaning as commonly understood by one of ordinary skill in the art to which this disclosure belongs. Methods and materials are described herein for use in the present disclosure; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Figures 1A, 1B:
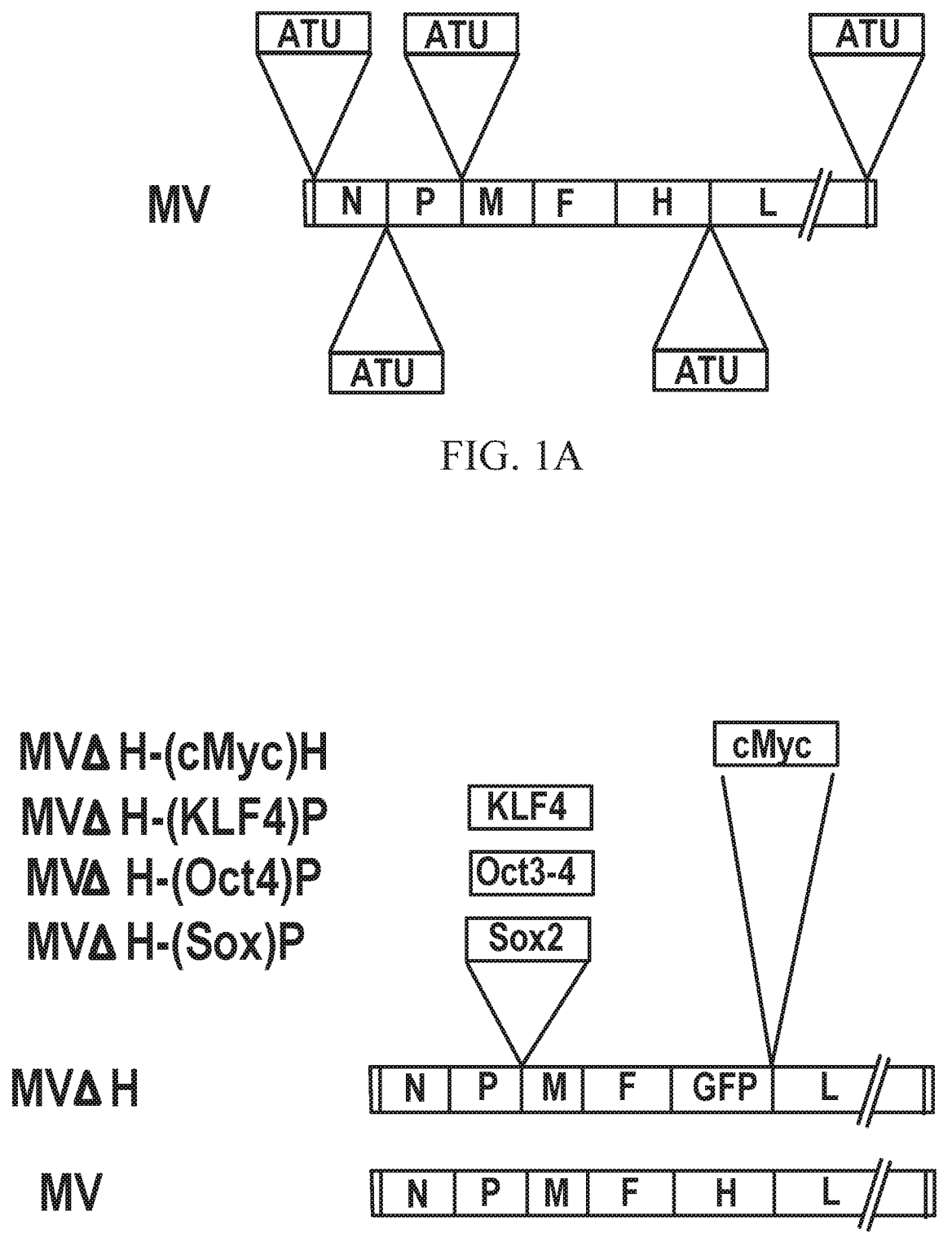

FIGS. 1A-1B shows schematics of the measles virus cDNA genome. FIG. 1A is a representation of a MV genome indicating the different positions of the additional transcription unit (ATU). Five different genomes are available for future cloning. FIG. 1B is a representation of the measles vector where the hemagglutinin gene was substituted by the GFP gene and indicating the insertion of the different reprogramming factors (RFs) in the measles genome (top genomes, MVΔH). Bottom genome (MV) represents standard measles virus genome containing the leader sequence, N gene, P gene, M gene, F gene, H gene, L gene, and trailer sequence.

FIG. 2A shows genome structures of MV vectors containing 2 RFs. The top four genomes of MV express OCT4 in ATU after P and either cMYC/GFP or KLF4/GFP combination in position lower position in the genome instead of H/(ATU)H. The bottom four genomes of MV expressing SOX2 in ATU after P and either cMYC/GFP or KLF4/GFP combination in position lower position in the genome instead of H/(ATU)H. Pictures of the rescued virus are shown below the vectors.

Every reprogramming attempt with MV2F vectors is made in conjunction with two lentiviral vectors expressing the two complementary factors. FIGS. 2B and 2C show MV(T)- and 4LV-derived iPSC clones that were cultured under feeder-free conditions on a matrigel-based slide and examined for expression of human pluripotent stem cell markers by immunofluorescence (B) or alkaline phosphatase (C).

FIG. 3A shows genome structures of MV vectors containing 3 and 4 RF. The top genome shows MVΔH(OSK)(GFP)H or 3F expressing OSK instead of H and GFP in the ATU after H. The middle genome shows MVΔH(GFP)(OSKM)H or 4F expressing OSKM in ATU after H and GFP instead of H. The bottom genome shows MV(GFP)NΔH(OSK)(cMYC)H or 4F* expressing OSK instead of H, cMYC in the ATU after H and GFP in the ATU in front of N. FIG. 3B shows pictures of the rescued virus, 3F and 4F. FIG. 3C shows an immunofluorescence analysis of OCT4, SOX2, KLF4 and cMYC expression. BJ cells (left and center panels) and Vero cells (right panels) were infected with the indicated vector for 36 hours and analyzed by immunostaining and confocal microscopy. The cells were fixed, permeabilized, and stained with antibodies to OCT4, SOX2, KLF4 or cMYC. Nuclei were counterstained by DAPI. GFP was expressed during infection. FIG. 3D shows an immunoblot analysis of OCT4, SOX2, and KLF4 expression. Vero, 293, and Hela cells infected with the indicated vector and after 36 hours cell extract were analyzed by SDS-PAGE. Antibodies against OCT4, SOX2, and KLF4 proteins were used. Uninfected Vero, 293 and Hela cells (—C) were used as controls.

FIG. 4A shows transduction optimization by spinoculation. BJ cells were incubated with the indicated MV vectors at a multiplicity of infection (MOI) of 1, in presence or not of 50 µl of LV(GFP), or polyI:C. Control transduction with 4LV (50 µL each)+LVGFP is used as control (4LV). Cells were spinoculated for 1 hour at 1000 rpm at room temperature (+) or incubated directly at 37° C. (−). Transduction efficiency is visualized by GFP expression 48 hours post transduction. FIG. 4B shows determination of the best MOI/toxicity ratio for reprogramming protocol. Cells were transduced with a MOI of 0.25 or 0.5 of the indicated vector for the single vector transduction and with a MOI of 0.25+0.25 for each vector for the double vector transduction. Cell and vectors were spinoculated for 1 hour at 1000 rpm. Transduction efficiency is visualized by GFP expression 48 hours post transduction.

FIG. 5A shows a genome structure of MV(OCT4) vector (top) and MV(OCT4)miR375 vector (bottom) containing the three mir375 target sequences (lines between P/V/C and OCT4 gene, represented below the genome). FIG. 5B shows pictures of the rescued virus MV(OCT4) and MV(OCT4)miR375 on Vero-H2 cells. FIG. 5C shows a growth curve of MV(OCT4) and MV(OCT4) miR375 on Vero-H2 cells. Titers of cell-associated and released virus produced upon infection of Vero-H2 cells with MV(OCT4) (white columns) or MV(OCT4)miR375 (black columns), determined at 24 hours, 48 hours, and 72 hours post-infection by $TCID_{50}$ titration. FIG. 5D shows an immunoblot analysis of OCT4 expression. Vero cells were infected with the indicated vector for 24 and 48 hours, and cell extracts were analyzed by SDS-PAGE. OCT4 antibody against OCT4 protein was used. Uninfected Vero, (Non Inf) was used as control. FIG. 5E shows an immunofluorescence analysis of OCT4 expression. BJ cells were infected with the indicated vectors for 36 hours and analyzed by immunostaining and confocal microscopy. The cells were fixed, permeabilized, and stained with antibody to OCT4. GFP was expressed during infection. Nuclei were counterstained by DAPI. FIG. 5F shows miR375 expression reduce propagation of MV(OCT4)miR375 in 293-H cells. 293 cells expressing the hemagglutinin were transfected with miR375, miR control or water for 12 hours before being infected with MV(OCT4) or MV(OCT4)miR375 at different MOI. Cells and supernatants were harvested at 72 hours and viral titers were determined by TCID50 titration.

FIG. 6A shows reprogramming of BJ cells. BJ cells were infected with MV(OCT4) or MV(OCT4)miR375 (middle and right panels, respectively) and three LV encoding SOX2, KLF4 and cMYC, or four LV encoding OCT4, SOX2, KLF4 and cMYC (left panels). Cells were observed under light microscopy and pictures of iPSC-like clones were taken at different time points, as indicated. Day 15 and 20, early iPSC-like colonies were detected. FIG. 6B shows iPSC-like clone does not express GFP. BJ cells were infected with MV(OCT4) miR375 and three LV encoding SOX2, KLF4 and cMYC. Light (left) and fluorescent (middle) and merged (right) microscopy pictures of an early iPSC-like clone detected at day 15 post-transduction. FIG. 6C shows loss of viral gene expression at early passage in MV(OCT4)miR375-iPSC like derived clones. Nucleoprotein (N) mRNA expression levels were analyzed in iPSC clones by RT-PCR at early passages 2 and 3. Controls: (+) BJ cells infected with MV(OCT4), (−) 4LV-derived iPSC (4LV), (w) water. FIG. 6D shows faster elimination of MV(OCT4)miR375 in iPSC. iPSC were infected with MV(OCT4) or MV(OCT4)miR375, passage several time and presence of virus was detected by RT-PCR. Nucleoprotein (N) and Phosphoprotein (P) mRNA expression levels were determined at passage 1, 2, 3, 4, and 5. Control: (w) water. GAPDH mRNA is an internal control.

FIG. 7A shows two MV(OCT4)mir375-, one MV(OCT4)- and one LV-derived iPSC clones were cultured under feeder-free conditions on a matrigel-based slide and examined for expression of human pluripotent stem cell markers by immunofluorescence. Scale bars indicate 50 µm. FIG. 7B shows RT-PCR analysis assessing transcription of key pluripotency-associated genes (OCT4, SOX2, KLF4, NANOG, GDF3, hTERT, cMYC) using total cellular RNA of the same four iPSC clones. GAPDH is the cellular internal control, and water is the negative control. FIG. 7C shows two MV(OCT4)mir375-, one MV(OCT4)- and one LV-derived iPSC clones were analyzed by immunofluorescence for lineage markers for three germ layers (endoderm, mesoderm and ectoderm). iPSC clones were spontaneously differentiated through embryoid body formation. Pluripotency of derived iPS clones was verified by generation of cells of ectoderm (β-III tubulin, top row), endoderm (FOXA2, middle row), and mesoderm (CD31, bottom row) upon spontaneous differentiation. Nuclei were counterstained by DAPI. Scale bars indicate 50 μm.

FIGS. 8A and B shows transduction efficiency of 4F*. BJ cells were transduced with 4F*, at a MOI of 0.5 or 0.25 and analyzed by microscopy or flow cytometry 48 h post transduction. FIG. 8A shows pictures of cells transduced by 4F* using light or fluorescent microscopy and FIG. 8B shows quantification of cell expressing GFP. FIG. 8C shows reprogramming of BJ cells with 4F*. BJ cells were transduced with 4F* at a MOI of 0.5 or 0.25 (top and bottom panels, respectively). Cells were observed under microscopy and pictures of iPSC-like clones were taken. Light (left) and fluorescent (middle) and merged (right) microscopy pictures of iPSC-like clone detected at day 20 post-transduction for iPSC-like clone with MOI of 0.5 (top panels) or 0.25 (bottom panels). FIG. 8D shows two 4F*- and one LV-derived iPSC clones were cultured under feeder-free conditions on a matrigel-based slide and examined for expression of human pluripotent stem cell markers by immunofluorescence. Scale bars indicate 50 μm. FIG. 8E shows one 4F*-derived iPSC clones were analyzed by immunofluorescence for lineage markers for three germ layers (endoderm, mesoderm and ectoderm). iPSC clone was spontaneously differentiated through embryoid body formation. Pluripotency of derived iPS clone was verified by generation of cells of endoderm (FOXA2, left), ectoderm (β-III tubulin, middle), and mesoderm (CD31, right) upon spontaneous differentiation. FIG. 8F shows genome structures of newly produced MV vectors containing 4 RFs with or without the miRNA target sequence. The top genome shows MV(GFP) PΔH(OSK)(cMYC)H 4F$^{(GFP)P}$ expressing OSK instead of H and cMYC in the ATU after H and GFP in the ATU between P and M. The bottom genome shows MV(GFP) Pmir375ΔH(OSK)(cMYC)H 4F$^{(GFP)Pmir375}$ expressing OSK instead of H and cMYC in the ATU after H and GFP in the ATU between Pmir375 and M. This latest genome has the three repeats of the miR375 target sequence in the 3'UTR region of the P gene.

FIG. 9A shows a genome structure of MV(OCT4) vector, (top), MV wild type (MVwt) virus (middle), and MV(OCT4) with Pwt gene (bottom). FIG. 9B shows a toxicity experiment. BJ cells were transduced with the indicated vector, at the indicated MOI. Cells were observed under light or fluorescence microscopy.

FIG. 12A shows an immunoblot analysis of OCT4, SOX2, KLF4, cMYC expression in 293T and human fibroblast (BJ) transduced cells with the indicated vector. Antibodies against the indicated proteins were used. Uninfected BJ and 293T cells (MOCK) were used as controls. Cells transduced with LVOCT4, LVSOX2, LVKLF4 and LVcMYC (4LV) were used as positive control. β-actin was used as loading control. FIG. 12B is an immunofluorescence analysis of OCT4, SOX2, KLF4, cMYC expression in transduced human fibroblast (BJ) cells with the indicated vector. Cells were stained with indicated antibodies. GFP was expressed during infection.

FIG. 15A shows a schematic of the reprogramming protocol for three factor MV vector+LVcMYC (top) and four factor MV vectors (bottom). FIG. 15B shows representative pictures of iPSC-like clones obtained ~15-20 days post-transduction with 3F+LVcMYC, 4F*, or 4F$^{(GFP)P}$ under light and fluorescence microscopy. FIG. 15C shows the average number of iPSC clones produced after transduction of 2.1×10$^5$ BJ cells with 4F* (top), 4F$^{(GFP)P}$ (middle), or 4F$^{(GFP)PmiR}$ (bottom), with (darker grey columns) or without (light columns) small molecules. Values reflect the mean of at least two to three biological replicates. FIG. 15D shows the average number of iPSC clones produced after transduction of 2.1×10$^5$ BJ cells with comparison of the number of clone between 4F* and 4F$^{(GFP)P}$, at 4 different multiplicity of infection. Values reflect the mean of at least two to three biological replicates. 3F and 4F can induce the production of iPSC-like clones.

FIG. 16A shows nucleoprotein (N) and phosphoprotein (P) mRNA expression levels were analyzed in 4F*-derived iPSC clones by RT-PCR at passages 1, 2, 3, 4, and 5. GAPDH is the cellular internal control, and water is the negative control. Controls: (BJ-MV) BJ cells infected with 4F*, (BJ) BJ mock infected. FIG. 16B shows a quantitative RT-PCR analysis of the relative expression of the N mRNA in two representative iPSC clones obtained in presence (clones #1 and #2) or absence (clones #3 and #4) of small molecules at passage 1, 3, and 5 (P1, P3 and P5; black, grey, and white columns, respectively). The right part of the graph represents a quantitative PCR from 4000 to 0 molecules vector cDNA genome. 4F* residual mRNA is not detectable after about 30-35 days post-transduction in most clones.

FIG. 18A shows two representatives for each 3F+LVcMYC, 4F*-, and 4F$^{(GFP)P}$-derived iPSC clones and one 4LV-derived iPSC control (4LV) analyzed by immunofluorescence for lineage markers for three germ layers (endoderm, mesoderm and ectoderm). iPSC clones were spontaneously differentiated through embryoid body formation. Pluripotency of derived iPSC clones was verified by generation of cells of ectoderm (β-III tubulin, green, top row), endoderm (FOXA2, second row), and mesoderm (CD31, bottom row) upon spontaneous differentiation. Clones were tested at passages 3-5. On the right, a high passage of two 4F*-derived iPSC clones, over passage 20, were also tested to confirm the stability of the iPSC clones. Scale bars indicate 50 µm. FIG. 18B shows four representatives 4F*-derived iPSC clones obtained with (2) or without (2) small molecules, and one 4LV-derived iPSC control (4LV) were analyzed by immunofluorescence for lineage markers for three germ layers (endoderm, mesoderm and ectoderm). iPSC clones were differentiated through guided differentiation using the STEMdiff™ Trilineage Differentiation kit. Pluripotency of derived iPSC clones was verified by generation of cells of ectoderm (Nestin and Pax-6, top row), endoderm (FOXA2 and SOX17, second row), and mesoderm (NCAM and Brachyury, bottom row) upon guided differentiation. Clones were tested at passage 4. Control staining was done on not differentiated iPSCs (right three panels, iPSCs). Scale bars indicate 50 µm.

DETAILED DESCRIPTION

Figure 2A:
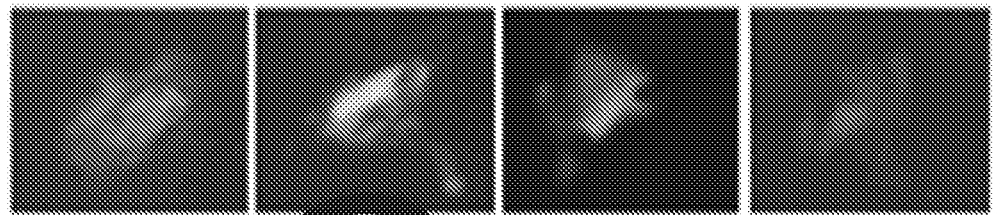
FIGS. 2A and 2B show MV vectors expressing 2 RFs (MV2F) and iPSC derived clones analysis.
Figure 2A:
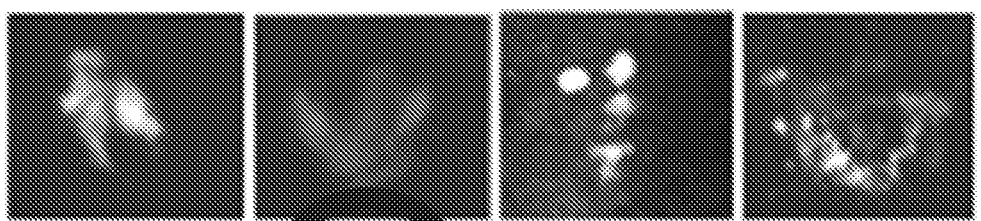
Figure 2B:
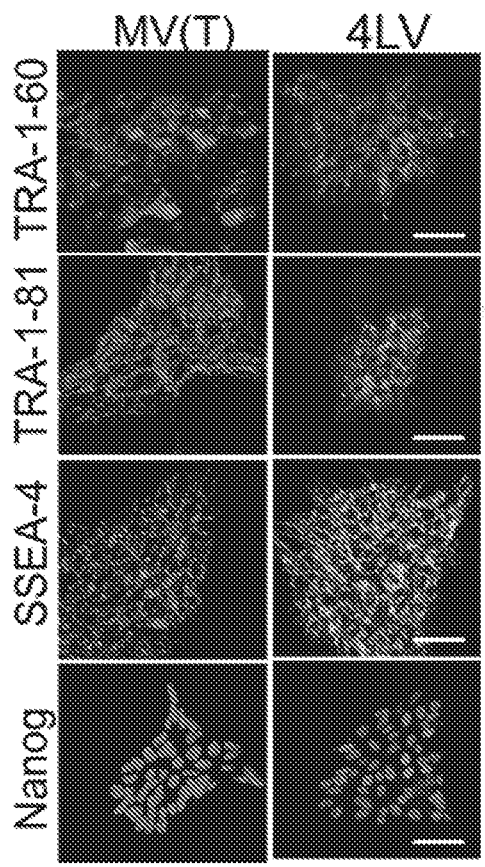
Figure 2C:
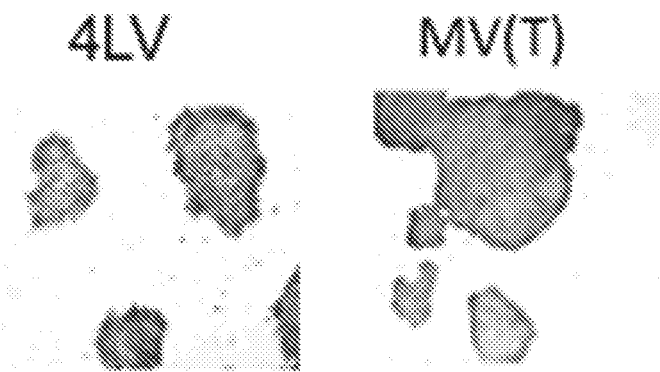
Figure 2D:
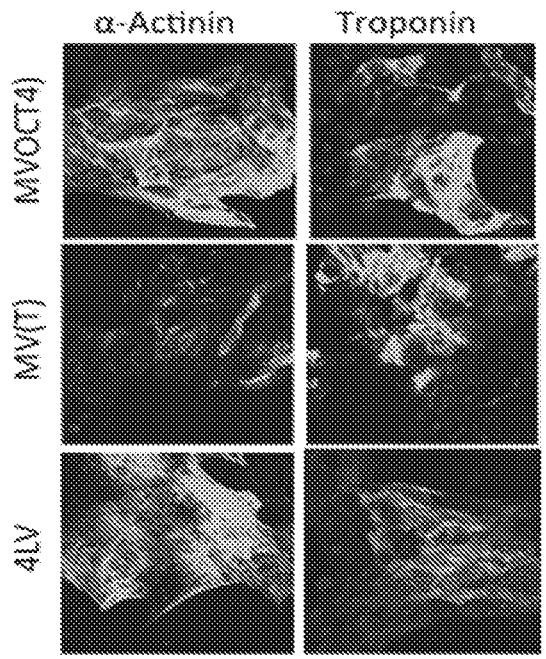
FIG. 2D shows MV(T)-, MV(OCT4)- and 4LV-derived iPSC clones analyzed for cardiac differentiation by immunofluorescence for cardiac makers. iPSC after cardiac differentiation were fixed, permeabilized, and stained with antibody to α-actinin or troponin. Nuclei were counterstained by DAPI.
Figure 2E:
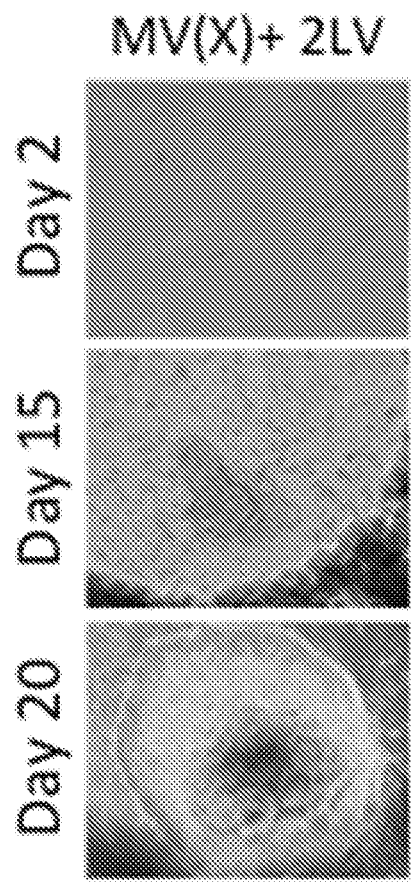
FIG. 2E shows reprogramming of BJ cells with MV(X)+2LV. BJ cells were infected with MV(X) and 2LV encoding, OCT4 and cMYC. Cells were observed under light microscopy and pictures of iPSC-like clones were taken at different time points, as indicated. Day 15, early iPSC-like colonies were detected.

This document provides materials and methods for making and using iPSCs. For example, this document provides reprogramming vectors (e.g., MV based vectors) for reprogramming somatic cells into iPSCs, methods for producing iPSCs, and methods for using iPSCs. In some cases, a reprogramming vector provided herein can be introduced (e.g., transduced, microinjected, infected, transfected, or electroporated) into a somatic cell to produce iPSCs (e.g., in vitro). For example, a reprogramming vector can be introduced into a somatic cell, and the somatic cell can be cultured under conditions that reprogram the somatic cell and produce an iPSC. In some cases, an iPSC can be administered to a patient (e.g., human, non-human primate, dog, cat, or pig) in need of an autologous stem cell therapy. Examples of diseases and disorders that can be treated using autologous stem cell therapy include, for example, diabetes (e.g., type I and type II), cardiac disease, respiratory disease, and degenerative diseases (e.g., Alzheimer's disease (AD), amyotrophic lateral sclerosis (ALS), macular degeneration (AMD), multiple sclerosis (MS), muscular dystrophy (MD), Parkinson's disease, hematological disorders, autoimmune disease, infectious disease (e.g. HIV, HCV infected patient) and neurological diseases).

Any appropriate somatic cell can be reprogrammed into an iPSC using the materials and methods provided herein. A somatic cell can be a prenatal cell, juvenile cell, or an adult cell. In some cases, a somatic cell that can be reprogrammed into an iPSC using the materials and methods provided herein is an adult cell. Examples of somatic cells include, without limitation, fibroblasts, white blood cells, primary tumor cells, and any primary cell. In some cases, a somatic cell that can be reprogrammed into iPSCs using the materials and methods provided herein is a fibroblast. A somatic cell can be obtained from any appropriate species. Examples of species from which somatic cells can be obtained include, without limitation, humans, non-human primates (such as monkeys), dogs, cats, horses, cows, pigs, sheep, rabbits, mice, rats, ferrets, and bats. In some cases, a somatic cell that can be reprogrammed into an iPSC using the materials and methods provided herein can be obtained from a human. A somatic cell can be obtained from a patient in need of an autologous stem cell therapy.

A reprogramming vector provided herein (e.g., a vector for reprogramming somatic cells into iPSCs) can be any appropriate vector. A reprogramming vector can be a viral vector. A viral vector can be an integrating viral vector or a non-integrating viral vector. In some cases, a viral vector is a non-integrating viral vector. A viral vector can have a DNA genome or an RNA genome. In some cases, a viral vector has an RNA genome. A viral vector can have a segmented genome or a non-segmented genome. In some cases, a viral vector has a non-segmented genome. A viral vector can have a single-stranded genome or a double stranded genome. In some cases, a viral vector has a single stranded genome. A single stranded viral vector can have a negative-, positive-, or ambi-strand genome. In some cases, a single stranded viral vector has a negative-strand genome. For example, a reprogramming vector provided herein can be a non-integrating viral vector having a non-segmented, negative-strand RNA genome (e.g., viruses in the family Paramyxoviridae). Genera within the family Paramyxoviridae include Aquaparamyxovirus, Avulavirus, Ferlavirus, Henipavirus, Morbillivirus, Respirovirus, and Rubulavirus. A reprogramming vector can be based on a species in genus Morbillivirus (e.g., canine distemper virus (CDV), cetacean morbillivirus (CeMV), feline morbillivirus (FeMV), measles virus (MV), peste-des-petits-ruminants virus (PPRV), phocine distemper virus (PDV), rinderpest virus (RPV)). In some cases, a reprogramming vector can be a MV vector. A MV vector can be based on a wildtype MV or based on an attenuated MV (e.g., a MV vaccine). Other examples of viral vectors include, without limitation, retroviruses, lentiviruses, adenoviruses, adeno-associated viruses, Sendai viruses, and Baculoviral vectors.

A reprogramming vector provided herein (e.g., a vector for reprogramming somatic cells into iPSCs) can include one or more modifications. A reprogramming vector (e.g., a MV vector) can be deficient for the hemagglutinin (H) protein. For example, a MV vector can have the H gene inactivated or removed. A reprogramming vector (e.g., a MV vector) can be deficient for the fusion protein (F) protein. For example, a MV vector can have the F gene inactivated or removed. A reprogramming vector (e.g., a MV vector) can be deficient for the matrix (M) protein. For example, a MV vector can have the M gene inactivated or removed. A reprogramming vector (e.g., a MV vector) can include one or more mutations in the C protein. In some cases, a MV C protein can have a mutation at one or more of residues 25, 39, 44, 78, and/or 104 with respect to the sequence set forth in GenBank accession number: EU332921.1. For example, a MV C protein can have a P25L, T39S, R44G K78R, and/or M104T mutation. In some cases, a MV vector provided herein can include a R44G mutation. A reprogramming vector (e.g., a MV vector) can include one or more mutations in the V protein. In some cases, a MV V protein can have a mutation at one or more of residues 29, 46, 51, 54, 83, 97, 111, 146, 195, 219, 225, and/or 237 with respect to the sequence set forth in Genbank accession number: EU332921.1. For example, a MV V protein can have a V29I, D46E, K51R, E54K, S83P, S97P, H111Y, D146N, K195R, S219G E225G and/or G237S mutation.

A reprogramming vector provided herein (e.g., a vector for reprogramming somatic cells into iPSCs) can include one or more nucleic acid sequences encoding one or more (e.g., two, three, four, or more) RFs. ARF can be from the same species from which the somatic cell was obtained or from a different species. For example, human RFs can be used to reprogram somatic cells obtained from a human. A nucleic acid sequence encoding an RF can be present as an independent coding sequences or present in a polycistronic coding sequence. A polycistronic coding sequence is a nucleic acid sequence encoding a plurality (e.g., more than one, such as two, three, four, or more) proteins (e.g., RFs). When the RFs are present in independent coding sequences, they can be located together in the reprogramming vector or in different positions in the reprogramming vector. When RFs are present in a polycistronic coding sequence, a self-cleaving site (e.g., T2A, E2A, and F2A) can be included between the nucleic acid sequences encoding each RF. Examples of RFs that can be used to reprogramming a somatic cell into an iPSC include, without limitation, OCT3/4, KFL4, SOX2, MYC (e.g., cMYC, N-MYC or L-MYC), NANOG, GDF3, hTERT, PIN1, and LIN28. Additional examples of RFs can include those described elsewhere (see, e.g., WO 2010/017652). Examples of RF polypeptide sequences (and the nucleic acids encoding such polypeptides) can be found in the National Center for Biotechnology Information (NCBI) GenBank and in other in public databases. In some cases, a reprogramming vector provided herein can include a nucleic acid sequence encoding three RFs (e.g., OCT4, SOX2, and KLF4). In some cases, a reprogramming vector provided herein can include a nucleic acid sequence encoding four RFs (e.g., OCT4, SOX2, KLF4, and cMYC). For example, a MV vector can include a polycistronic coding sequence including human OCT4, human SOX2, human KLF4, and human cMYC, and having a 2A self-cleaving peptide between each RF.

In cases where the RFs are present in multiple cassettes, the RFs can be present on the same reprogramming vector or on separate reprogramming vectors. In some cases, additional RFs can be provided on one or more additional vectors. For example, OCT4 can be present on a MV vector and SOX2, KLF4 and cMYC can be present on one or more lentivirus vectors.

One or more RFs can be present at any appropriate location in the reprogramming vector provided herein (e.g., a vector for reprogramming somatic cells into iPSCs). In some cases, an RF can be located in an additional transcription unit (ATU). For example, an RF (e.g., OCT4) can be located in the ATU between P and M in a MV vector. Examples of ATUs where RFs can be localized are shown in FIG. 1A.

Expression of one or more RFs can be examined (e.g., to confirm expression and/or to evaluate expression levels) using any appropriate method. Expression of one or more RFs can be done at an mRNA level or at a protein level. Examples of methods that can be used to examine the expression of one or more RFs include, without limitation, RT-PCR (e.g., standard RT-PCR, real time RT-PCR, and/or RT-qPCR), immunostaining, flow cytometry, northern blotting, and western blotting.

The presence of one or more RFs in a reprogramming vector provided herein can be effective to reprogram a somatic cell (e.g., a human, adult somatic cell) into an iPSC. For example, a somatic cell can be reprogrammed into an iPSC about 15 days to about 25 days (e.g., about 15 days to about 19 days, about 15 days to about 18 days, about 15 days to about 17 days, about 16 days to about 20 days, about 17 days to about 20 days, about 18 days to about 20 days, or about 16 days to about 18 days) following introduction of a reprogramming vector described herein. In some cases, iPSCs can be produced about 15 to about 20 days after introduction of a MV vector having one or more nucleic acid sequence encoding OCT4, SOX2, KLF4, and cMYC.

A reprogramming vector provided herein (e.g., a vector for reprogramming somatic cells into iPSCs) can include one or more (e.g., two, three, four, or more) nucleic acid sequences that are targeted by a miRNA. For example, a nucleic acid sequence that is targeted by a miRNA associated with pluripotency (e.g., a target sequence of a miRNA specifically expressed in the iPSC, and a target sequence of a human embryonic stem cell (ESC)-enriched miRNA) can be included within a reprogramming vector provided herein. In some cases, a miRNA associated with pluripotency is not expressed in a differentiated cell (e.g., a somatic cell). Examples of miRNAs associated with pluripotency, without limitation, miR375, miRNAs from the miR-302 cluster, the miR-17 family, miR-371-373 clusters, and the chromosome 19 miRNA cluster (C19MC). Additional miRNAs associated with pluripotency include those described elsewhere (see, e.g., Razak et al., *PLoS ONE.* 8:e73532 (2013)); Stadler et al., *Stem Cells Dev.* 19:935-50 (2010); and Hinton et al., *Stem Cells Dev.* 19:797-807 (2010)). In some cases, a reprogramming vector provided herein (e.g., a MV vector) includes a target sequence of miR375. A nucleic acid sequence that is targeted by miR375 can include the following nucleotide sequence: aaacaagcaagccgagcgcacu (SEQ ID NO:1). See, also, miRBase database number MIMAT0000728. For example, a nucleic acid sequence that is targeted by a miRNA associated with cellular tropism of the viral vector and/or a miRNA that targets a RF (e.g., an exogenous RF expressed from a reprogramming vector) can be included within a reprogramming vector provided herein. Examples of miRNAs that can reduce or eliminate expression of a RF include, without limitation, miR302a, miR367, miR372, miR517c, miR141, and miR523.

A nucleic acid sequence that is targeted by a miRNA (e.g., a nucleic acid sequence targeted by a miRNA associated with pluripotency) can be present in one or more (e.g., two, three, four, five, six, seven, eight, nine, ten, or more) copies in the reprogramming vector. In cases where multiple copies of a nucleic acid sequence that is targeted by a miRNA are present, the copies can be in tandem. For example, three to five tandem repeats of a target sequence of miR375 can be present in a MV vector. A nucleic acid sequence targeted by a miRNA associated with pluripotency can be present in any appropriate location in the reprogramming vector. Examples of locations in which a nucleic acid sequence that is targeted by a miRNA can be placed include, without limitation, in an untranslated region (e.g., the 3' UTR) of N, P, or L, and any of the reprogramming factors. For example, a target sequence of miR375 can be in the 3'UTR of P in a MV vector. For example, a target sequence of miR375 can be in the 3'UTR of a RF in a MV vector.

Figures 3A, 3B:
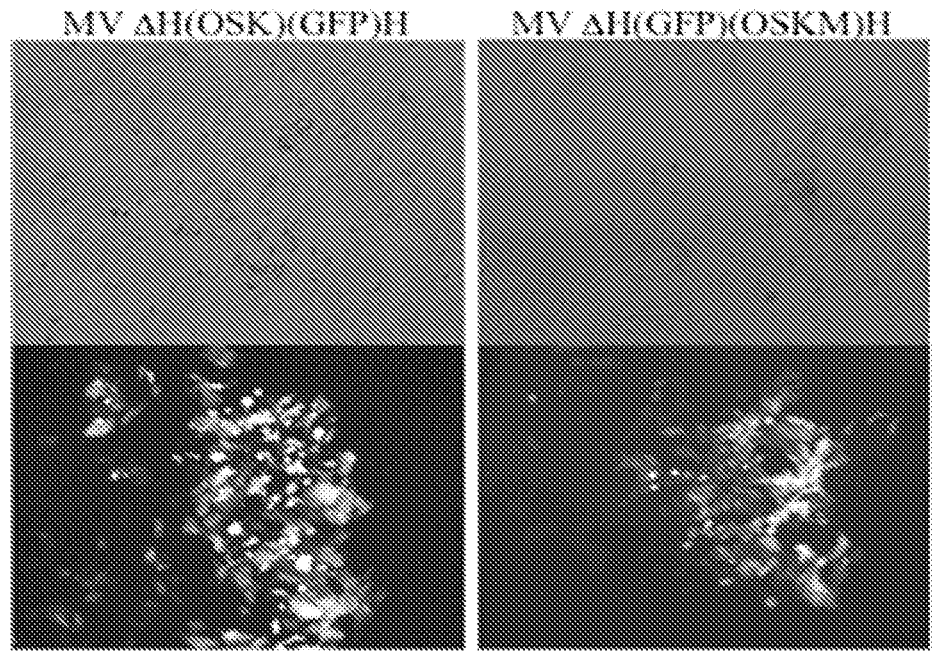
FIGS. 3A-3D show MV vectors expressing 3 and 4 RFs.
Figure 3C:
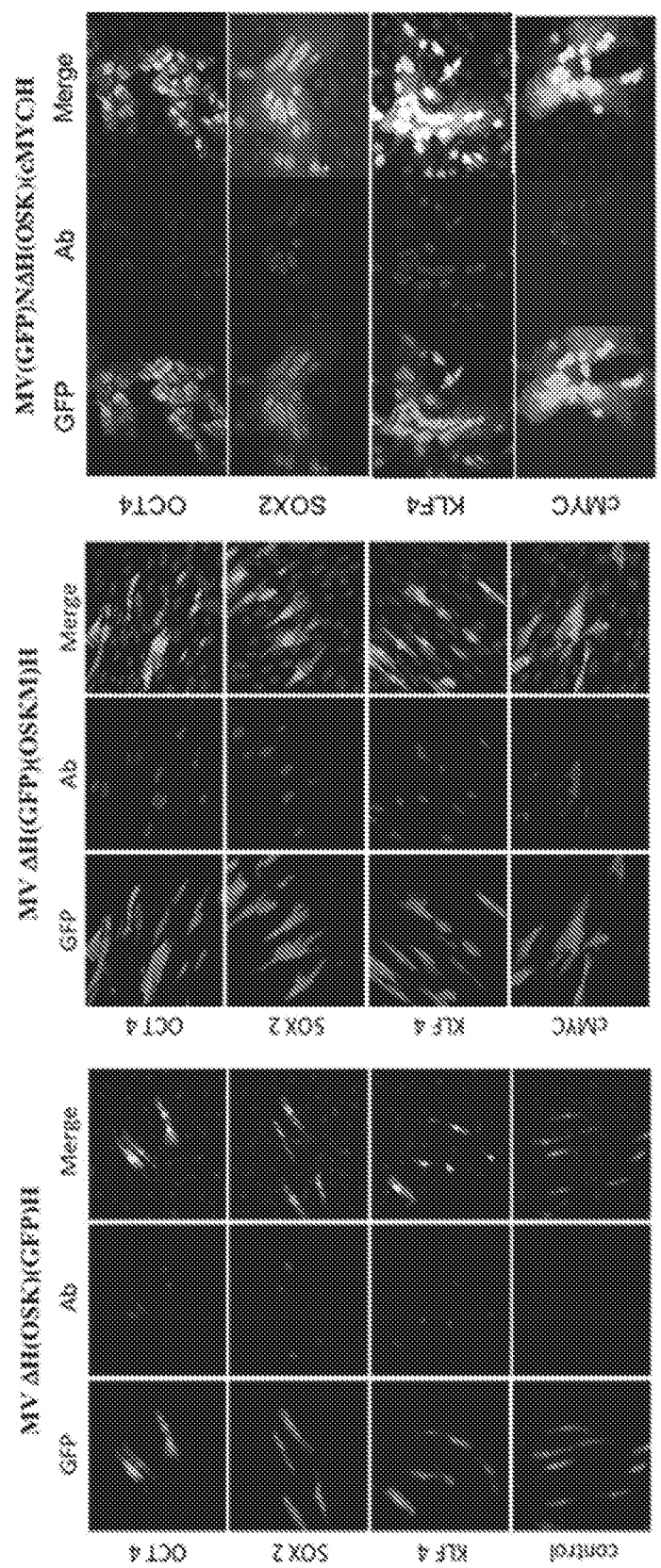

The presence of one or more nucleic acid sequences (N, P, or L) that are targeted by a miRNA in a reprogramming vector provided herein can be effective to reduce or eliminate the reprogramming vector from an iPSC. For example, a reprogramming vector can be eliminated from an iPSC after about 3 passages to about 8 passages (e.g., about 3 passages to about 7 passages, about 3 passages to about 6 passages, about 3 passages to about 5 passages, about 3 passages to about 4 passages, about 4 passages to about 8 passages, about 5 passages to about 8 passages, or about 6 passages to about 8 passages) of the iPSC. In some cases, a reprogramming vector can be eliminated from an iPSC after about 2 to about 3 passages of the iPSC. The reduction or elimination of a reprogramming vector from an iPSC can be evaluated using any appropriate method (e.g., RT-PCR (e.g., standard RT-PCR, real time RT-PCR, and/or RT-qPCR), immunostaining, flow cytometry, northern blotting, and western blotting). For example, the reprogramming vector genome (e.g., RNA or DNA), reprogramming vector transcripts (e.g., from viral genes or from nucleic acid sequences encoding RFs), and/or reprogramming vector proteins (e.g., from viral genes or from nucleic acid sequences encoding RFs) can be detected.

The presence of one or more nucleic acid sequences that are targeted by a miRNA in a reprogramming vector provided herein can be effective to enhance the efficiency of reprogramming a somatic cell (e.g., a human, adult somatic cell) into an iPSC. For example, a somatic cell can be reprogrammed into an iPSC about 8 days to about 20 days (e.g., about 12 days to about 20 days, about 13 days to about 20 days, about 14 days to about 20 days, about 15 days to about 20 days, about 12 days to about 19 days, about 12 days to about 18 days, about 12 days to about 17 days, about 12 days to about 16 days, or about 12 days to about 15 days) following introduction of a reprogramming vector described herein. In some cases, iPSCs can be produced about 12 to about 15 days after introduction of a MV vector having one or more nucleic acid sequence encoding OCT4, SOX2, KLF4, and cMYC and having three to five tandem repeats of a target sequence of miR375.

A reprogramming vector provided herein (e.g., a vector for reprogramming somatic cells into iPSCs) can include one or more detectable labels. Examples of detectable labels include, without limitation, nucleic acids expressing fluorescent proteins (green fluorescent protein gene (GFP), blue fluorescent protein gene (BFP), cyan fluorescent protein gene (CFP), yellow fluorescent protein gene (YFP), orange fluorescent protein gene (OFP), or red fluorescent protein gene (RFP, mCherry)). In some cases, a reprogramming vector provided herein (e.g., a MV vector) can include a nucleic acid expressing GFP.

A reprogramming vector provided herein can be a universal reprogramming vector. As used herein, a "universal" reprogramming vector can be used to transduce a broad range of cell types from many different species. In some cases, a universal reprogramming vector can be a pseudotyped (e.g., vectors with modified envelopes) vector. For example, a universal reprogramming vector can include an envelope glycoprotein from Vesicular stomatitis virus (VSV-G).

A reprogramming vector provided herein can be a targeted reprogramming vector. As used herein, a "targeted" reprogramming vector can be used to transduce a cell from a specific species and/or to transduce a specific cell type. In some cases, a targeted reprogramming vector can target a cell from an animal susceptible to CDV infection (e.g., dogs or ferrets) and can include the H and/or F genes from a canine distemper virus (CDV). For example, to target a canine cell, the H and/or F genes of a MV vector can be replaced with the H and/or F genes from a CDV. In some cases, a targeted reprogramming vector can target a specific cell type (e.g., B cells or tumor cells) and can include a molecule (e.g., a single-chain variable fragment (scFv) polypeptide) that binds to a receptor expressed by the targeted cell type. Examples of receptors expressed by specific cell types include, without limitation, CD20 (expressed by B-cells), EGFR (expressed by cells from glioblastoma multiforme), HER2/neu (expressed by tumor cells), CD38 (expressed by tumor cells), CEA (expressed by carcinoma cells). For example, a reprogramming vector targeting a B-cell can include a CD20 scFv.

The invention will be further described in the following examples, which do not limit the scope of the invention described in the claims.

EXAMPLES

Example 1: Measles Vectors Encoding Reprogramming Factors

Measles vectors encoding two, three and four factors were produced.

Measles Vectors Expressing Two Reprogramming Factors:

A measles virus (MV) vector encoding OCT4 in the ATU between P and M (MV(OCT4)) and another vector that expresses SOX2 in this same position (MV(SOX2)) were produced. Two other factors, KLF4 and cMYC, were cloned in a lower position, either instead of the H gene or in the ATU after H. Eight constructs were produced and vectors (MV(S) to MV(Z)) were rescued using our rescue cell line expressing MV-H (FIG. 2A).

Using a reprogramming protocol described elsewhere (Driscoll et al., *Stem Cell Research and Therapy* 6:48 (2015)), an iPSC-like clone with MV(OCT4)P-ΔH(KLF4)(GFP)H or MV(T) vector in combination with 2 LV encoding SOX2 and cMYC was obtained. The clone obtained with vector MV(T) was analyzed for pluripotency markers (FIGS. 2B and C), for its ability to spontaneously differentiate into the three germ lineages after EB formation (not shown), and its ability to differentiate into contracting cardiomyocytes through guided cardiac differentiation (FIG. 2D). The MV(T)-derived iPSC clone showed a similar profile than clone derived from MV(OCT4)-iPSC or 4LV-iPSC clones, indicating that this vector expressing two reprogramming factors could induce efficient nuclear reprogramming. Vector MV(SOX2)P-ΔH(KLF4)(GFP)H or MV(X) also induced nuclear reprogramming (FIG. 2E).

Measles Vectors Expressing Three and Four Reprogramming Factors

Vectors encoding three or four reprogramming factors using a polycistronic gene were developed. Two polycistronic genes (one encoded for OCT4-SOX2-KLF4 and the other encoded for all four factors OCT4-SOX2-KLF4-cMYC) were used. Self-cleaving T2A, E2A and F2A sites were respectively added between the genes. Three (3F) and four factors (4F) vectors were recovered (FIGS. 3A and B). A vector containing the 3F instead of H plus cMYC in the ATU after H was also produced. In order to visualize this vector, the GFP was the inserted in an ATU in front of N, this virus is another 4F vector (4F*). Expression of the three or four proteins (OCT4, SOX2, KLF4 and cMYC) was analyzed by immunofluorescence and confocal microscopy, and all proteins were expressed for the three viruses (FIG. 3C). Processing of the proteins was analyzed by western blot, and proper processing for OCT4, SOX2 and KLF4 was observed, indicating that cMYC was most likely correctly processed. Viral stocks were produced and viral titer for these vectors were only reduced by approximately one log compare to control vector, indicating that measles vector could accommodate expression and processing of a long polyprotein in its genome without affecting its replication.

Reprogramming Protocols

Figure 4A:
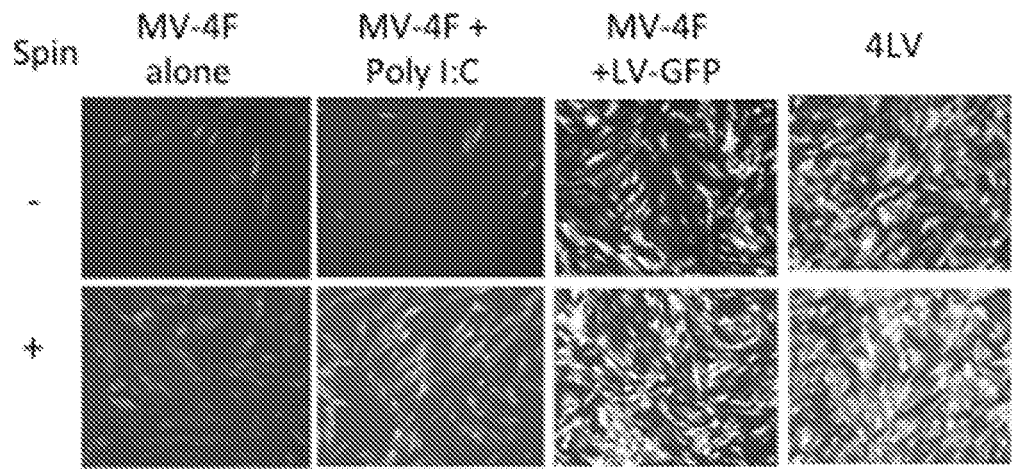
FIGS. 4A-4B show MV vectors transduction optimization.
Figure 4B:
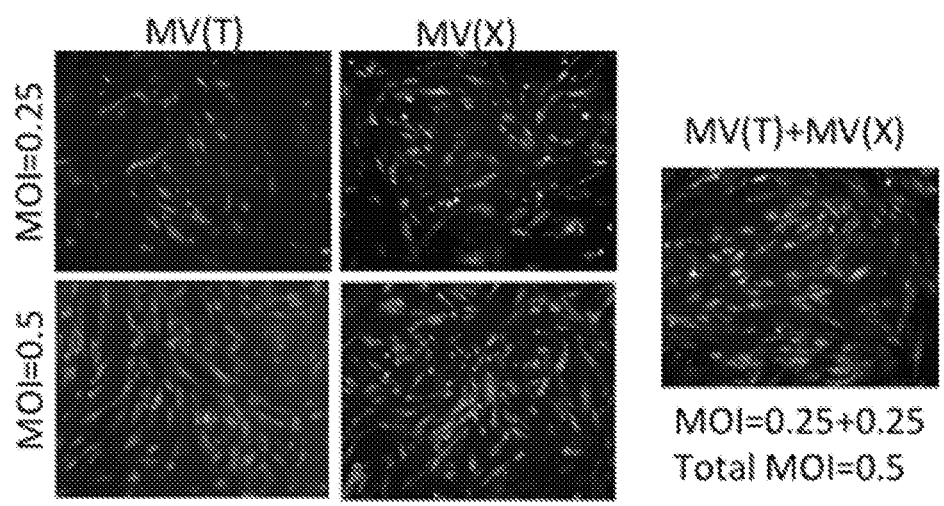

To increase transduction efficiency the spinoculation technique was established. To reduce MV-induced toxicity, the MOI of transduction was decreased. BJ cells, a neonatal foreskin human cells were purchased from the American Type Culture Collection (ATCC #CRL 2522), and were transduced with the 4F vector at a MOI of 1 instead of 6 as described elsewhere (Driscoll et al., Stem Cell Research and Therapy 6:48 (2015)). In order to induce TLR3 activation during MV reprogramming, the transduction was performed in presence of polyI:C (a TLR3 activator). Transduced cells were subjected or not to spinoculation at 1000 rpm for 1 hour at room temperature. The culture supernatants were replaced with BJ media every three days. After 9 days, optimized serum-free/feeder-free iPSC medium was added and replaced daily. The cells were monitored until reprogrammed cells form small colonies with iPSC morphology (one to two weeks after vector transduction). Pictures were taken at different stages. iPS-like clones were picked after three to four weeks, and plated at 1 colony/well in Matrigel-coated wells for further expansion. FIG. 4A shows increased transduction efficiency at 48 hours post-spinoculation compared to cells that were not spinoculated, and it was verified that addition of polyI:C does not affect the expression of measles proteins, as shown by GFP expression at 48 hours. This result indicated that polyI:C can be used in reprogramming with MV if needed, without affecting MV transduction efficiency. The most efficient MOI for each vector was determined. FIG. 4B shows that the transduction of BJ cells with MV(T) and MV(X) at a MOI of 0.25 and 0.5 was not toxic for both viruses. The viruses were mixed at MOI of 0.25 each, for a final total MOI of 0.5, with no observed toxicity. This result indicated that combinations of vectors expressing two factors can be used with reduced toxicity.

Example 2: MicroRNA Control of Viral Transcription by Measles Vectors

A safety mechanism in MV that increases reprogramming efficacy was designed. A specific microRNA target sequence was inserted into the MV genome to turn off the expression of the RFs after reprogramming. A miRNA highly expressed in the iPSC cell, miR375 (Razak et al., PLoS ONE. 8:e73532 (2013)) was used.

Rescue, Production and Assessment of the "MV-PmiRNA" MV Vectors

Figure 5A:
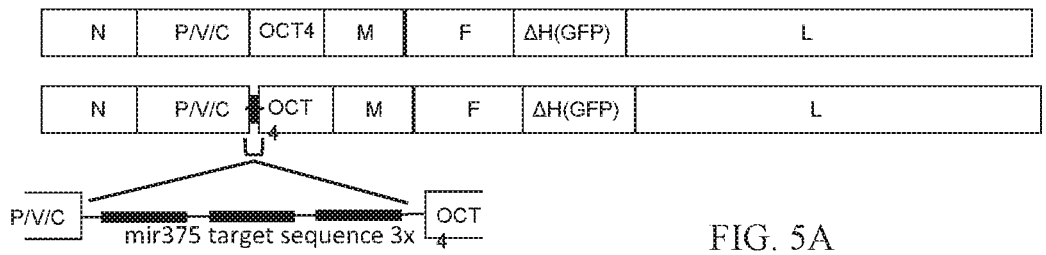
FIGS. 5A-5F show MV vector expressing miR375 target sequences.

Three repeats of the target sequence for the miR375 were cloned in the 3' non-translated region of the P gene in the full length MV(OCT4)P genome (FIG. 5A). A segment of MV genome including the P-miR375 modified 3'UTR region from an intermediate plasmid pRS313-PmiR375 was used to replace the 3'UTR region of the MV(OCT4) vector. The vector was named MV(OCT4)miR375.

Figure 5B:
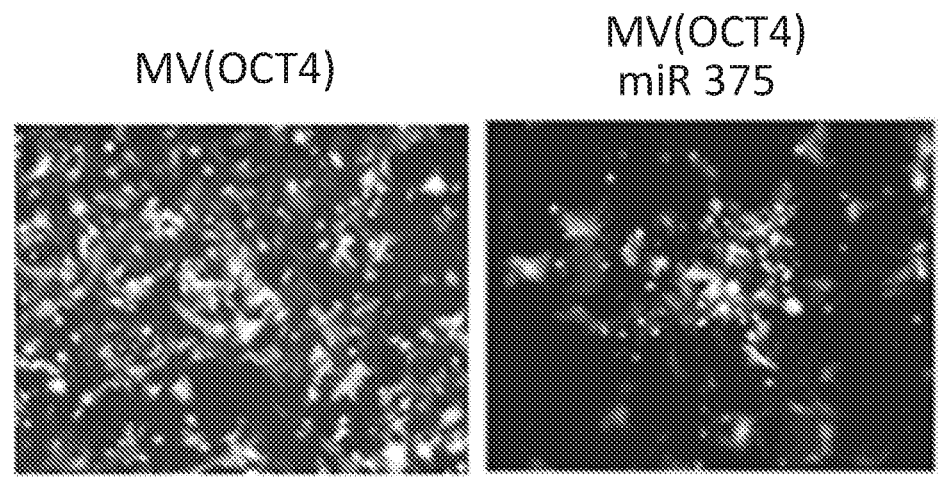
Figure 5C:
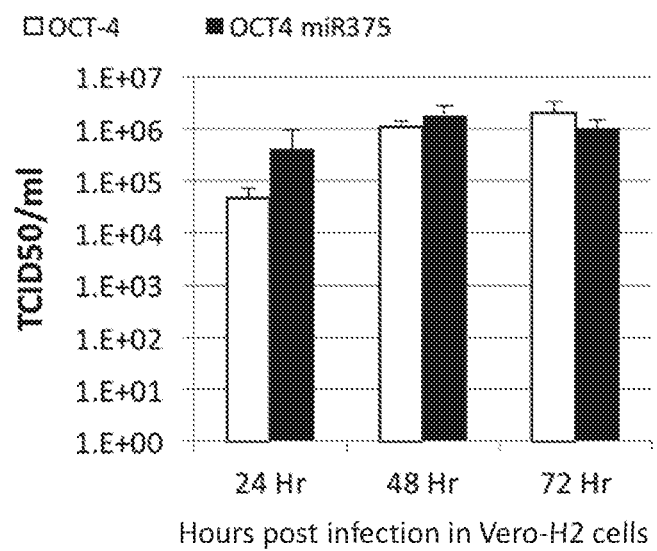

The MV(OCT4)miR375 vector was recovered (FIG. 5B) and its growth was compared to its parent vector, MV(OCT4). To rescue and propagate the MV-miRNA vectors, the rescue 293-3-46 cells (Radecke et al., EMBO J. 14:5773-84 (1995)) and African green monkey Vero (ATCC) were modified to express the MV-H glycoprotein (293-3-46-H2 and Vero-H2) (Driscoll et al., Stem Cell Res Ther. 6:48 (2015)). To verify that the expression of the miRNA does not affect viral replication in normal condition, propagation of the vectors was compared to the control MV(OCT4) on Vero-H2. Both vectors showed a comparable growth kinetic overtime in Vero-H2 cells, indicating that the addition of the miR375 target sequences did not affect the propagation of the vector in Vero-H2 cells (FIG. 5C).

Figure 5D:
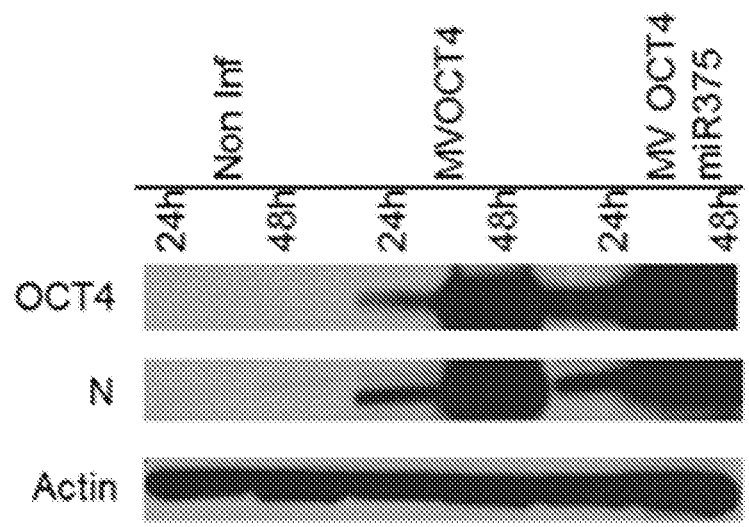
Figure 5E:
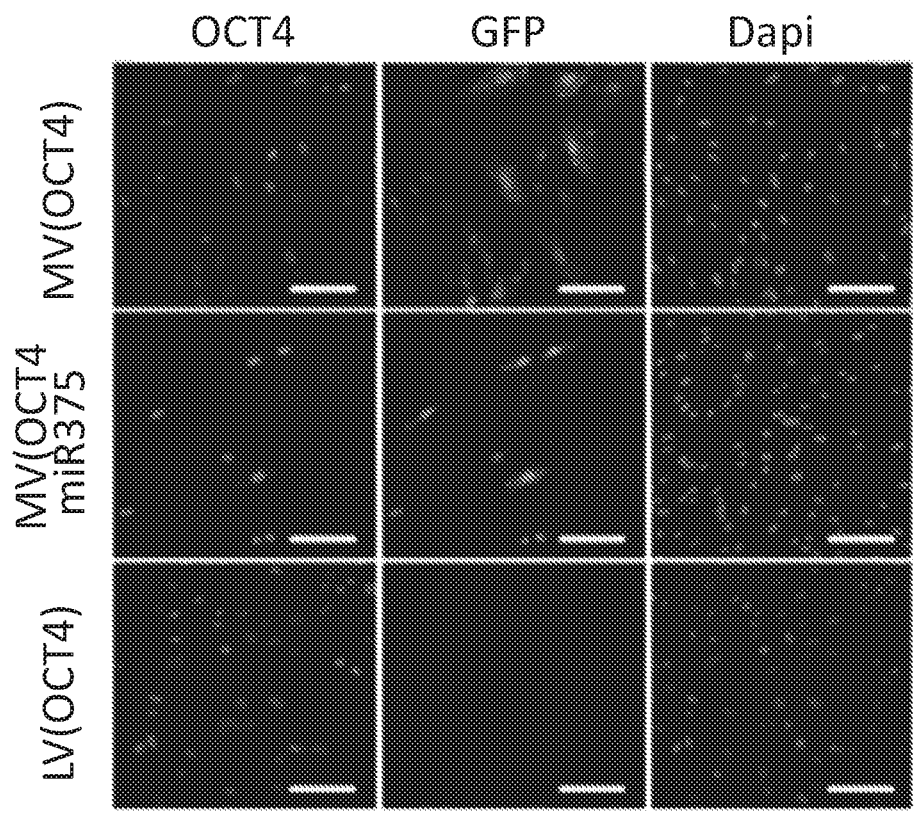

As the miRNA target sequence added in the 3'UTR of P, the transcriptional activity of P was analyzed by the expression level of the RF and the viral protein N by western blot (FIG. 5D) and immunofluorescence (FIG. 5E). The expression of OCT4 in Vero-H2 cells was found to be similar in both MV(OCT4) and MV(OCT4)miR375 at 24 and 48 hours (FIGS. 5D and 5E). These results demonstrate that the presence of the target sequences did not affect either the expression of the OCT4 protein or the transcription helper function of the P protein. The efficiency of the miRNA system to inhibit viral transcription and replication was tested by analyzing viral replication in presence or absence of the miRNA of interest.

Figure 5F:
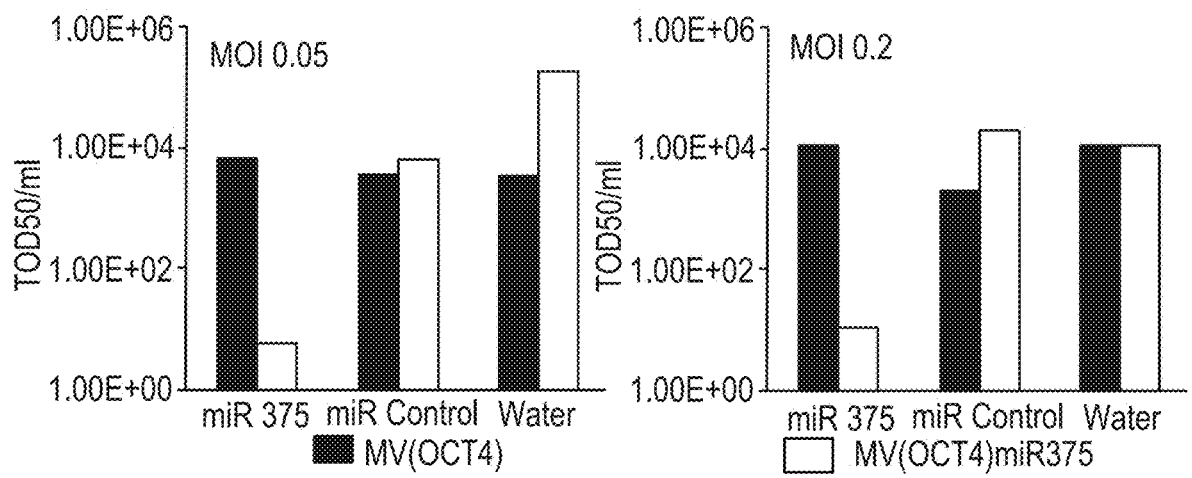

293-H cells expressing MV-H were transfected with either miR375, miR control, or water and followed the propagation of the MV(OCT4)miR375 (FIG. 5F, orange columns) and compared it to the propagation of MV(OCT4) (FIG. 5F, blue columns). While a high viral titers were observed with the MV(OCT4) in presence of miR375 at both MOI 0.05 and 0.2 (blue columns), a strong reduction in viral titers was observed with the MV(OCT4)miR375 (orange column). In contrast, viral titers were similar for both viruses in presence of the miR control or water only (FIG. 5F). These results indicated that MV(OCT4)miR375 propagation can be control by the presence of miR375 in the cells.

Figure 6A:
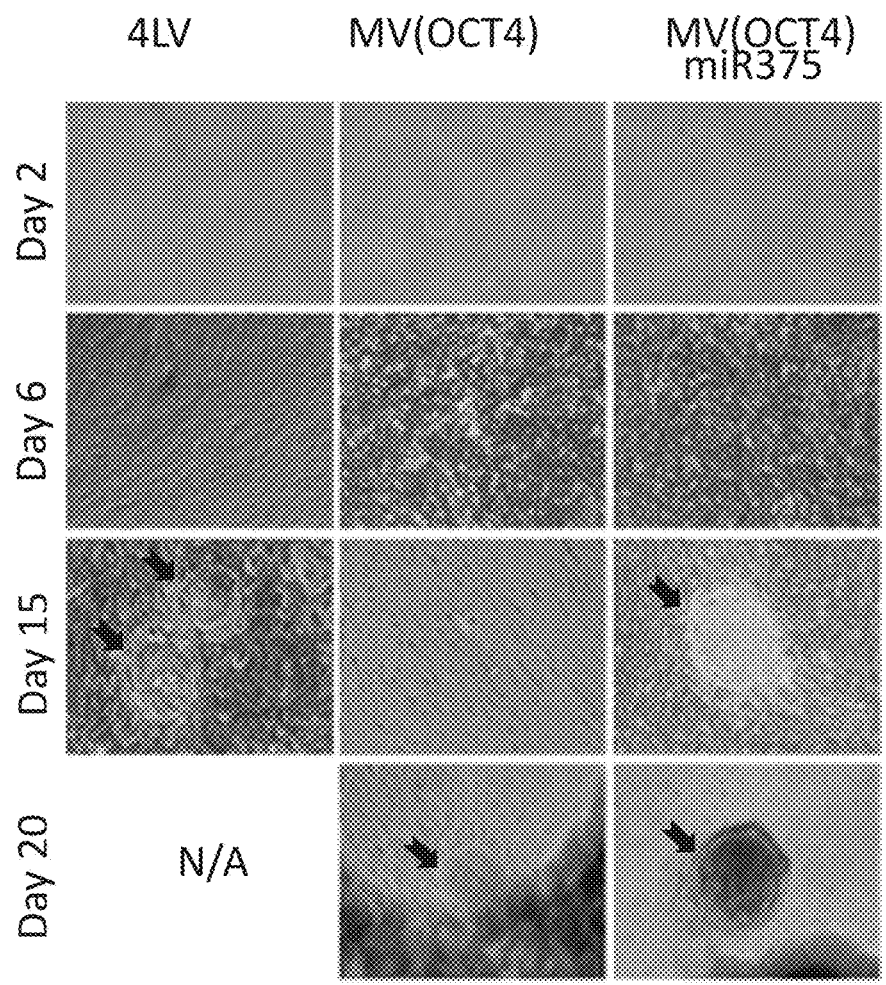
FIGS. 6A-6D shows generation of iPSC-like clones by MV(OCT4)miR375 in combination with 3 LV.
Figure 6B:
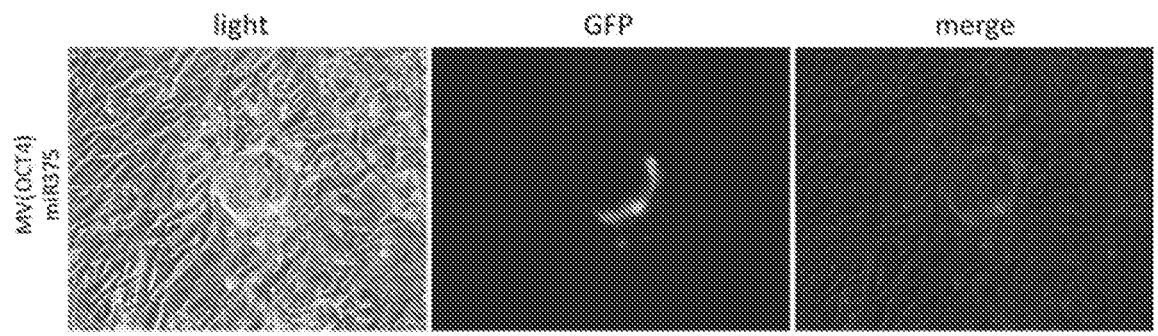
Figure 6C:
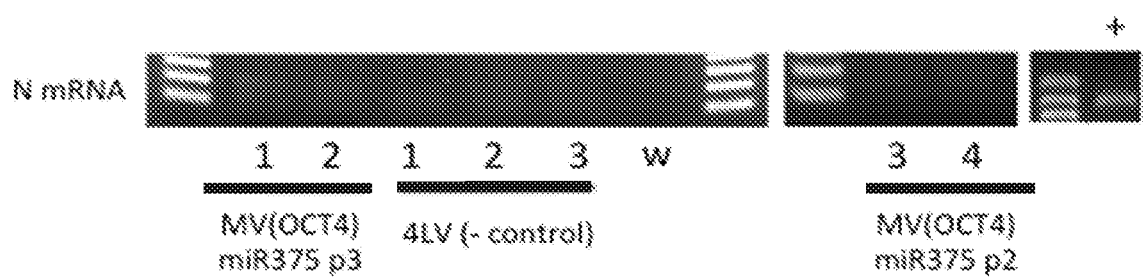
Figure 6D:
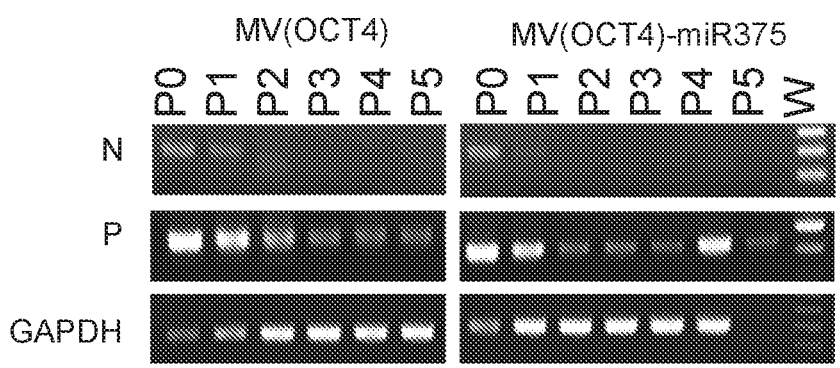

The ability of the MV(OCT4)mir375 to reprogram BJ cells in presence of 3LV expressing SOX2, KLF4, and cMYC was analyzed, and its efficiency was compared to MV(OCT4) and 4LV. MV(OCT4) reprogrammed BJ cells in approximately 20 days (FIG. 6A, middle), while it takes only 12-15 days to reprogram with the 4LV system (FIG. 6A, left row). With MV(OCT4)miR375, more iPSC-like clones were consistently observed and they also developed at an early time (day 15), suggesting that the reprogramming with this vector is quicker and more efficient that with the parental MV(OCT4) (FIG. 6A, right row). Using light and fluorescence microscopy, early phases of iPSC-like clone development with MV(OCT4)miR375 were observed (15 days post transduction, FIG. 6B). While there were some GFP positive cells surrounding the iPSC-like cells (middle picture), the cells composing the iPSC clone did not express GFP (compare left and middle pictures). An overlay of both pictures is shown in the right picture and outlines the lack of GFP in the iPSCs (FIG. 6B). The expression of the N mRNA in the early passages of four iPSC-like clones derived from MV(OCT4)miR375 was analyzed. As early as passage 2 and 3, N mRNA was not detected in 3 out of the 4 clones tested, and only 1 clone showed a residual level of N mRNA expression (FIG. 6C). To determine how long it would take for the vector to be eliminated from the iPSC through passages, an established iPSC clone was infected with both MV(OCT4) and MV(OCT4)miR375, and passaged for up to 5 passages. RNA was collected at each passage and RT-PCR for N and P mRNA was analyzed. GAPDH mRNA was used as control. For both viruses, the specific signal was lost at passage P2. Already at passage P1, the level of N mRNA was lower for the MV(OCT4)miR375 than for MV(OCT4), indicating that this virus was cleared faster (FIG. 6D).

Figure 7A:
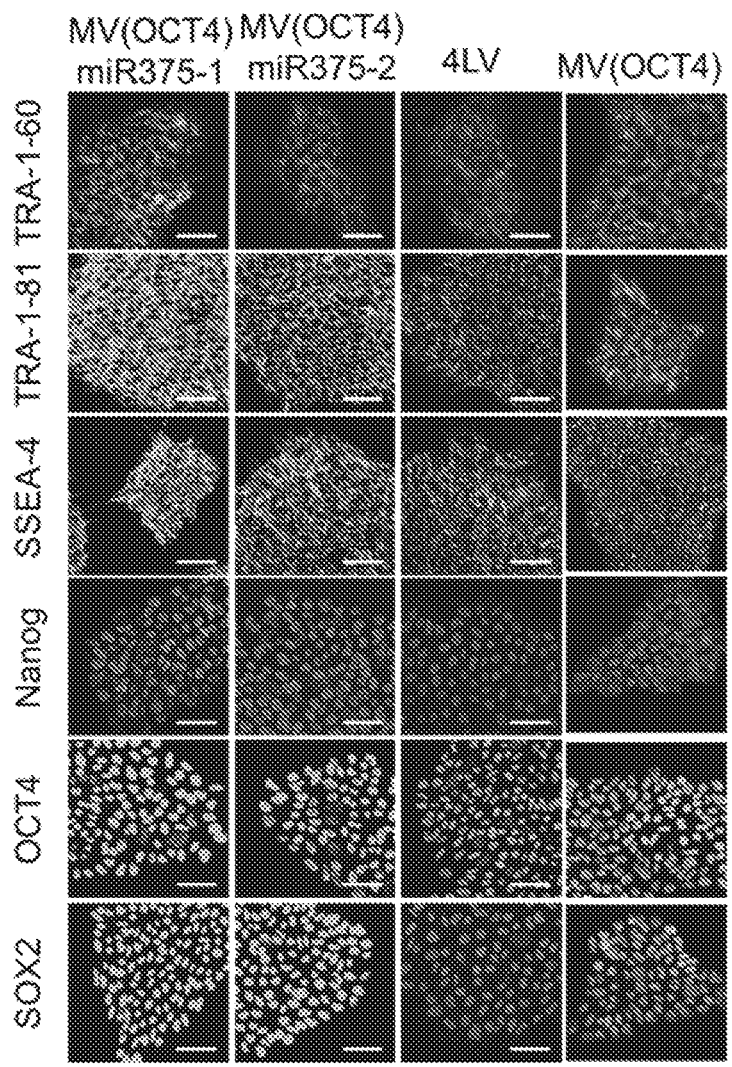
FIGS. 7A-7C show characterization of MV(OCT4) miR375-derived iPSC clones.
Figure 7B:
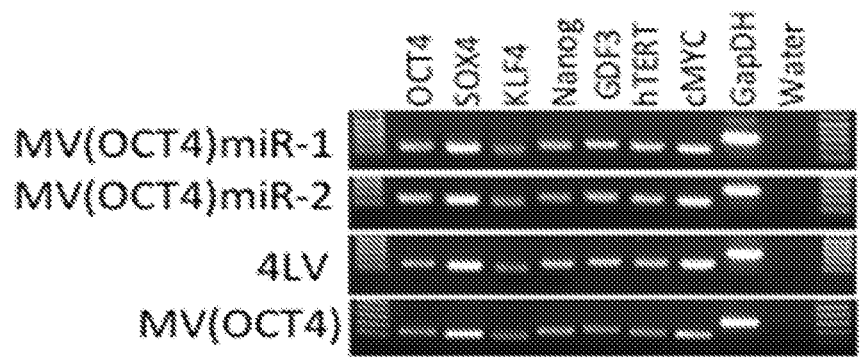
Figure 7C:
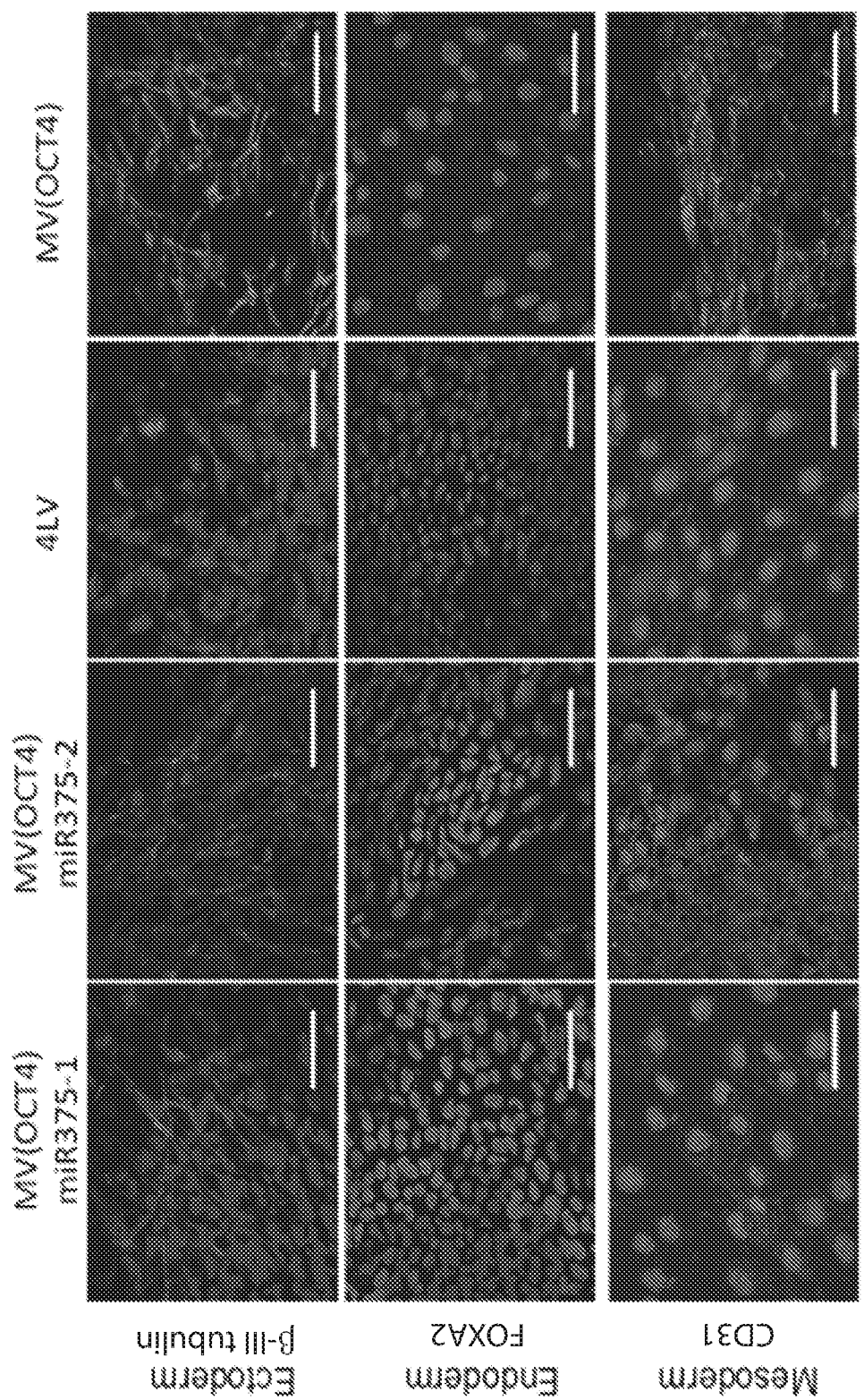

To verify that the MV(OCT4)mir375-derived iPSC-like clones were indeed iPSC clones, two clones derived from MV(OCT4)mir375 (one clone derived from MV(OCT4) and one clone derived from 4LV reprogramming) were tested for expression of several markers of pluripotency by immunofluorescence. All clones expressed human pluripotency-associated markers TRA-1-60, TRA-1-81, SSEA-4, OCT4, SOX2, and NANOG at passage 3 (FIG. 7A). Semi-quantitative RT-PCR analysis was also performed to confirm the induction of endogenous pluripotency-associated genes including OCT4, SOX2, KLF4, NANOG, GDF3, hTERT, and c-MYC. All genes were expressed in the two clones tested in a similar way as in the MV(OCT4) and 4LV control clones (FIG. 7B). To confirm that the MV(OCT4)mir375-derived iPSC clones were pluripotent, their differentiation propensity into the three germ layers; endoderm, ectoderm and mesoderm was assessed. iPSCs were cultured in suspension and formed embryoid bodies (EBs) in vitro (not shown). Embryoid bodies (EBs) were cultured as suspension for 10 days, followed by adherence on Matrigel-coated plates and culture in presence of 20% fetal calf serum (FCS) for additional 10 days, and the markers of the three embryonic germ layers were analyzed after immunostaining by confocal microscopy. Immunostaining of EB-derived adherent cells detected cells prototypic of the ectoderm (β-III tubulin), endoderm (FOXA2) or mesoderm (CD31) (FIG. 7C, first, second, and third rows respectively), documenting multi-lineages propensity of MV(OCT4)mir375-derived iPSCs clones.

These results demonstrated that the introduction of three repeats of the target sequence of miR375 in the 3' UTR of the P inhibited replication of MV(OCT4)miR375 in presence of the miR375, increased the efficiency of reprogramming compared to its parental control vector MV(OCT4), and increased the reprogramming rate.

Example 3: Measles Vectors Expressing Four Reprogramming Factors

To determine the amounts of genetic material to be inserted in the MV genome without significantly affecting the rescue and propagation of the virus, the following vectors are produced:
a) NP(OCT4)M[KLF4][SOX2](cMYC)L;
b) N(OCT4)P(KLF4)MF[SOX2](cMYC)L;
c) N(OCT4)P(KLF4)MF[GFP](SOX2)L(cMYC);
d) N(OCT4)P(KLF4)M[Sox2]H(cMYC)L;
e) N(OCT4)P(KLF4)M[GFP]H(SOX2)L(cMYC); and
f) N(OCT4)P(KLF4)FTrypsinH(SOX2)L(cMYC)

Single letters represent the MV genes; (xxx): represent the ATU with the corresponding RF gene clone in the ATU; and [xxx] represent H or F gene substitutions by one RF gene. The cloning strategies take advantage of the unique restriction sites as well as ATUs inserted in the genome (see, e.g., FIG. 1).

To determine the most efficient sequence of expression, the reprogramming gene order is rearranged using the different ATU inserted in the measles genome. Several recombinant viruses with progressively more protein expression are produced:
a) Oskm (3:1:1:1),
b) OskM,
c) OSKm,
d) OsKm, and
e) OSKM.

Uppercase letters (OSKM) represent a high level of the RF and lowercase letters (oskm) a low level of RF.

Example 4: Reprogramming with a Measles Virus Expressing Four Reprogramming Factors in One Genome, 4F*

To produce a MV vector expressing the four reprogramming factor from one single genome, we use a polycistron encoding human OCT4-SOX2-KLF4 and cMYC as individual gene.

Rescue, Production and Assessment of the "4F*" MV Vectors

The polycitron encoding OCT4-SOX2-KLF4 separated by self cleaving 2A peptide was cloned instead of the H gene in the MV genome, and the cMYC gene in the ATU after H. The GFP was added in an ATU in front of the N gene (FIG. 3A, bottom genome, 4F*). To rescue and propagate the 4F* vectors, the rescue 293-3-46 cells (Radecke et al., *EMBO J.* 14:5773-84 (1995)) and African green monkey Vero (ATCC) were modified to express the MV-H glycoprotein (293-3-46-H2 and Vero-H2) (Driscoll et al., *Stem Cell Res Ther.* 6:48 (2015)).

Figure 3D:
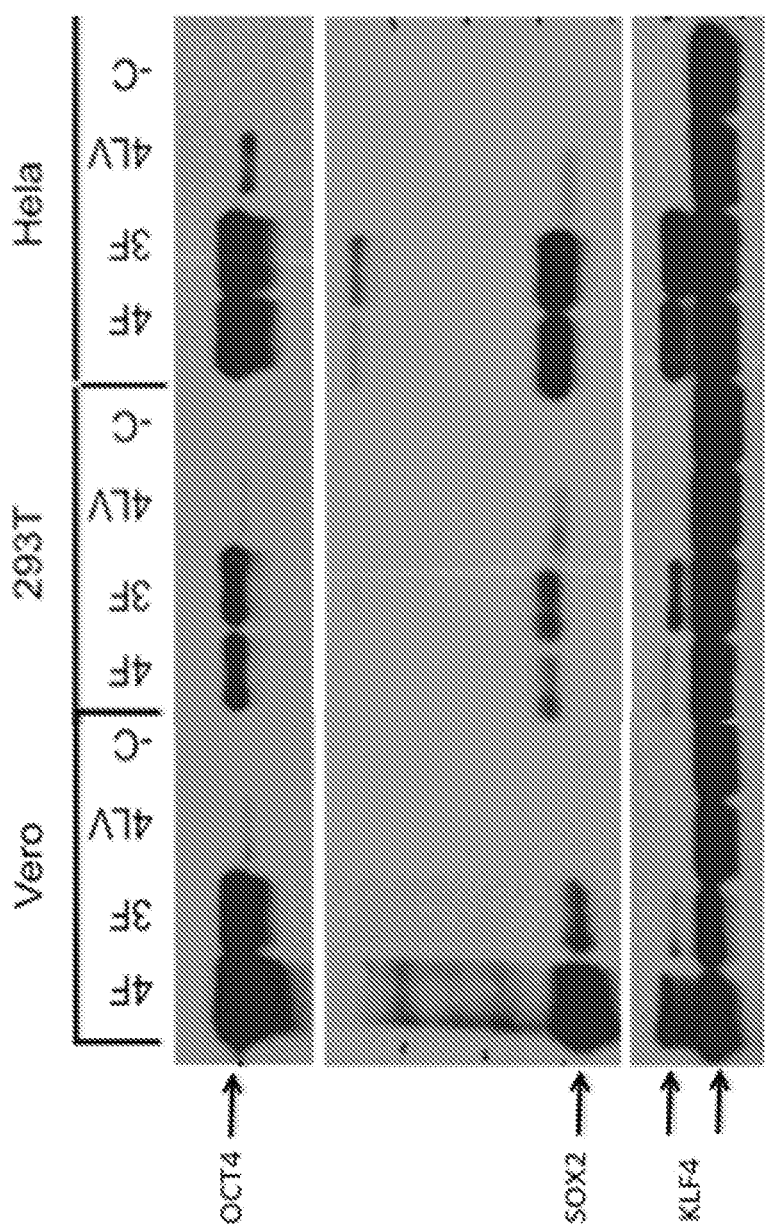

The expression level of the RF and the correct processing of the polyprotein was analyzed by western blot (FIG. 3D, see 3F for processing of the OSK polyprotein in MV) and immunofluorescence (FIG. 3C, right panel). Viral stability is analyzed after 5, 10, and 20 passages. Expression of the four reprogramming factors was observed after transduction of cells, indicating that MV vector can accommodate the expression of four reprogramming factor and one reporter gene.

Figure 8A:
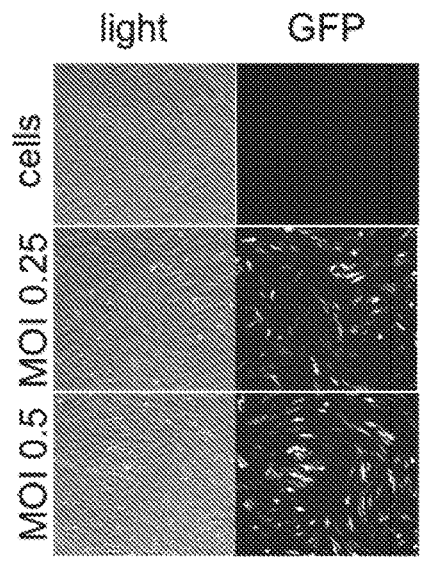
FIGS. 8A-8F shows generation of iPSC-like clones by MV vector expressing four reprogramming factors in one genome (4F*). 4F* genome is described in FIG. 3A (bottom genome).
Figure 8B:
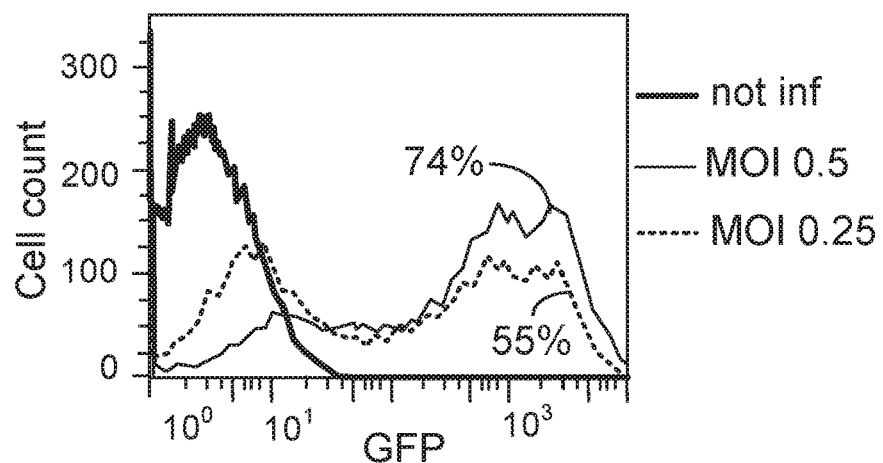

Transduction efficacy of the vectors was tested at different MOI using light microscopy and flow cytometry and testing for GFP expression. BJ cells were transduced with 4F* at a MOI of 0.5 or 0.25. Transduced cells were subjected to spinoculation at 1000 rpm for 1 hour at room temperature. Early experiments from FIGS. 8A and 8B showed between 55% and 74% of transduction efficiency for 4F* transduction at 0.25 and 0.5, respectively.

Figure 8C:
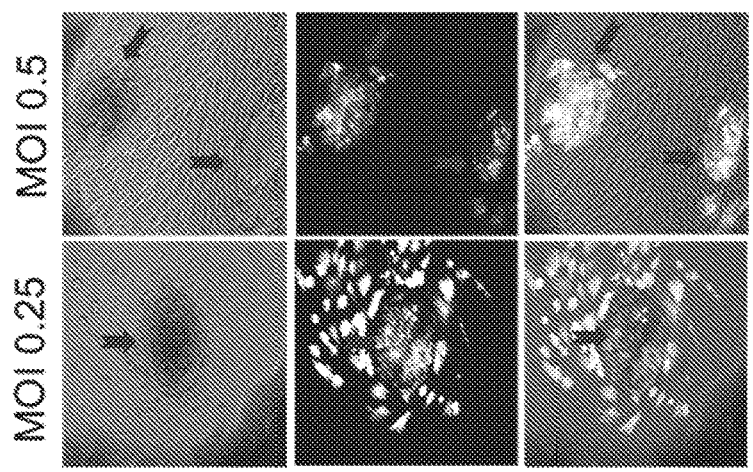

The ability of the 4F* to reprogram BJ cells was analyzed. 4F* reprogrammed BJ cells in approximately 17 to 20 days at a MOI as low as 0.25 (FIG. 8C, left panels). Using light and fluorescence microscopy, GFP expression was observed in the iPSC-like clone development with 4F* (FIG. 8C, middle and right panels).

Figure 8D:
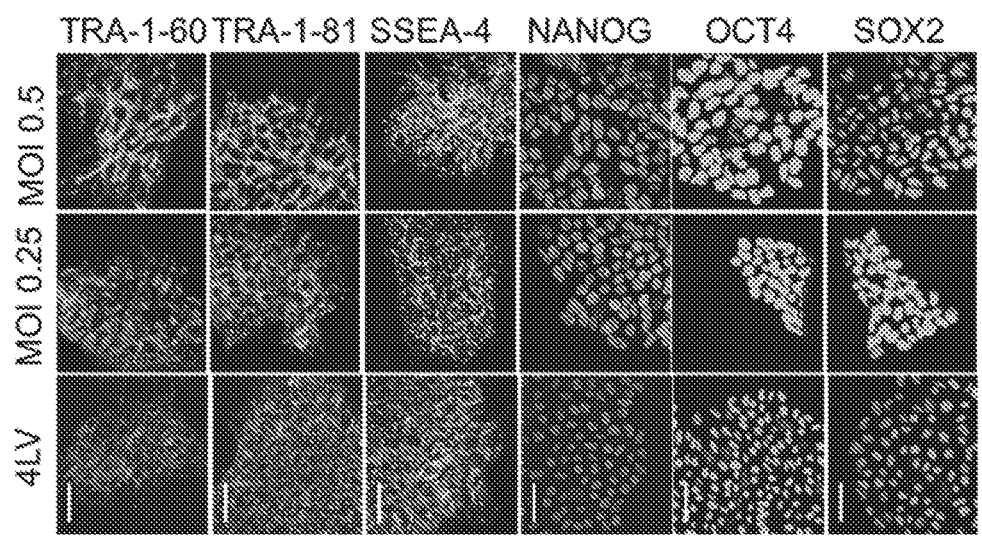
Figure 8E:
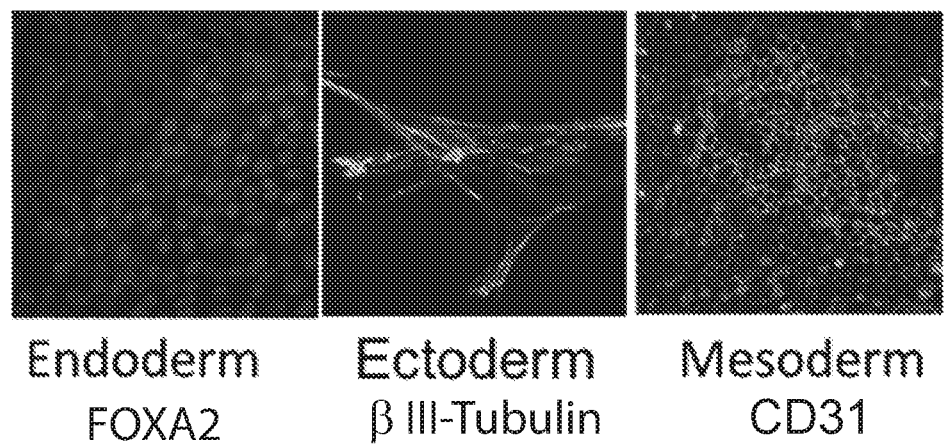
Figure 8F:
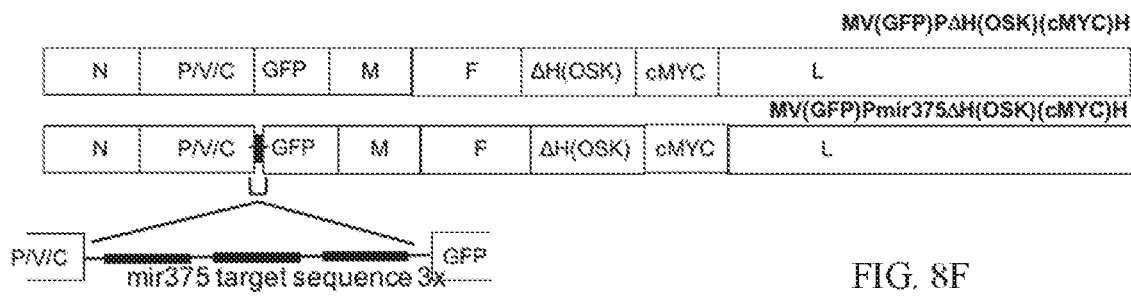

To verify that the 4F*-derived iPSC-like clones were indeed iPSC clones, two clones derived from 4F* and one clone derived from 4LV reprogramming were tested for expression of several markers of pluripotency by immunofluorescence. All clones expressed human pluripotency-associated markers TRA-1-60, TRA-1-81, SSEA-4, OCT4, SOX2, and NANOG at passage 2 (FIG. 8D). To confirm that the MV4F*-derived iPSC clones were pluripotent, their differentiation propensity into the three germ layers; endoderm, ectoderm and mesoderm was assessed. iPSCs were cultured in suspension and formed embryoid bodies (EBs) in vitro. Embryoid bodies (EBs) were cultured as suspension for 10 days, followed by adherence on Matrigel-coated plates and culture in presence of 20% fetal calf serum (FCS) for additional 10 days, and the markers of the three embryonic germ layers were analyzed after immunostaining by confocal microscopy. Immunostaining of EB-derived adherent cells detected cells prototypic of the endoderm (FOXA2), ectoderm (β-III tubulin) or mesoderm (CD31) (FIG. 8E, left, middle, and right panels respectively), documenting multi-lineages propensity of 4F*-derived iPSCs clones. To confirm the reprogramming, a vector expressing the four RFs where GFP is expressed in the ATU in P position instead of N was produced. The same vectors where the P gene was under the control of miR375 also were produced (FIG. 8F).

These results demonstrated that the expression of the four reprogramming factors OCT4, SOX2, KLF4 and cMYC from one measles genome allowed efficient reprogramming of somatic cells into induce pluripotent stem cell or iPSC.

Example 5: MV Vector Toxicity and the Innate Immune Response

Figure 9A:
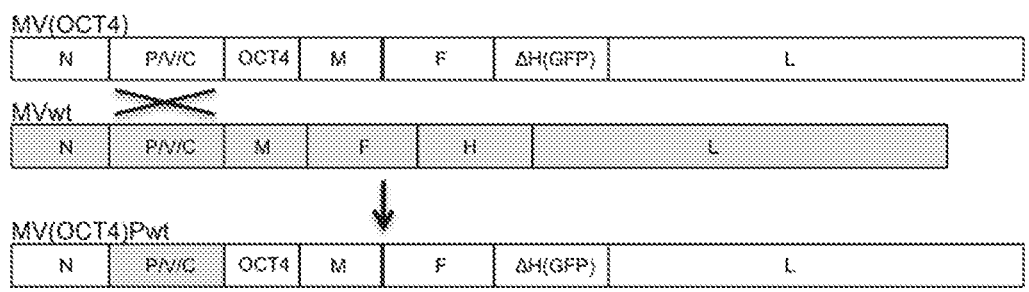
FIGS. 9A and 9B shows generation of MV vector expressing a P wt gene.
Figure 9B:
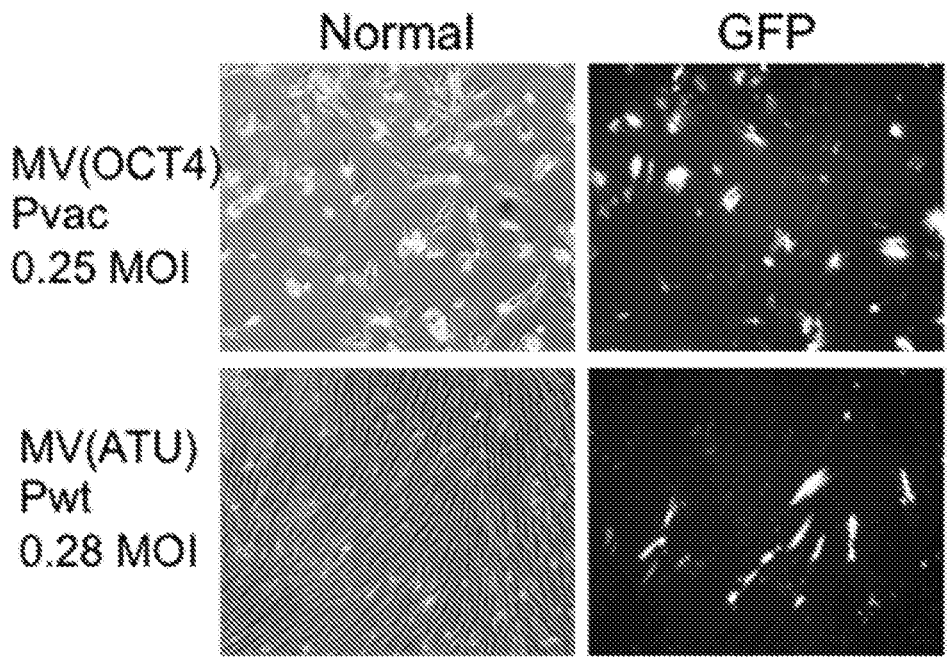

The P gene encodes for the three proteins involved in the interferon response (IFN) control (Sparrer et al., *Journal of Virology* 86:796-805 (2012); Takaki et al., *Mol Immunol* 48:497-504 (2011)). To control IFN production, a P gene from a wild type MV (MV-Pwt) was exchanged for the P gene from a MV vaccine strain in the MV(OCT4) vector.
Wild Type (wt) P/V/C Gene Exchange Vectors expressing the P gene from the WT MV virus (Pwt) instead of the P gene from a MV vaccine (Pvac) were produced. An intermediate vector containing a region of the MVvac genome was modified and the Pwt gene was sub-cloned using XbaI and SalI restriction sites. In order to clone back the modified genome fragment into the full-length MV vector, a three-way ligation was performed to produce the final vector MV(OCT4)Pwt (FIG. 9A). Verification of the vector was performed using multiple and complementary analysis that consisted of multiple PCRs to verify the three junctions, restriction digestions to verify the presence of all three specific fragments and sequencing to verify the integrity of the construct. A vector with an empty ATU was also produced, MV(ATU)Pwt. Both vectors were rescued. Toxicity was assessed after transduction with using light microscope and fluorescent microscope. A toxicity experiment on BJ cells using MV(ATU)Pwt indicated that the vector expressing the Pwt appears to be less toxic than the vector expressing the Pvac (MV(OCT4)) (FIG. 9B). The substitution of the Pwt gene reduced toxicity after transduction.

These vectors are tested for IFN induction and reprogramming efficiency. To determine if the substitution has an effect on viral transcription, the expression level of the RF and viral proteins is analyzed by western blot and immunofluorescence. The propagation of the vectors is compared to a standard MV vector on Vero-H2. Viral stability and protein expression is analyzed after 5, 10, and, 20 passages. Transduction efficacy of these vectors is analyzed and compared to the control vector MV(OCT4)Pvac.

Toxicity is assessed after transduction with different MOI using light microscope and fluorescent microscope. To determine if IFN is produced after transduction by the vectors, the activation and nuclear translocation of IRF3 is analyzed. IFN-induced IRF3 nucleus translocation is assessed by immunofluorescence and confocal microscopy after transduction. An analysis of the phosphorylation status of IRF3 is also performed as described elsewhere (McAllister et al., *J Virol.* 84:380-6 (2010)). Enzyme-linked immunosorbent assay of IFN-β protein and qRT-PCR analysis of IFN-β, and IFN stimulated genes ISG15, OAS and IFIT1 is performed.
Proteins and the Residues Involved in MV-Toxicity The P/V/C encode three proteins; the polymerase cofactor, P; and two proteins involved in the control of the innate immune response, V and C. Another possible target for MV-induced toxicity is the matrix protein (M). To identify the protein responsible for MV-vector induced toxicity, individual Flag-tag versions of the wild type V (FVwt), C (FCwt), and/or M gene are introduced into the MV vector. The FVwt gene is introduced in the ATU after P of MV(A-TU)Pvac. The FVwt is silenced for Cwt expression by introduction of stop codons as described elsewhere (Devaux et al., *Journal of Virology.* 82:5359-67 (2008)). FCwt is introduced at the same position. Vectors are analyzed as described herein.

To identify the residue involved in the control of the IFN production by MV, site-directed mutagenesis is used to mutate residues from the vaccine to the wild type residue. An intermediate vector is used to perform the mutagenesis and sub-clone the mutated to gene into the MV vector (Devaux et al., *Virology.* 360:72-83 (2007); Devaux et al., *J Virol.* 85:348-56 (2011)). Integrity of the gene is verified by sequencing. All mutants are produced in the viral vector context to look at an effect on IFN production and toxicity in BJ cells occurring during viral transduction.

Mutation in the C protein: A sequence alignment of Cwt and Cvac was performed. There are only five residues differences: P25L, T39S, R44G, K78R and M104T, with the first residue corresponding to the wild type and the second to the vaccine. Mutation R44G is in the nuclear localization signal. G44 in the Pvac gene is mutated to R to test its effect in the control of IFN production and toxicity in MV(OCT4). Mutagenesis is performed in a way that the open reading frame of P and V remains unchanged. The vector is tested for its efficiency to block IFN production as described herein. The other four residues are also mutated and tested.

Mutation in the V protein: A sequence alignment of Vwt and Vvac was performed and 13 residues were noted having differences between both proteins: V29I, D46E, K51R, E54K, S83P, S97P, H111Y, D146N, K195R, S219G, E225G and G237S, with the first residue corresponding to the Vwt and the second to the Vvac. Each residue of the Vvac is mutated to the wt residue and tested for ability to control IFN production and toxicity. Mutagenesis is performed in a way than the open reading frame of C and if possible P remains unchanged. Double and triple mutants will be produced with the most efficient mutant to increase efficacy. The vectors are rescued and assessed as described herein. The effects of the mutation on toxicity are analyzed as described herein.
Mutation in the M Protein The M protein in the MV vaccine has two point mutations, P64S and E89K. The Mvac is exchanged with the MwtP64S/E89K to determine if the wt version of M reduces toxicity of the MV vector.

The MV vector expressing a Pvac with one or more of the identified mutations are used for reprogramming purposes as described herein. The protocols for the characterization for the iPSC is described herein.

Example 6: iPSC Differentiation

The functionality of iPSC-differentiation is tested in vivo. In order to test if the reprogrammed cells are functional in vivo, and can spontaneously re-differentiate into the three germ lineages in vivo, the reprogrammed cells are transplant into the kidney sub-capsule of SCID/Beige mice. All experimental mice, 6 to 8 week-old SCID/Beige mice, are purchased (e.g., from Charles Rivers). These immune-compromised mice will avoid the rejection of the engrafted cells. Mice are maintained under a 12-hour light-dark cycle. The two best MV vectors per group described herein are tested. iPSCs derived from 4LV and control MV are used as positive controls. Twenty μL of iPSC cells ($2\times10^6$) are loaded into a delivery apparatus consisting of a syringe attached to a 200 uL pipette tip. Injection into a pocket under the left kidney capsule is performed. Four and eight weeks' post-injection, mice are euthanized via $CO_2$ inhalation, and the iPSC-injected kidney is removed and tissues are embedded and flash frozen in O.C.T. compound. Seven μm cryosections are obtained and immediately fixed in 4% PFA for 30 minutes at room temperature before proceeding to hematoxylin and eosin staining. Presence of structures from the endoderm, mesoderm, and ectoderm lineages are sought using light microscope and the section are sent to the Mayo Pathology Research Core facility for high quality imaging. Three animals are used for each vector at each time point.

Example 7: iPSC Cardiac Differentiation

The proficiency of MV-derived iPSC to generate cardiac progenitor cells is analyzed in vitro using a step-wise differentiation protocol to test differentiation of iPSCs into cardiomyocyte-like cells as described elsewhere (Driscoll et al., *Stem Cell Res Ther.* 6:48 (2015)). After 10 days of culture, the first contracting cells are observed under light microscopy. Video of the contracting cardiomyocyte-like cell will be recorded using a Zeiss Axiovert 200M microscope and the ApoTome imaging system. Immunostaining for α-actinin, a marker of microfilaments, and troponin, a marker specific for the cardiac muscle, is use to analyzed the cells to confirm their differentiation into cardiomyocyte-like cells.

Example 8: MicroRNA Control of the Reprogramming Factors miRNA target sequences are cloned into the 3'UTR of the each RF in order to control specific expression of each RF. Each RF is silenced in a specific way and sequentially, if necessary, as the control can be independent of the viral control.
Identification of Additional miRNA to Use in the MV Vector
Level of miRNA is determined in BJ cell and MV-derived iPSC clones using HTG EdgeSeq miRNA Whole Transcriptome Assay (HTG Molecular Diagnostics, Tucson AZ, https://www.htgmolecular.com/products/mirna-wta).
miRNA highly upregulated in MV-derived iPSC clones and not expressed in BJ cells are identified and are selected to be cloned in MV vectors.
Production of MV Vectors Expressing miRNA Target Sequences
Three repeats of the target sequence in tandem for each of the selected miRNA in the 3'UTR region of OCT4 or SOX2 genes, which are expressed from an ATU are introduced in the MV vector genome. Overlapping PCR extension, restriction digestion enzymes and multiple cloning strategies are used. Two intermediate plasmids, pRS313-OCT4miRNA and pRS313-SOX2miRNA, are produced. These plasmids are used to substitute the 3'UTR region with the new modified 3'UTR-miRNA region. The final OCT4 and SOX2 genes encoding the modified 3'UTR-miRNA are reinserted in the full-length MV genome vectors (e.g., the MV(OCT4) vector). The integrity of all the constructs is verified by sequencing. OCT4 and SOX 2 genes containing a few codon differences compared to the wild type OCT4 and SOX2 gene, can be used to differentiate them from the endogenous mRNA by qRT-PCR. In order to make sure that these differences do not affect the reprogramming efficiency, these genes are cloned into the LV system, and tested for reprogramming.
The MV(OCT4)miRNA and MV(SOX2)miRNA vectors are rescued as described herein. To test the efficiency of the miRNA system, the expression level of the RF (OCT4 and SOX2) and viral protein N (control) are examined by western blot and immunofluorescence, in presence and absence of the specific or irrelevant miRNA. The propagation of the vectors is compared to a standard MV vector on Vero-H2. Viral stability and protein expression is analyzed after 5, 10, and 20 passages. Transduction efficacy of these vectors is analyzed and compared to the control vector.
Efficiency of Reprogramming of Somatic Cells, and Characterization and Functionality of the iPSC Clones
BJ cells are reprogrammed as described herein. The iPSC clones are characterized as described herein. To determine how soon the exogenous RF are cleared from the iPSC after reprogramming, qRT-PCR is performed on the OCT4 or SOX2 mRNA produced in the iPSCs. The MV-iPSC colonies are analyzed by RT-PCR for exogenous OCT4 and SOX2 mRNA, as soon as passage 2, and then passages 3, 6, and 8.

Example 9: Universal Vectors Targeted-MV-Derived Vectors

The envelope of MV vectors is modified to retarget the vector and produce a more polyvalent vector.
Universal MV Vectors
Vectors are produced expressing the envelope glycoprotein from Vesicular stomatitis virus (VSV-G). This protein is extensively used in other viral vector system, such as lentiviral system, to allow transduction of large varieties of cells from different species (human, mouse or other). VSV-G-pseudotyped MV is produced by introduction of a VSV-G fusion protein where the VSV-G was link to the cytoplasmic tail of the MV fusion protein (see, e.g., Spielhofer et al., *Journal of Virology* 72:2150-9 (1998)).
Rescue and propagation cell lines expressing a VSV-GFtail fusion protein were produced as described elsewhere (Spielhofer et al., *Journal of Virology* 72:2150-9 (1998)). A VSV-GFtail fusion gene was cloned into a LV vector. The integrity of the construct was verified. Rescue (293-3-46 cell from (39)) and African green Monkey Vero ((ATCC) for viral propagation) cell lines were transduced with the LV particle expressing VSV-GFtail, and new cell lines are tested for expression of VSV-GFtail at the cell surface by immuostainning and flow cytometry.
Two new MV vectors are produced, first using the MV(OCT4) vector, and then using other MV vectors described herein, one deficient in H and F, the other deficient in H, F and M. To test these vectors in other species (e.g., mouse), the mouse OCT4 (mOCT4) gene is cloned instead of the human (hOCT4) gene in the ATU in P position. The vector is rescued and propagation cell lines are produced.
The "universal" MV vectors are assessed. To determine the level of viral production for the new MV vectors, the propagation of the virus on Vero-VSVGFtail is analyzed. Expression of the RF and viral proteins in the MV vector-infected cells is analyzed by western blot and immunofluorescence. The transduction efficiency in human or hamster (CHO-CD46) cells is analyzed and compared with control MV system. Viral stability and protein expression are analyzed after 5, 10, and 20 passages.
Vectors are used for reprogramming experiments in human (BJ cells, ATCC) and mouse primary embryonic fibroblasts (Cell Biologics, Chicago, IL). Methods of reprogramming and characterizing can be adjusted as needed. All the reagents to characterize the iPSC derived from mouse fibroblasts are commercially available.

Species-Specific Targeted MV Vectors

Vectors are produced expressing a chimeric envelope to specifically transduce cells from different species.

Figure 11:
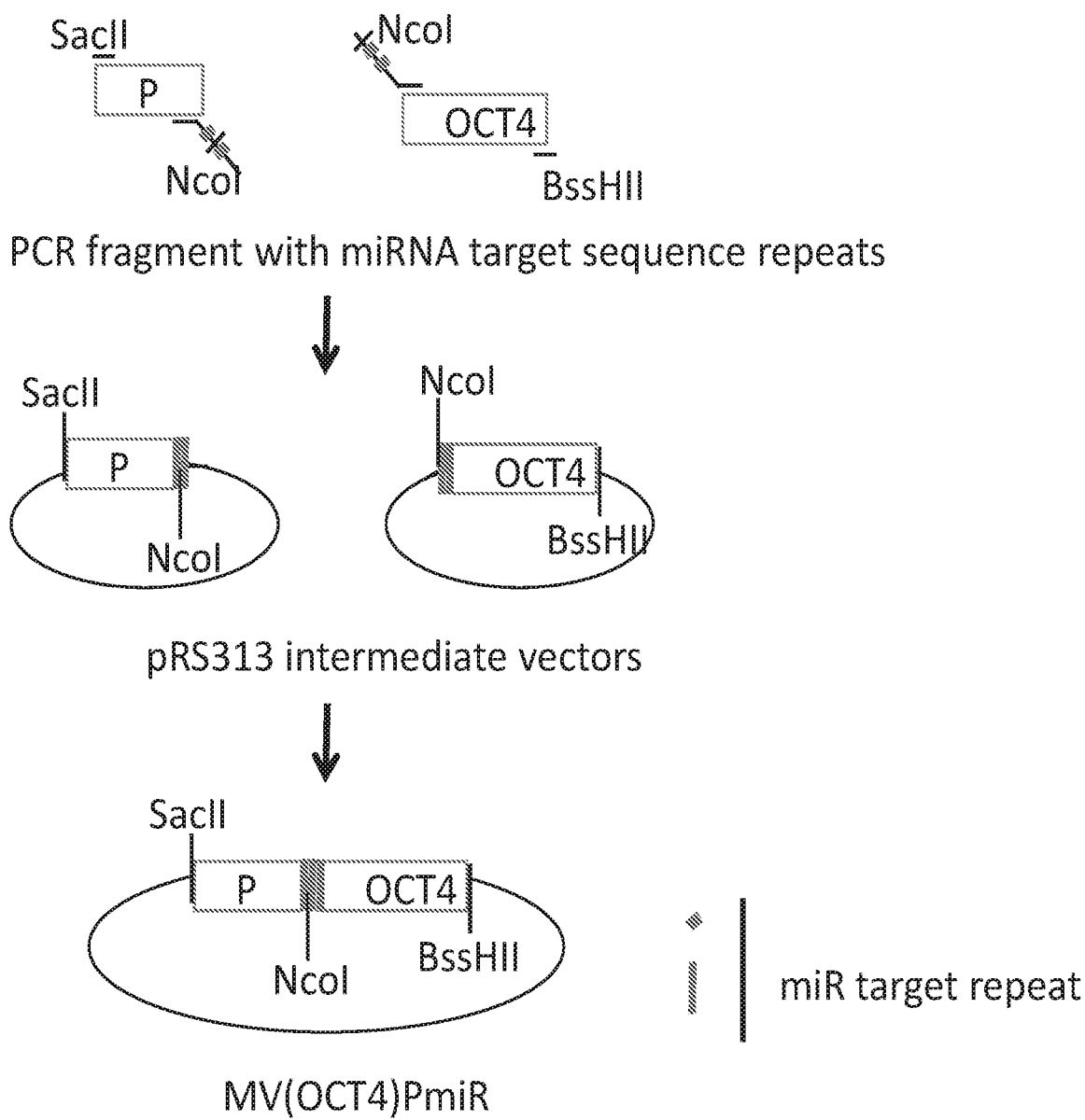
FIG. 11 is a schematic diagram of cloning steps that can be used to introduce a miRNA target sequence in the 3' UTR of a gene. Example given is in the 3' UTR of the P gene. The position of this miRNA was used to produce MV(OCT4)$^{PmiR}$ and MV4F$^{(GFP)PmiR}$.

The H and F of MV and canine distemper virus (CDV) are exchanged (von Messling et al., *J Virol.* 75:6418-27 (2001)). MV-H is exchanged with CDV-H. This virus specifically targets cells from dogs, ferrets, and other animal susceptible to CDV infection.

Rescue and propagation cell lines expressing the H of CDV (HCDV) are produced. A LV vector expressing HCDV (LV-HCDV) similar to the LV vector expressing MV-H is produced. The rescue (293-3-46) and a modified Vero cell expressing dogSLAM receptor (Vero.dSLAM) are transduced with the LV-HCDV particle. The new cell lines are tested for expression of HCDV at the cell surface by immuostairming and flow cytometry.

Dog-targeted-MV vectors are produced, first using the MV(OCT4) vector, and then using other MV vectors described herein, using reprogramming vectors described herein. Canine fibroblasts were successfully reprogrammed either using predicted canine RF gene (Shimada et al., *Mol Reprod Dev.* 77:2 (2010)) or human RF (Lee et al., *J Biol Chem.* 286:32697-704 (2011)).

The level of viral production is analyzed in Vero-dSLAM. Expression of the RF and viral proteins in MV-CDV-pseudotyped vector transduced cells is analyzed by western blot and immunofluorescence. Transduction efficiency with the MV-HCDV-pseudotyped vector is analyzed and compared to control MV(OCT4) vector in Vero.dSLAM at 24 and 48 hours. Viral stability and protein expression are analyzed after 5, 10, and 20 passages.

Vectors are used for reprogramming experiments in canine embryonic fibroblasts (Cell Biologics, Chicago, IL). Reagents needed for the characterization of the canine iPSC are described elsewhere (Lee et al., *J Biol Chem.* 286:32697-704 (2011)).

Cell Type-Specific Targeted MV Vectors

Vectors expressing a retargeted envelope glycoprotein to a specific human receptor using a single chain antibody (scFv) are produced. MV entry is retargeted to a cell through a different receptor than it natural receptor. This is achieved by introducing CD46- and SLAM-ablating mutations at residue positions 481, 533, 548, and 549 in the H gene and the addition of an scFv in the extracellular domain of H allowing the interaction with a specific new protein (Ungerechts et al., *Cancer Res.* 67:10939-47 (2007)). Target receptors include (EGFR), HER2/neu, CD20, CD38, CEA as few examples (Hasegawa et al., *J Virol.* 81:13149-57 (2007); Nakamura et al., *Nat Biotechnol.* 23:209-14 (2005); Paraskevakou et al. *Mol Ther.* 15:677-86 (2007); Ungerechts et al., *Cancer Res.* 67:10939-47 (2007); Yaiw et al., *Gene Ther.* 18:313-7 (2011)).

Rescue and propagation cell lines are produced. For example, rescue and propagation cell lines expressing the CD20 retargeted MV-H are produced. A vector encoding for the chimeric MV-HCD46/SLAMblind(mutl) linked to CD20 scFv's (CD20HmutI) is used. The chimeric CD20HmutI is cloned into the LV vector. Rescue (293-3-46) and propagation cell lines are transduced with the LV-CD20HmutI as previously described. Both new cell lines are tested for cell surface expression of CD20HmutI.

CD20-retargeted-MV vectors are produced first using the MV(OCT4) vector, and then using other MV vectors described herein.

The CD20-retargeted-MV vectors are assessed. To determine the level of viral production for the new MV vector, the propagation of the vector in HT1080 (ATCC) and HT1080-CD20 cells is analyzed. Expression of the RF and viral proteins by the MV-CD20HmutI vector transduced cells is analyzed by western blot and immunofluorescence in HT1080-CD20 cells. Transduction efficiency with MV-CD20HmutI-pseudotyped vectors is analyzed and compared to control MV(OCT4) in HT1080-CD20 at 24 and 48 hours. Viral stability and protein expression are analyzed after 5, 10, and 20 passages.

CD20-retargeted-MV vectors are used for reprogramming experiments of human B lymphocytes. Reprogramming protocols can be adapted as needed to reprogram suspension cells. B-lymphocytes are isolated from peripheral blood samples by negative selection using non-B cell depletion beads (B cell isolation kit II from MACS, Miltenyi Biotec). The clones are characterized as described herein.

Example 10: MV Vectors Expressing Four Reprogramming Factors with or without Control by MicroRNA (miRNA)

MV Vector Expressing 4 Reprogramming Factors in One Genome: 4F*, $4F^{(GFP)P}$

4F*, $4F^{(GFP)P}$ were described in FIGS. 3A and 8F. Full length cDNA vector p(+) MVvac2ΔH(OSK)(GFP)H (3F, FIG. 10) was produced by inserting the codon optimized sequence encoding OCT4, SOX2, KLF4 (OSK) instead of the H gene using the EcoRV and SmaI restriction sites. Cloning was performed in accord with the "rule of six" using an intermediate vector pCGΔH(GFP)(GFP)H. The pCGΔH(GFP)(GFP)H was obtained by cloning the SmaI-SpeI fragment covering the ATU containing GFP located after the H gene in the pCGΔH(GFP). The sequence encoding the cMYC gene was then cloned in the ATU in H position, replacing the GFP. The resulting vector was called pCGΔH(OSK)(cMYC)H. Finally, the PacI-SpeI fragment was then cloned back into the MV full-length genome containing a GFP in an additional transcription unit in front of the N gene. The resulting full length vector was called p(+)MVvac2(GFP)$^{uN}$ΔH(OSK)(cMYC)H (4F*, FIG. 10).

To produce the p(+)MVvac2(GFP)$^{P}$ΔH(OSK)(cMYC)H ($4F^{(GFP)P}$), the MV(OCT4) was used (FIG. 5A, top genome). First, OCT4 gene was replaced by GFP using AatII and MluI to get the MV(GFP)$^{P}$. Then, the PacI-SpeI fragment from the MV(GFP)$^{P}$ was exchanged with the PacI-SpeI fragment of the p(+)MVvac2(GFP)$^{uN}$ΔH(OSK)(cMYC)H to obtain p(+)MVvac2(GFP)$^{P}$ΔH(OSK)(cMYC)H ($4F^{(GFP)P}$, FIGS. 10 and 8F, top).

Measles Vectors Expressing Four Reprogramming Factors with Viral Replication Controlled by miRNA (e.g., MV(OCT4)miR375 and $4F^{GFP)PmiR}$)

MV(OCT4)miR375 from Example 2 (FIG. 5A, bottom genome) was used. More specifically, the cloning of MV(OCT4)miR375, described in Example 2, was done using PCR, using the unique SacII restriction site in the P gene and the unique restriction site BssHII in the ATU between the P and M gene. Three repeats of the miR375 target sequence were inserted in the 3' UTR of the P gene, and one NcoI restriction site was introduced between the first and second repeat to facilitate cloning (FIG. 11). Two PCR fragments were generated; one covering the P gene, the other covering the OCT4 gene. Both fragments were link using the NcoI site, and the resulting fragment was cloned back in the full-length MV vector using the SacII and BssHII restriction sites (FIG. 11). The resulting vector, p(+)MVvac2 (OCT4).miR375ΔH(GFP), was rescued and called MV(OCT4)miR375.

Figure 10:
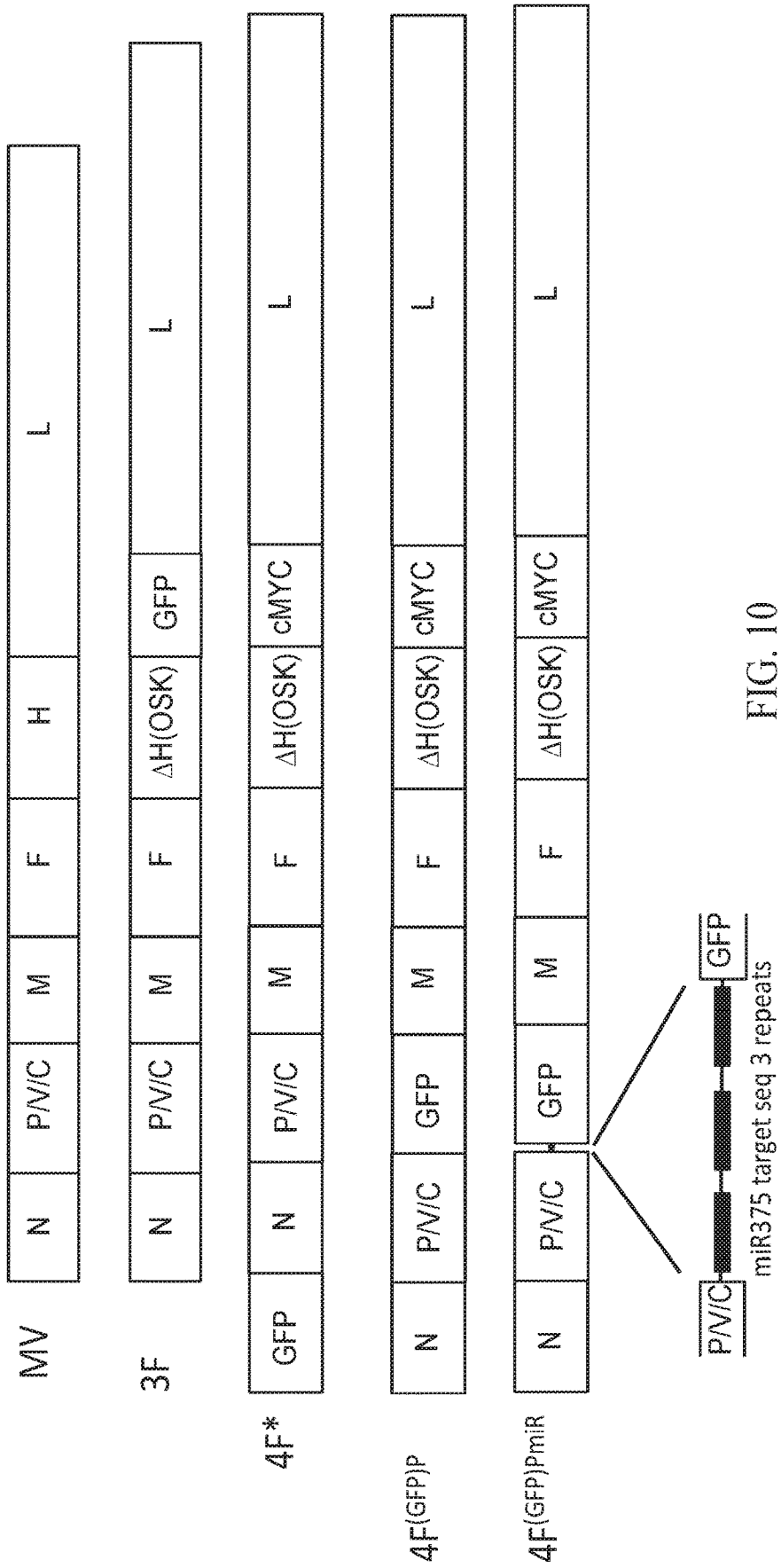
FIG. 10 contains schematic diagram of MV vectors expressing zero (MV), three (3F), or four (4F*, 4F$^{(GFP)P}$, and 4F$^{(GFP)PmiR}$) reprogramming factors. 4F* contains nucleic acid encoding a GFP polypeptide in front of the nucleic acid encoding the MV N polypeptide. 4F$^{(GFP)P}$ contains nucleic acid encoding a GFP polypeptide located between the MV P and M nucleic acid, and 4F$^{(GFP)PmiR}$ contains nucleic acid encoding a GFP polypeptide located between the MV P and M nucleic acid and with the P expression under the control of the miR375.

To produce the p(+)MVvac2(GFP)miR375ΔH(OSK) (cMYC)H ($4F^{(GFP)PmiR}$), the MV(OCT4)miR375 was used. First, OCT4 gene was replaced by GFP using AatII and MluI to get the MV(GFP)miR375. Then, the PacI-SpeI fragment from the MV(GFP)miR375 was exchanged with the PacI-SpeI fragment of the p(+)MVvac2(GFP)$^{uN}$ΔH(OSK) (cMYC)H to obtain p(+)MVvac2(GFP)miR375ΔH(OSK) (cMYC)H ($4F^{(GFP)PmiR}$, FIGS. 10 and 8F bottom). This example was shown with miR375, but similar constructs can be reproduced with any appropriate miRNA.

Maintenance of Cell Culture

All Vero (ATCC #CCL81), helper 293-3-46-H2 cells, and Vero cells were maintained in DMEM medium (GE Lifesciences HyClone, SH30022.01) containing 10% fetal calf serum (FCS, Life Technologies, #10437-028) and 1% penicillin/streptomycin (P/S, Corning Mediatech, 30-002-C1) (DMEM-10). Helper 293-3-46-H2 cells were cultured with 1.2 mg/mL G418 (Cardinal Healthcare, MT61234RG) in addition to DMEM-10. Human BJ cells (neonatal foreskin human cells, ATCC #CRL 2522) were maintained in DMEM containing 10% embryonic stem cell qualified fetal calf serum (ES-FCS, Life Technologies, #16141-079) containing 0.1 mM non-essential amino acids (Corning Mediatech, 25-025-C1) and 1% P/S (media 1). iPSCs were maintained in 80% Pluriton (Stemgent, #00-0070), 20% mTeSR1 (STEMCELL Technologies, #05851), and 1% P/S (media 2). All cell lines stated above were cultured in humidified atmosphere with 5% $CO_2$ at 37° C. under atmospheric oxygen conditions.

Vector Rescue and Propagation

Recombinant MVs 3F, 4F*, $F4^{(GFP)P}$, and $4F^{(GFP)PmiR}$ were produced using procedures similar to those described elsewhere (Radecke et al., EMBO J. 14:5773-84 (1995)). Rescue cells (293-3-46) and propagation cells (African green monkey, Vero) were modified to express the MV-H glycoprotein (293-3-46-H2 and Vero-H2) (Driscoll et al., Stem Cell Res Ther. 6:48 (2015)). In brief, helper 293-3-46 H2 cells were transfected using calcium phosphate precipitation with two plasmids encoding for the MV genome and MV polymerase (pEMCLa). Three days after transfection, the helper cells were overlaid on Vero-H2 cells. The appearance of infectious centers was monitored by observing green fluorescent protein (GFP) expression under fluorescence microscope. Single viruses were then picked and propagated on Vero-H2 cells.

For virus stock preparation, Vero-H2 cells were infected at a multiplicity of infection (MOI) of 0.05 in OptiMEM for 2 hours at 37° C. Then, DMEM-10 medium was added on top and transferred to 32° C. until 95% of the cells expressed GFP. Cell culture media was removed, and cells were scraped in OptiMEM. Viral particles were released by two freeze-thaw cycles. Titers of virus stocks were determined by 50% end-point dilution (tissue culture infectious dose 50, or $TCID_{50}$) on Vero-H2 cells using the Spearman-Karber method.

Analysis of the Vectors

Figure 12:
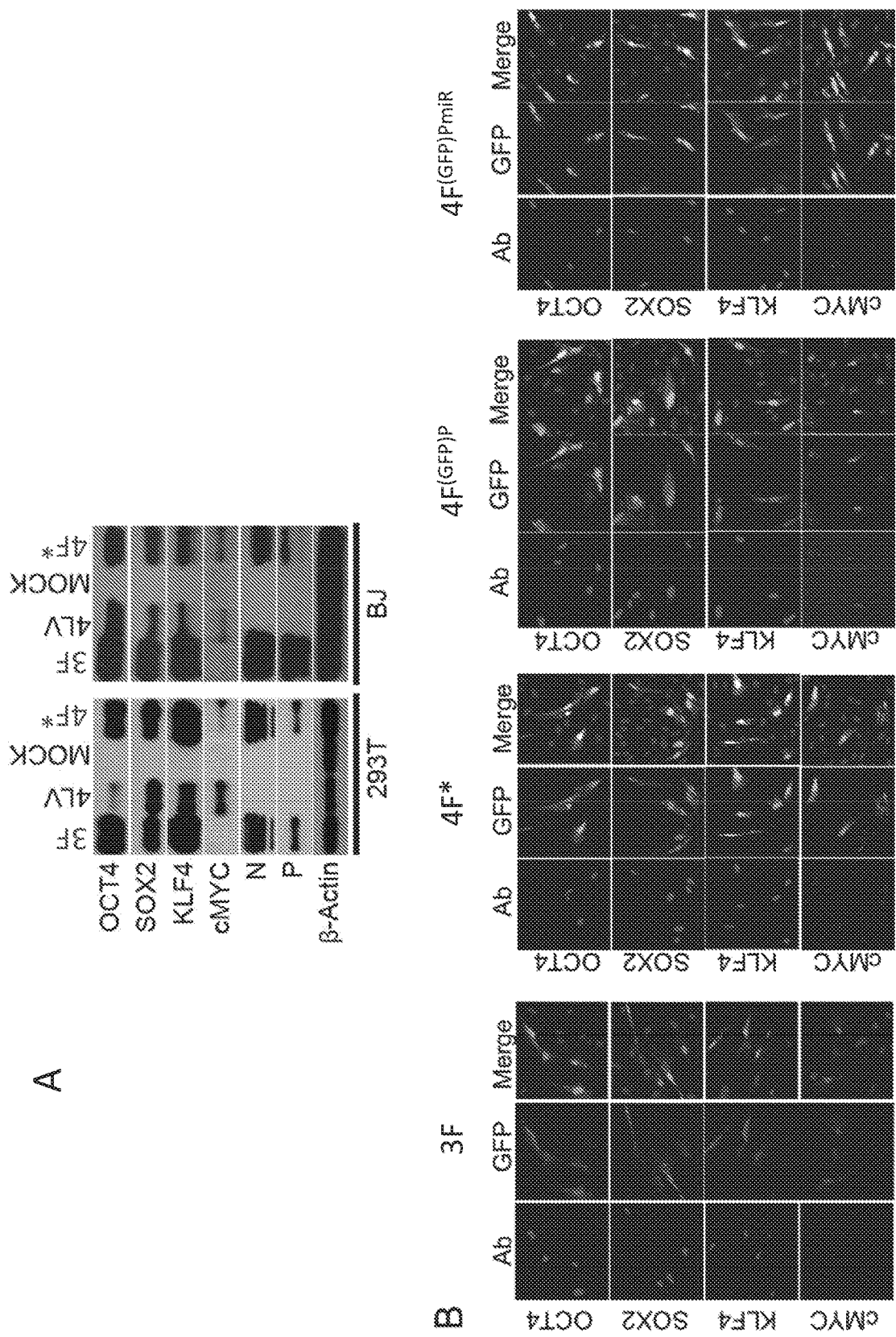
FIGS. 12A and 12B show the expression and processing of the four reprogramming factors in 3F and 4Fs.

Expression and correct processing of OSK in 293T and human fibroblast was verified. All three proteins OCT4, SOX2 and KLF4 were expressed and had the same apparent molecular weight as the proteins expressed in cells infected by corresponding lentiviral vectors (LVs) (FIG. 12A). The MV transcription gradient was used to express cMYC at lower levels than the other three RFs in MV4F*-infected cells (FIG. 12A). All factors were expressed in the nuclei (FIG. 12B).

Figure 13:
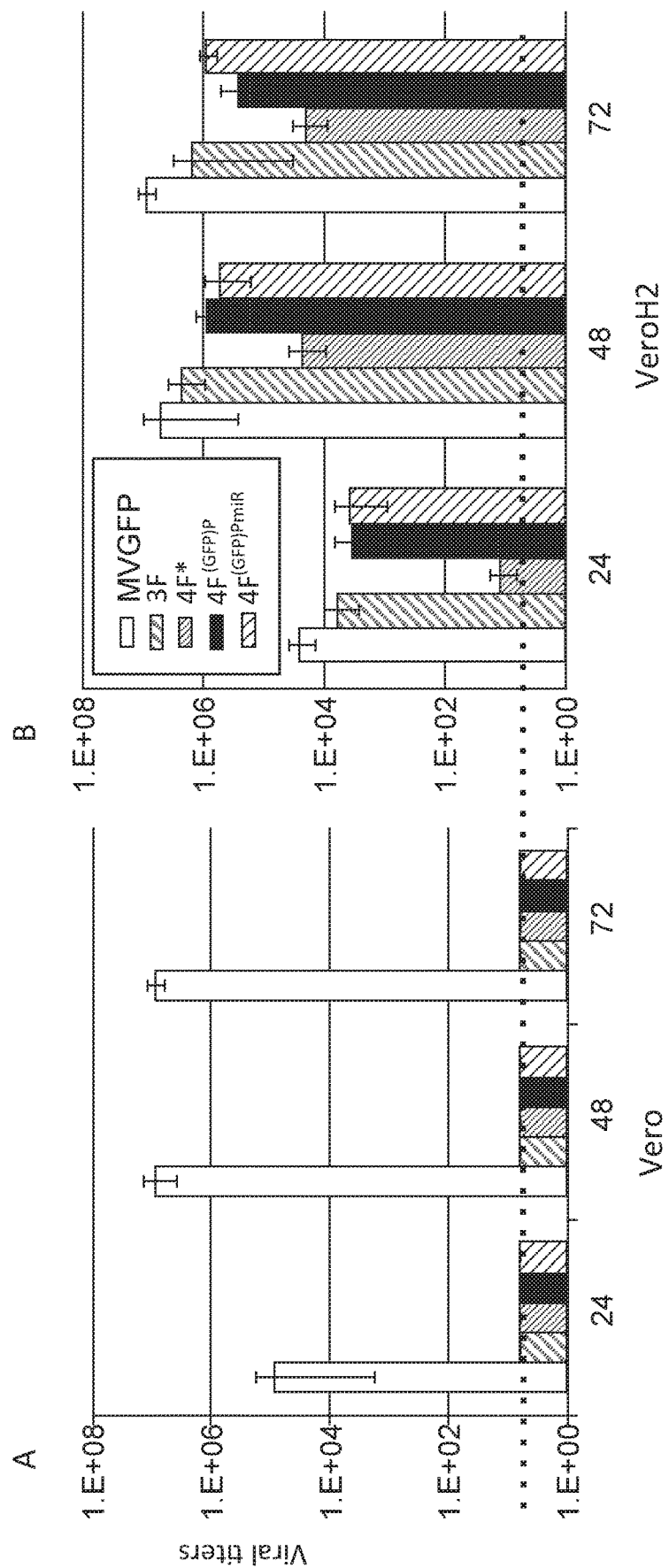
FIGS. 13A and 13B show the titers of cell-associated and released virus produced upon infection of Vero (A) and Vero-H2 (B) cells with 3F, 4F*, 4F$^{(GFP)P}$, and 4F$^{(GFP)PmiR}$ vectors or MVGFP, determined at 24 hours, 48 hours, or 72 hours post-infection. Values and error bars reflect the mean and standard deviation of at least two biological replicates. The growth of MV vectors is only slightly affected by the presence of the OSK and M. Infectivity and lack of propagation without H protein was verified by one-step growth curve analyses. Dependency for vector propagation on H expression was confirmed by reintroduction of H in trans.
Figure 14:
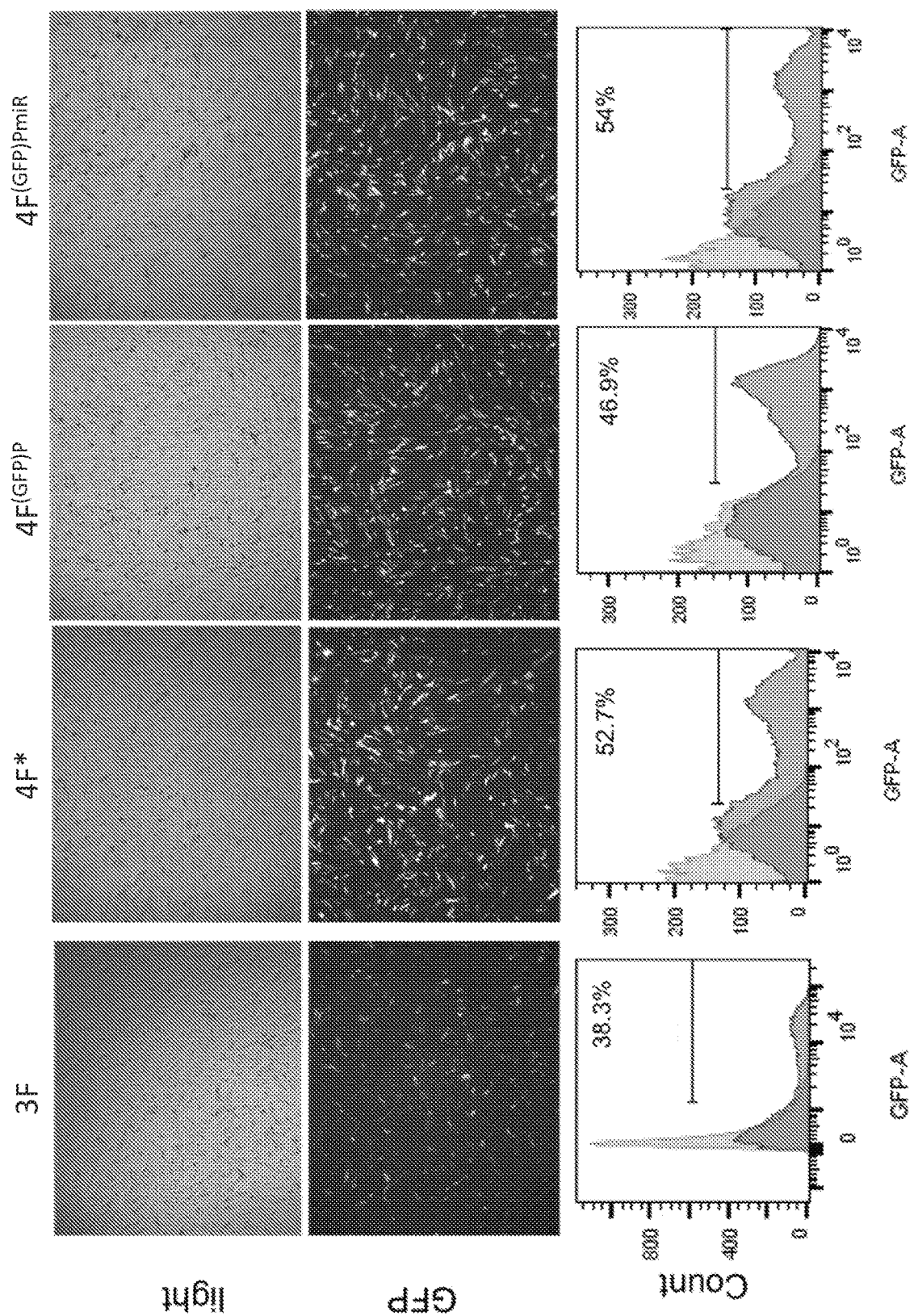
FIG. 14 shows the level of transduction of human fibroblasts with 3F, 4F*, 4F$^{(GFP)P}$, and 4F$^{(GFP)PmiR}$. Cells (BJ) were infected with 3F, 4F*, 4F$^{(GFP)P}$, and 4F$^{(GFP)PmiR}$ or mock infected. Forty-eight hours post-infection, pictures were taken under phase contrast (top panels) or fluorescence (middle panels). Cells were then collected and GFP expressing cells were quantified by flow cytometry (bottom row). 3F and 4F vectors can efficiently transduce human neonatal primary BJ cells.

High viral titers were documented in Vero cells infected with the replication-competent virus MV(GFP)H, but no virus was produced in cells infected with the single-cycle vectors 3F, 4F*, $4F^{(GFP)P}$, and $4F^{(GFP)PmiR}$ (FIG. 13A). In contrast, cells expressing MV-H produced high titers of 3F, 4F*, $4F^{(GFP)P}$, and $4F^{(GFP)PmiR}$ (FIG. 13B), confirming that these are "one-cycle" vectors in the absence of trans-supplementation of MV-H. Viral stocks reached as high as $1 \times 10^6$ TCID50/mL. Spinoculation of 3F, 4F*, $4F^{(GFP)P}$, and $4F^{(GFP)PmiR}$ at multiplicity of infection (MOI) of 0.5 efficiently transduced human fibroblast cells 48 hours post-transduction, ranging from 38% to 54% (FIG. 14).

Reprogramming with MV Vectors: Detailed Protocols

The ability of four factor vectors $4F^{(GFP)P}$ and $4F^{(GFP)PmiR}$ to reprogram human fibroblast was tested and compared to 4F* described in Example 4.

Human PBMC, T Cells. PBMC are isolated from an Apheresis cone. The PBMC are isolated on a Ficoll gradient, and T, B, NK, CD34+ progenitor cells are isolated using magnetic beads. Cells (PBMC or isolated cells) are then activated for 1-3 days, then transduced with various MOI of the 4F vectors using a modified protocol described above. The protocol is adapted to the reprogramming of PBMC and isolated T, B, NK, CD34+ cells as described elsewhere (Ohmine et al., Stem Cell Res. Ther., 2:46 (2011)). The cells are transferred on a matrigel-coated plate to allow iPSC to adhere. At day 3 and 5 days post-transduction, 1 mL of optimized serum-free/feeder-free iPSC medium is added, and then starting at day 7, it is replaced daily. The REpro-TeSR™ reprogramming media (STEMCELL Technologies), which is specifically design for the reprogramming of blood-derived cells under feeder free conditions, is used. The cells are monitored until cells form small colonies with iPSC morphology (1 to 2 weeks after transduction). Pictures are taken at different stages. iPS-like clones should appear around days 15 to 25, and are picked after 3 to 4 weeks, and are plated at 1 clone/well in Matrigel-coated wells for further expansion.

Figure 15:
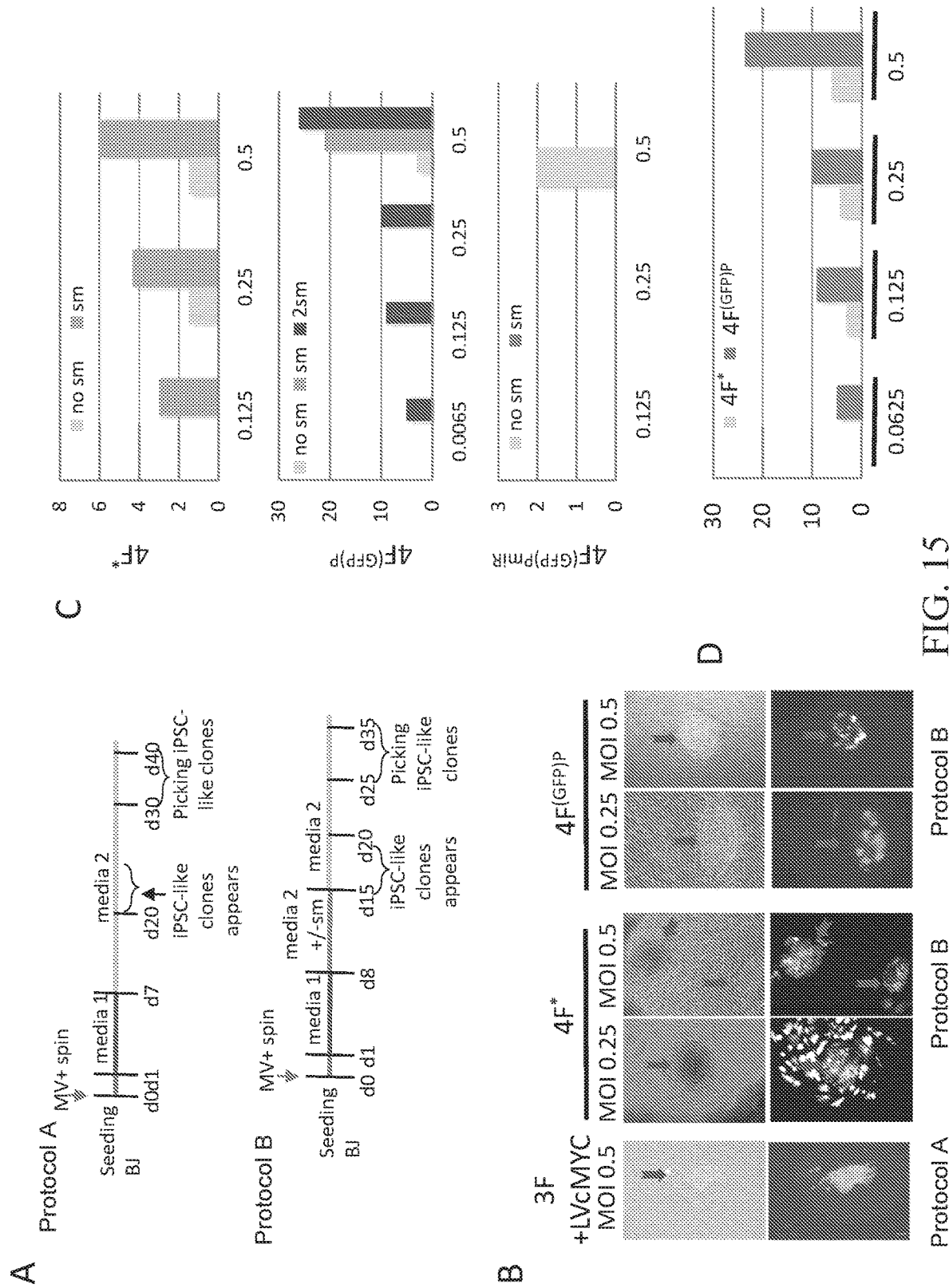
FIGS. 15A, 15B, 15C, and 15D show a schematics of the optimized reprogramming protocols and a comparison of the reprogramming efficiency of the 4F vectors.

Human fibroblast cells. Human fibroblast cells ($7 \times 10^4$/well) were seeded on matrigel-coated plates in fibroblast media. Cells were transduced with at different multiplicity of infection (MOI, 0.5 or 0.25) in 500 µL OptiMEM. Cells transduced with 3F were co-transduced with LV-cMYC (50 µL). Cell transduced with 4F*, $4F^{(GFP)P}$, or $4F^{(GFP)PmiR}$ were transduced with the Measles vector alone. Cell and virus were subjected to spinoculation at 1100 rpm for one hour at room temperature (25° C.), then the inoculum was left overnight on top of the cells. The day after, cells were washed once with PBS, and fibroblast media added and was changed every two days until day 7 for 3F and day 8 for 4F*, $4F^{(GFP)P}$ or $4F^{(GFP)PmiR}$. Feeding fibroblast media was changed to iPSC media and was changed every day thereafter. iPSCs clones were picked on the basis of size and morphology, around day 25-30 and transferred individually on a matrigel-coated 12 well and cultured in iPSC media for further expansion and study (FIG. 15A).

For reprogramming with small molecules, SB431542 (Stemgent, 04-0010-05, 5 µM), PD0325901 (Stemgent, 04-0006-02, 0.2 µM), and Thiazovivin (Stemgent, 04-0017, 0.5 µM) small molecules were added to iPSC media from day 7 to 14.

Reprogramming with the 3F, 4F*, 4F$^{(GFP)P}$ or 4F$^{(GFP)PmiR}$ Leads to iPSC-Like Clones The ability of 3F, 4F*, 4F$^{(GFP)P}$ or 4F$^{(GFP)PmiR}$ to reprogram human fibroblasts was documented, and the effect of supplementation of small molecules (sm, 2sm), SB431542 (5 µM), PD0325901 (0.2 µM) and Thiazovivin (0.5 µM) was tested to determine their impact reprogramming efficiency. Although reprogramming at MOI 0.5 with 4F*, 4F$^{(GFP)P}$ or 4F$^{(GFP)P\ miR}$, with or without small molecules, led to noticeable toxicity over the first week, GFP expressing cells remained visible over 30 days. Around 2 weeks (12 to 17 days) post transduction, GFP positive, sharp-edge, flat, and tightly packed iPSC-like clones emerged in the fibroblast monolayer (FIG. 15B). Single cell-derived clones were picked and expanded 5 to 10 days later. The number of collectable clones for 4F* ranged from 1 to 3 clones per $2.1 \times 10^5$ cells at a MOI of 0.5, while the number of clones observed for 4F* with small molecules ranged to 3 to 4 time higher (FIG. 15C, top graph), indicating that small molecule increase reprogramming efficiency of 4F*. The number of collectable clone was significantly increase after transduction with 4F$^{(GFP)P}$, to an average of 22 without sm and 25 with small molecule, indicating that this vector is better at reprogramming than 4F* (FIG. 15C, middle graph and FIG. 15D) and that the small molecule still have a small effect on reprogramming efficiency (FIG. 15C, middle graph). The effect of the three small molecules was the same on the three MOI tested. These results indicated that MV expressing OCT4, SOX2, KLF4 and cMYC alone could reprogram human fibroblast, and that the addition of the small molecules, SB431542, PD0325901 and Thiazovivin, improved efficiency. However, reprogramming of 4F$^{(GFP)PmiR}$, which contains the miR375 target sequences, was in contrast drastically reduced, in both media condition, indicating that elimination of all reprogramming factors at once using the miR375 can be detrimental to reprogramming efficiency (FIG. 15C, bottom graph). Thus, subtle elimination of OCT4, as shown in FIG. 5A, is preferential to increase reprogramming efficiency through miRNA technology.

Elimination of the Vector from the iPSC-Like Clones

Figure 16:
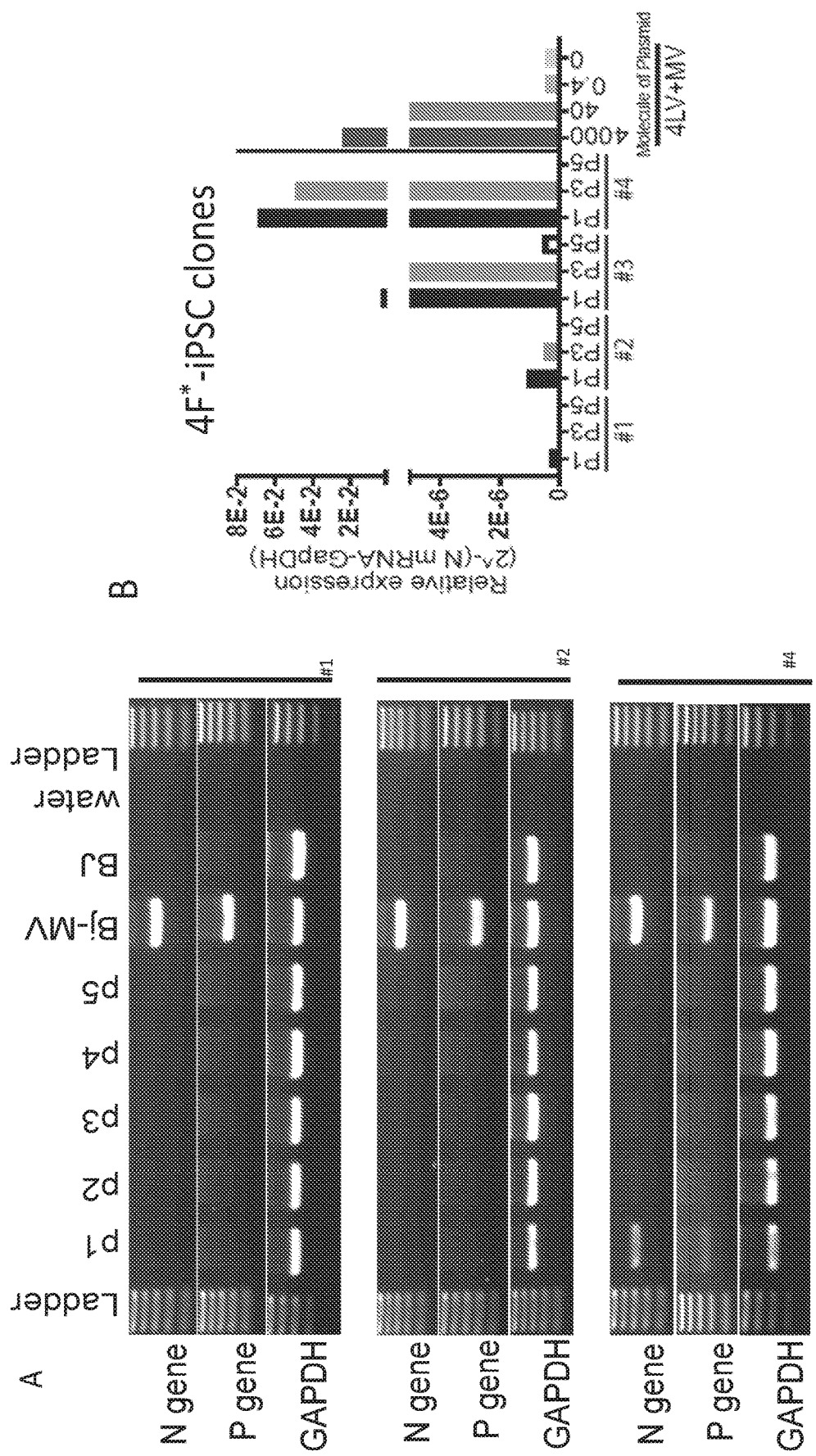
FIGS. 16A and 16B show the rapid elimination of the vector from the established iPSc clones.

The elimination of the 4F* vector from the established iPSC was tested. The two most abundant MV mRNAs, nucleoprotein (N) and phosphoprotein (P), were detected in iPSC clones produced without small molecules up to passages P3 to P5 (FIGS. 16A and 16B compare clones #1 and #2 (with) with clones #3 and #4 (without)). Clones produced with small molecules had detectable mRNA only at P1, indicating fast clearance of 4F* vector after reprogramming in presence of the small molecules (FIGS. 16A and 16B, Compare Clones #1 and #2 (with) with Clones #3 and #4 (without)).

Verification that the iPSC-Like Clones are Indeed iPSCs

Figure 17:
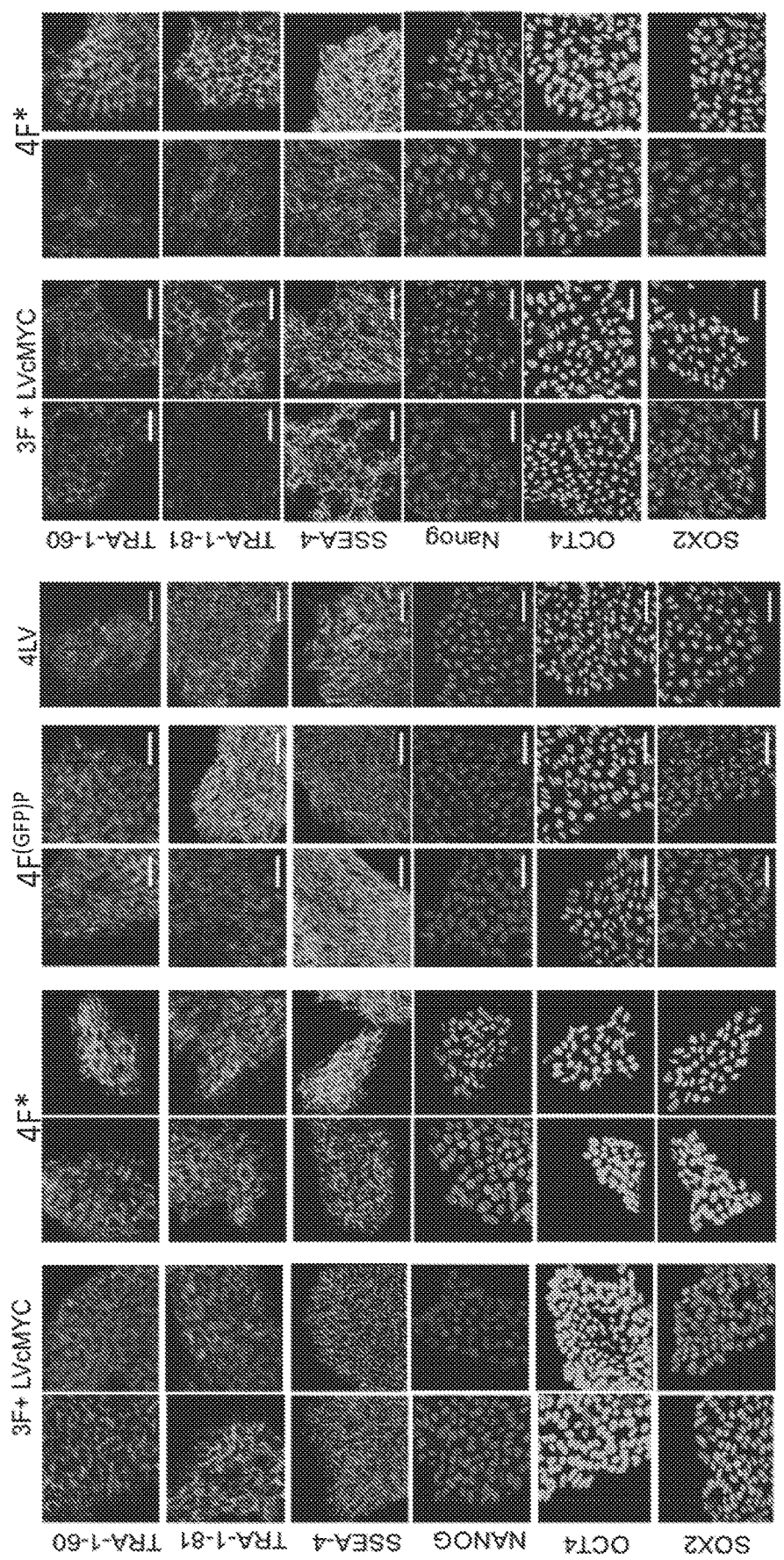
FIG. 17 shows the characterization of 4F-derived iPSC clones for pluripotency markers. Two representative of low passage 4F$^{(GFP)P}$-derived iPSC clones were compared to two 4F*-derived iPSC clones (from Example 4) and one 4LV-derived iPSC control (4LV) were cultured under feeder free conditions on a matrigel-based slide and examined for expression of human pluripotent stem cell markers by immunofluorescence (Passages 3-5). Stability of the 3F and 4F*-derived iPSC clones in expressing the pluripotentcy markers after over 20 passages are shown on the right of FIG. 17. Scale bars represent 50 µm. MV-derived iPSC-like clones expressed markers of pluripotency.

To verify that the 4F-derived iPSC-like clones were indeed iPSC clones, the 3F, 4F*, 4F$^{(GFP)P}$-derived clones were verified to express human pluripotency-associated markers, SSEA-4, TRA-1-60, TRA-1-81, OCT4, SOX2 and NANOG, at passage 3-5 and after prolonged culture (at passage 20-25), indicating stability of the derived clones (FIG. 17).

Figure 18:
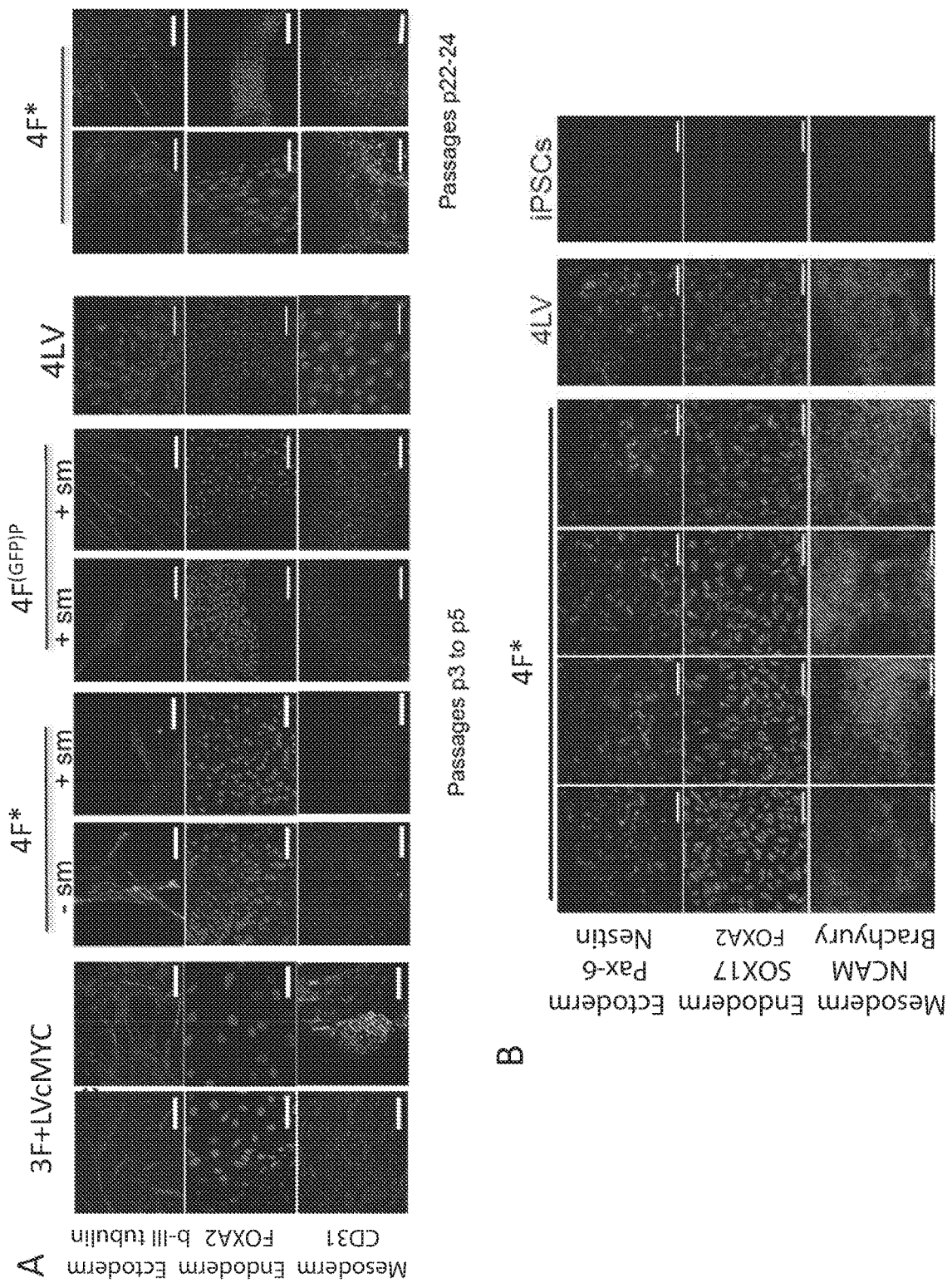
FIGS. 18A and 18B show the spontaneous and guided differentiation of the 4F*-derived iPSC clones into the three germ lineages.

To confirm that the 3F, 4F*, 4F$^{(GFP)P}$-derived iPSC clones were pluripotent, their differentiation propensity into the three germ layers; endoderm, ectoderm and mesoderm was assessed. First, the multi-lineages propensity of 3F, 4F*, 4F$^{(GFP)P}$-derived clones was confirmed by formation of embryoid bodies (EBs) and spontaneous differentiation into mesoderm (CD31) endoderm (FOXA2), or ectoderm (β-III tubulin). All 3F, 4F*, 4F$^{(GFP)P}$-derived iPSCs could form EBs and differentiate spontaneously into ectoderm, endoderm or mesoderm and maintained their differentiation propensity over 20 passages, indicating stability of the pluripotency state (FIG. 18A). Second, following guided differentiation, all 4F*-derived iPSCs tested differentiated into the ectodermal, endodermal or mesodermal pathways (FIG. 18B), further confirming multi-lineage differentiation propensity of all 4F*-derived iPSCs.

In addition, the global gene expression profiles of MV four factor vector-derived iPSC clones were determined and compared against global gene expression profiles of parental fibroblast cells and H9 human ES cells (GSM551202; GEO DataSets, Boston, MA). Microarray analysis was conducted according to manufacturer's instructions for the Affymetrix 3' IVT Plus kit (Thermofisher Scientific, 902416). Briefly, RNA quality was assessed by Agilent Bioanalyzer (Agilent Technologies). Reverse transcription to second strand cDNA was generated from 100 ng of high quality total RNA. Subsequently, the products were in vitro transcribed to generate biotin-labeled cRNA. The IVT products were then bead-purified (Affymetrix), fragmented, and hybridized onto Affymetrix U133Plus 2 GeneChips® at 45° C. for 16 hours. Subsequent to hybridization, the arrays were washed and stained with streptavidinphycoerythrin and scanned in an Affymetrix GeneChip® Scanner 3000 (Santa Clara, CA). Control parameters were confirmed to be within normal ranges before normalization, and data reduction was initiated using the GeneChip™ Command Console™ Software. The .cel files were processed using Partek Genomics Suite software, version 6.6 (Partek Inc., St. Louis, MO, USA). The files were normalized using quantile normalization with a log probes using base 2. The differential expression was performed using the ANOVA method in Partek. The scatter plots were generate using R script version 3.1.1. The heat map was generated using Excel software.

Scatter plot analysis demonstrated that the transcriptome of MV four factor vector-derived iPSC clones showed higher similarity to those of ES than parental fibroblast cells. Heat map analysis of differentially expressed genes further confirmed that gene expression patterns of derived iPSC clones were similar to those of human ESCs, but highly divergent from control human fibroblast cells. The transcriptome of three independent MV four factor vector-derived iPSC clones exhibited striking similarity to each other. Thus, global gene expression profiles support a high degree of similarity in transcriptome between MV four factor vector-derived iPSCs and human ES cells.

Figure 19:
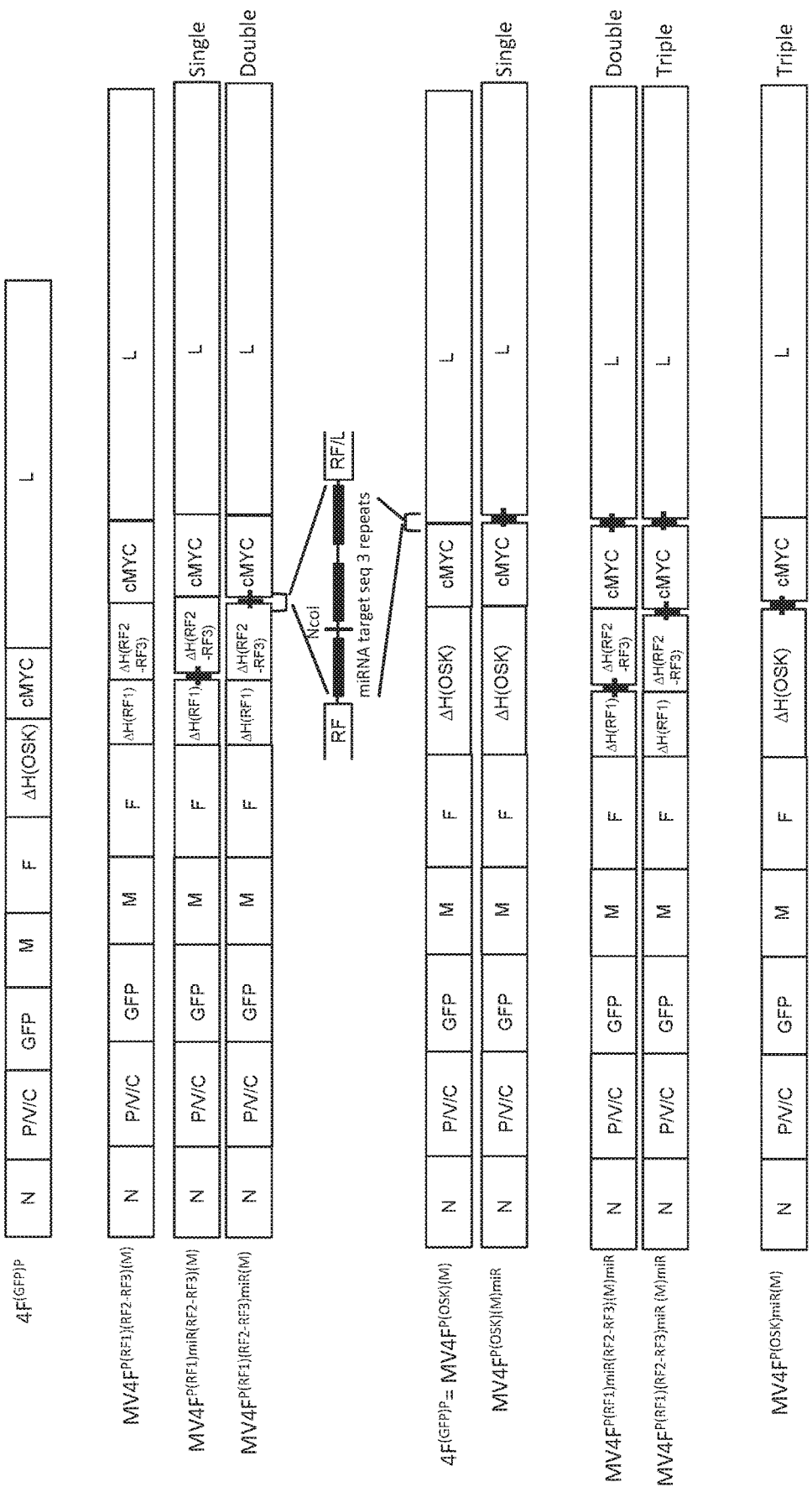
FIG. 19 is a schematic of various MV vectors expressing four RFs and possible combinations to have one, two, or three RFs expression under the control of an miRNA (e.g., miR375). RF1 can be OCT4, SOX2 or KLF4. RF2 and RF3 can be OCT4, SOX2, or KLF4 with no RF duplication.

Example 11: Measles Vectors Expressing Four Reprogramming Factors with Reprogramming Factor(s) Expression Controlled by miRNA Construct having the structure shown in FIG. 19 are produced. For all constructs, RF1 can be OCT4, SOX2 or KLF4, RF2 can be OCT4, SOX2 or KLF4, and RF3 can be OCT4, SOX2 or KLF4, provided that no RF is duplicated. M can be cMYC or N-MYC. Bi-cistron RF2-RF3 is linked by a picornavirus 2A self-cleaving peptide (e.g., T2A, E2A, F2A or P2A). Any appropriate miRNA is used.

Control of OCT4, SOX2 and KLF4: Single, Double, Triple Combinations Vector without miRNA Control Two PCR fragments encoding RF1 or RF2-RF3 are cloned instead of the H gene using the EcoRV and SmaI restriction sites. A new measles virus intergenic region containing a stop and start of transcription is inserted between RF1 and RF2-RF3. Cloning is performed in accord with the "rule of six" using an intermediate vector pCGΔH (GFP)

(GFP)H. Unique restriction site, such as SwaI and FseI, are introduced upstream and downstream RF2-RF3 to facilitate interchanging the factors for the following constructs and the introduction of the miRNA. The resulting plasmid pCGΔH(RF1)(RF2-RF3)(GFP)H is then modified by the introduction of cMyc (M) in place of the GFP, using restriction digestion, leading to the pCGΔH(RF1)(RF2-RF3)(M)H. Then, the PacI-SpeI fragment from the MV(GFP)$^P$ is exchanged with the PacI-SpeI fragment of the pCGΔH(RF1)(RF2-RF3)(M)H to obtain p(+)MVvac2(GFP)$^P$ΔH(RF1)(RF2-RF3)(M)H (MV4F$^{P(RF1)(RF2-RF3)(M)}$).

Vector with miRNA Control of the Reprogramming Factors

Single

The pCGΔH(RF1)(RF2-RF3)(M)H is used to introduce the miRNA target sequence in the 3'UTR of RF1. Three repeats of the miRNA target sequence is inserted in the 3' UTR of the RF1 gene, and one NcoI restriction site (or any other appropriate restriction site) is introduced between the first and second repeat to facilitate cloning. Two PCR fragments are generated; one covering the RF1 gene, the other covering the RF2-RF3 gene. Both fragments are linked using the NcoI site, and the resulting fragment is cloned back in the intermediate vector and then in the full-length MV vector using unique restriction sites to produce MV4F$^{P(RF1)miR(RF2-RF3)(M)}$.

Double

The pCGΔH(RF1)(RF2-RF3)(M)H is used to introduce the miRNA target sequence in the 3'UTR of RF2-RF3. Three repeats of the miRNA target sequence are inserted in the 3' UTR of the bicistron RF2-RF3, and one NcoI restriction site (or any other appropriate restriction site) is introduced between the first and second repeat to facilitate cloning. Two PCR fragments are generated; one covering the RF2-RF3 gene, the other covering the cMYC gene. Both fragments are linked using the NcoI site, and the resulting fragment is cloned back in the intermediate vector and then in the full-length MV vector using unique restriction sites to produce MV4F$^{P(RF1)(RF2-RF3)miR(M)}$.

Triple

The pCGΔH(OSK)(M)H is used to introduce the miRNA target sequence in the 3'UTR of OSK. Three repeats of the miRNA target sequence are inserted in the 3' UTR of the tricistron OSK, and one NcoI restriction site (or any other appropriate restriction site) is introduced between the first and second repeat to facilitate cloning. Two PCR fragments are generated; one covering the KLF4 gene, the other covering the cMYC gene. Both fragments are linked using the NcoI site, and the resulting fragment is cloned back in the pCGΔH(OSK)(M)H and then in the full-length MV vector using unique restriction sites to produce MV4F$^{P(OSK)miR(M)}$.

cMYC Control: Single, Double, Triple Combinations

Single

The pCGΔH(OSK)(cMYC)H is used to introduce the miRNA target sequence. Three repeats of the miRNA target sequence are inserted in the 3' UTR of the cMyc gene, and one NcoI restriction site (or any other appropriate restriction site) is introduced between the first and second repeat to facilitate cloning. Two PCR fragments are generated; one covering the cMYC gene and the start of the ATU encoding cMYC including one of the unique restriction site (such as MluI) that is used for the cloning of the modified cMYC, the other covering the SpeI and a part of the L gene. Both fragments are linked using the NcoI site, and the resulting fragment is cloned back in the intermediate vector and then in the full-length MV vector using unique restriction sites to produce MV4F$^{P(RF1)(RF2-RF3)(M)miR}$.

Double

The vector MV4F$^{P(RF1)miR(RF2-RF3)(M)miR}$ is obtained by sub-cloning the MluI-SpeI fragment of MV4F$^{P(OSK)(M)miR}$ in place of the MluI-SpeI fragment of MV4F$^{P(RF1)miR(RF2-RF3)(M)}$.

Triple

The vector MV4F$^{P(RF1)(RF2-RF3)miR(M)miR}$ is obtained by sub-cloning the MluI-SpeI fragment of MV4F$^{P(OSK)(M)miR}$ in place of the MluI-SpeI fragment of MV4F$^{P(RF1)(RF2-RF3)miR(M)}$.

Example 12: Measles Vectors Expressing Four Reprogramming Factors can Reprogram Human Somatic Cells into Naïve Induce Pluripotent Stem Cells The proficiency of MV vector to derive naïve iPSC is analyzed in vitro after reprogramming somatic cells in presence of compound identified to maintain the naïve state of human embryonic stem cells (hESC). Human cells (PBMCs or Fibroblasts) are transduced with MV4F as described in Example 10. Starting from day 3 to 4, compounds identified to maintain the naïve state of the hESC are added in the media and changed every other day. Compounds can be a cocktail containing a mix of some of the following inhibitors: MEKi, GSK3i, JNKi, P38i, PKC, ROCKi, BMPi, BRAFi, SRCi; and growth factors: bFGF, TGFb, hLIF, Activin (Gafni et al., *Nature*, 504:282-280 (2013); Chan et al., *Cell Stem Cell*, 13:663-675, (2013); Valamehr et al., *Stem Cell Report*, 2:366-381, (2014); Ware et al., *Proc Natl Acad Sci USA*, 111:4484-4489, (2014); and Theunissen et al., *Cell Stem Cell*, 15:471-487, (2014)). This list is not restrictive. The NutriSTEM is used as reprogramming media, this media is the equivalent of the Pluriton media that was used previously to establish the MV reprogramming system. As the bFGF (20 ng/mL for primed iPSC reprogramming) for primed iPSC reprogramming is added to the media, the amount of bFGF can be tittered down as needed to induce maintenance of the iPSC to a naïve state. Expression of naïve markers in MV4F-derived iPSC clones is confirmed by expression of markers such as OCT4, NANOG, STELLA, DPPA5, DNMT3L, REX1, KLF4, KLF5, KLF2, DPPA2, UTF1, OTX1, ZIC2, or ESSRB.

Example 13: MV-Derived iPSC Beta Cells Differentiation

The proficiency of MV-derived iPSC (Naïve or primed) to generate pancreatic progenitor cells is analyzed in vitro using a step-wise differentiation protocol to test differentiation of iPSCs into beta cells (or insulin producing cells). The iPSCs are subjected to a stepwise differentiation process, which is a combination of several protocols (Rezania et al., Nat. Biotechnol., 32:1121-1133 (2014); and Pagliuca et al., Cell, 159:428-439 (2014)). Briefly, the iPSC are first differentiated into definitive endoderm with Activin A and CHIR-99021 for 3 days (Stage 1); then into primitive gut tube with ascorbic acid and FGF7 for 2 days (Stage 2); then into posterior foregut with ascorbic acid, FGF7, SANT-1, retinoic acid, LDN193189 and PKC activator for 2 days (Stage 3); then into PDX1-positive pancreatic endoderm cells with SANT-1 and LDN198189 for 3 days (Stage 4); then into PDX1/NEUROD1-positive pancreatic endocrine precursors with SANT-1, LDN1938189, T3, ALKS inhibitor and zinc sulfate for 3 days (Stage 5); then into NKX6.1/insulin-positive beta-cells with T3, ALKS inhibitor, zinc sulfate, heparin and gamma secretase inhibitor for 15 days (Stage 6); and finally into NKX6.1/MAFA/insulin-positive beta-cells with T3, ALKS inhibitor, AXL inhibitor R428, betacellulin for 7 days (Stage 7).

The functionality of the beta cell are tested in vivo. They are used to reverse STZ-induced diabetes in mice. Briefly, SCID/Beige mice, immune-compromised mice are used. To induce diabetes, mice are given 5 consecutive intraperitoneal injections of Streptozotocin. Once diabetes is established, by obtaining 2 consecutive blood glucose readings of >300 mg/dL, mice are given the beta-like cells graft. The following experimental group receives beta-like cells generated with 4F vectors. Twenty μL of beta-like cells are injected into a pocket under the left kidney capsule. One-day post-injection, blood sugars are recorded, and then every 3 days for the next 2 weeks, then every week for 2 months until beta-like cells function is observed. Human C-peptide secretion is analyzed 1 week after injection, then every 2 weeks. If an effect is observed in the first few days, mice are kept for an observation phase (60 days), to verify the long-term survival and functionality of the cells. At the end of the observation period, a left nephrectomy is performed to remove the beta-like cell grafts. The mice are observed for 7 days for reoccurrence of the diabetes to confirm that the effect is due to the engrafted beta-like cells. Mice are then euthanized via $CO_2$ inhalation. The mice overall health is followed and is assessed for tumor and metastasis formation. If any tumor is detected, they are analyzed after H&E staining for malignancy pattern.

If the beta-like cells are not responsive to glucose in vitro, they might need a phase of maturation in the animal to become fully mature. If this is the case, the cells are implanted and are followed to determine if they are able to continue their differentiation into mature and functional beta-like cells, in vivo. The mice are kept for 120 days. Every month, a glucose challenge test is performed to determine if the cells have matured and are able secrete insulin in response to the excessive glucose intake. At the end of the observation period, the mice are euthanized via $CO_2$ inhalation. If the renal sub capsular site is unsuitable for delivery of the beta-like cell, a small capsule (TheraCyte$^R$ System from TheraCyte, Inc) is used to deliver the cells. The small capsule is implanted on the flank of the mice.

OTHER EMBODIMENTS

It is to be understood that while the disclosure has been described in conjunction with the detailed description thereof, the foregoing description is intended to illustrate and not limit the scope of the disclosure, which is defined by the scope of the appended claims. Other aspects, advantages, and modifications are within the scope of the following claims.

What is claimed is:

1. A Paramyxoviridae viral vector for reprogramming somatic cells into iPSCs, wherein said vector comprises negative-strand RNA comprising a first sequence that produces a mRNA molecule encoding a first reprogramming factor, a second sequence that produces a mRNA molecule encoding a second reprogramming factor, a third sequence that produces a mRNA molecule encoding a Paramyxoviridae virus N polypeptide, a fourth sequence that produces a mRNA molecule encoding a Paramyxoviridae virus P polypeptide, a fifth sequence that produces a mRNA molecule encoding a Paramyxoviridae virus M polypeptide, a sixth sequence that produces a mRNA molecule encoding a Paramyxoviridae virus F polypeptide, and a seventh sequence that produces a mRNA molecule encoding a Paramyxoviridae virus L polypeptide, wherein one or more of said mRNA molecules comprises a nucleic acid sequence complementary to a microRNA (miRNA) associated with pluripotency located within a 3' untranslated region of said one or more mRNA molecules, wherein said miRNA is miR375, wherein said first and second sequences are located between said sixth and seventh sequences, wherein said miRNA is endogenous to said iPSCs and in an amount sufficient to (a) reduce a level of said vector within said iPSCs or (b) reduce expression of one or more of said first and said second reprogramming factors in said iPSCs.

2. The vector of claim 1, wherein said first reprogramming factor comprises OCT4.

3. The vector of claim 1, wherein said nucleic acid sequence complementary to said miRNA is located in a 3' untranslated region of said mRNA molecule encoding said Paramyxoviridae virus P polypeptide.

4. The vector of claim 1, wherein said first reprogramming factor comprise OCT4, and wherein said nucleic acid sequence complementary to said miRNA is located in a 3' untranslated region of said mRNA molecule encoding said Paramyxoviridae virus P polypeptide.

5. The vector of claim 1, wherein said 3' UTR of said mRNA molecule encoding said Paramyxoviridae virus P polypeptide comprises more than one copy of said nucleic acid sequence complementary to said miRNA.

6. The vector of claim 1, wherein said nucleic acid sequence complementary to miR375 comprises SEQ ID NO:1.

7. The vector of claim 1, wherein said first reprogramming factor comprises SOX2.

8. The vector of claim 1, wherein said first reprogramming factor comprises KLF4.

9. The vector of claim 2, wherein said second reprogramming factor comprises SOX2.

10. The vector of claim 2, wherein said second reprogramming factor comprises KLF4.

11. The vector of claim 9, wherein said negative-strand RNA comprises an eighth sequence that produces a mRNA encoding a third reprogramming factor.

12. The vector of claim 11, wherein said third reprogramming factor comprises KLF4.

13. The vector of claim 12, wherein said negative-strand RNA comprises a ninth sequence that produces a mRNA encoding a fourth reprogramming factor, wherein said fourth reprogramming factor comprises cMYC.

* * * * *

SEQUENCE LISTING

<160> NUMBER OF SEQ ID NOS: 1

<210> SEQ ID NO 1
<211> LENGTH: 22
<212> TYPE: DNA
<213> ORGANISM: artificial
<220> FEATURE:
<223> OTHER INFORMATION: nucleic acid sequence that is targeted by
      miR375

<400> SEQUENCE: 1
aaacaagcaa gccgagcgca cu                                              22